United States Patent
Tateishi et al.

(10) Patent No.: US 9,359,502 B2
(45) Date of Patent: *Jun. 7, 2016

(54) DISPERSION INCLUDING AZO PIGMENT, COLORING COMPOSITION, INKJET RECORDING INK AND METHOD FOR PREPARING DISPERSION

(71) Applicant: FUJIFILM Corporation, Tokyo (JP)

(72) Inventors: Keiichi Tateishi, Kanagawa (JP); Shinya Hayashi, Kanagawa (JP); Hiroshi Yamada, Kanagawa (JP); Yoshiaki Nagata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 14/164,619

(22) Filed: Jan. 27, 2014

(65) Prior Publication Data

US 2014/0141249 A1  May 22, 2014

Related U.S. Application Data

(63) Continuation of application No. PCT/JP2012/066987, filed on Jul. 3, 2012.

(30) Foreign Application Priority Data

Jul. 29, 2011 (JP) ................................ 2011-167832
Jun. 4, 2012 (JP) ................................ 2012-127329

(51) Int. Cl.
*C09B 62/03* (2006.01)
*B32B 5/00* (2006.01)
(Continued)

(52) U.S. Cl.
CPC ............. *C09B 67/0028* (2013.01); *C09B 33/12* (2013.01); *C09B 67/0002* (2013.01);
(Continued)

(58) Field of Classification Search
CPC  C09B 33/12; C09B 67/0002; C09B 67/0028; C09B 67/0022; C09B 67/0086; C09D 11/00; C09D 7/14; C09D 11/326; C09D 17/003; Y10T 428/2982

USPC ............................. 8/637.1; 534/758; 428/402
See application file for complete search history.

(56) References Cited

U.S. PATENT DOCUMENTS

| | | |
|---|---|---|
| 5,194,088 A | 3/1993 | Babler et al. |
| 5,650,520 A | 7/1997 | Hao et al. |

(Continued)

FOREIGN PATENT DOCUMENTS

| | | |
|---|---|---|
| EP | 2 474 574 A1 | 7/2012 |
| EP | 2 671 926 A1 | 12/2013 |

(Continued)

OTHER PUBLICATIONS

STIC Search Report dated Apr. 28, 2015.*

(Continued)

*Primary Examiner* — Eisa Elhilo
(74) *Attorney, Agent, or Firm* — Sughrue Mion, PLLC

(57) ABSTRACT

There is provided a pigment dispersion including an azo pigment or a tautomer thereof represented by the following Formula (1) and having characteristic X-ray diffraction peaks at Bragg angles (2θ±0.2°) of 4.8°, 7.2° and 9.7° in a CuKα characteristic X-ray diffraction.

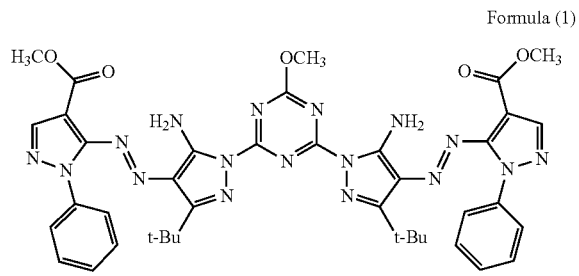

Formula (1)

11 Claims, 20 Drawing Sheets

(51) Int. Cl.
    *C09B 39/00*     (2006.01)
    *C09B 67/48*     (2006.01)
    *C09B 33/12*     (2006.01)
    *C09B 67/04*     (2006.01)
    *C09D 7/14*     (2006.01)
    *C09D 17/00*     (2006.01)
    *C09B 67/00*     (2006.01)
    *C09B 67/46*     (2006.01)
    *C09D 11/322*     (2014.01)

(52) U.S. Cl.
    CPC ......... *C09B67/0022* (2013.01); *C09B 67/0086* (2013.01); *C09D 7/14* (2013.01); *C09D 11/322* (2013.01); *C09D 17/003* (2013.01); *Y10T 428/2982* (2015.01)

(56) References Cited

U.S. PATENT DOCUMENTS

| | | | |
|---|---|---|---|
| 2008/0058531 A1 | 3/2008 | Schmidt et al. | |
| 2011/0021763 A1 | 1/2011 | Tateishi et al. | |
| 2011/0245475 A1 * | 10/2011 | Tateishi et al. | 534/579 |
| 2012/0156449 A1 | 6/2012 | Tateishi et al. | |
| 2014/0141250 A1 | 5/2014 | Tateishi et al. | |

FOREIGN PATENT DOCUMENTS

| | | | | |
|---|---|---|---|---|
| JP | 58-210084 A | | 12/1983 | |
| JP | 5-222314 A | | 8/1993 | |
| JP | 8-48908 A | | 2/1996 | |
| JP | 2010-31224 A | | 2/2010 | |
| JP | 2011-74375 A | | 4/2011 | |
| JP | 201174375 A1 * | 4/2011 | ............ | C09B 67/20 |
| JP | 2013-32410 A | | 2/2013 | |
| JP | 2013-32411 A | | 2/2013 | |
| JP | 2013-32412 A | | 2/2013 | |
| JP | 2013-32413 A | | 2/2013 | |
| JP | 2013-32414 A | | 2/2013 | |
| JP | 2013-32415 A | | 2/2013 | |
| JP | 2013-49826 A | | 3/2013 | |
| JP | 2013-49827 A | | 3/2013 | |
| TW | 201033294 A1 | | 9/2010 | |
| WO | 2009/110643 A1 | | 9/2009 | |
| WO | WO 2010067784 A1 * | 6/2010 | ............ | C09B 33/12 |
| WO | 2011/027842 A1 | | 3/2011 | |
| WO | 2011/027843 A1 | | 3/2011 | |
| WO | 2012/105704 A1 | | 8/2012 | |

OTHER PUBLICATIONS

Communication from the Japanese Patent Office dated Dec. 9, 2014, in a counterpart Japanese application No. 2012-127329.
Office Action dated Sep. 30, 2014 issued by the Japanese Patent Office in counterpart Japanese Patent Application No. 2012/127329.
International Search Report (PCT/ISA/210), dated Sep. 25, 2012, issued by the International Searching Authority in counterpart International Patent Application No. PCT/JP2012/066987.
Written Opinion (PCT/ISA/237), dated Sep. 25, 2012, issued by the International Searching Authority in counterpart International Patent Application No. PCT/JP2012/066987.
Search Report dated Jun. 19, 2015, issued by the European Patent Office in counterpart European Application No. 12820342.9.
Communication dated Oct. 6, 2015 issued by Taiwanese Intellectual Property Office in counterpart Taiwanese Patent Application No. 101127287.

* cited by examiner

ε-type crystal form azo pigment (1)-2

ε-type crystal form azo pigment (1)-3

ζ-type crystal form azo pigment (1)-1

α-type crystal form azo pigment (1)-1

CuKα characteristic X-ray diffraction of crystal form azo pigment (1)-27

DISPERSION INCLUDING AZO PIGMENT, COLORING COMPOSITION, INKJET RECORDING INK AND METHOD FOR PREPARING DISPERSION

CROSS REFERENCE TO RELATED APPLICATION

This is a continuation of International Application No. PCT/JP2012/066987 filed on Jul. 3, 2012, and claims priority from Japanese Patent Application Nos. 2011-167832 filed on Jul. 29, 2011, and 2012-127329 filed on Jun. 4, 2012, respectively, the entire disclosures of which are incorporated herein by reference.

TECHNICAL FIELD

The present invention relates to a dispersion including an azo pigment, a coloring composition, an inkjet recording ink, and a method for preparing the dispersion.

BACKGROUND ART

Recently, an image-recording material has been dominated particularly by a material for forming a color image and specifically, a recording material of inkjet system, a recording material of heat-sensitive transfer system, a recording material of electrophotographic system, a silver halide photosensitive material of transfer system, a printing ink, a recording pen and the like are popularly used. Further, in an image device such as CCD of photographing equipment or in a display such as LCD and PDP, a color filter is used for recording and reproducing a color image. In these color image recording materials and color filters, colorants (dyes or pigments) using three primary colors for a so-called additive or subtractive color mixing method are used for displaying or recording a full color image, but a colorant having absorption characteristics capable of realizing a preferred color reproduction region and having fastness enough to endure various use conditions or environmental conditions has not been found until now, and accordingly, improvements are keenly demanded.

The dyes and pigments used in each of the aforementioned uses need to commonly have the following properties. That is, the dyes and pigments need to have preferred absorption characteristics for color reproducibility, and exhibit good fastness under environmental conditions used, for example, light resistance, heat resistance, resistance to oxidative gases such as ozone and the like. In addition, in the case where the colorant is a pigment, the colorant also needs to have properties such as being substantially insoluble in water or an organic solvent, showing good chemical resistance, and not impairing the preferred absorption characteristics in the molecular dispersion state even when used as a particle. The requisite characteristics may be controlled by varying the degree of the intermolecular interaction, but both characteristics are in a trade-off relationship and therefore, it is difficult to satisfy both at the same time.

Further, in using a pigment, other than the properties described above, the pigment also needs to have a particle diameter and a particle shape necessary for bringing out a desired transparency, to show good fastness under environment conditions used, for example, light resistance, heat resistance, resistance to an oxidative gas such as ozone, water resistance, and chemical resistance to an organic solvent, a sulfurous acid gas or the like, and to have properties capable of being dispersed even into microparticles in a medium used and keeping the dispersed state stable.

That is, compared to the dye which is required to have performances as a colorant molecule, performances required for the pigment need to satisfy not only performances as a colorant molecule, but also the aforementioned requisite performances as a solid (fine particle dispersion) as an aggregate of colorant molecules in various fields. As a result, a compound group which may be used as a pigment is extremely limited as compared to the dye, and thus even when a high-performance dye is derived into a pigment, a pigment capable of satisfying the requisite performances as a fine particle dispersion is very few in number and may not be easily developed. This is also confirmed from the fact that the number of pigments registered in the Color Index is less than 1/10 of the number of dyes.

Among the pigments, particularly an azo pigment has high lightness and excellent light resistance and heat resistance, and thus is widely used as a pigment for a printing ink, an inkjet ink, an electrophotographic material, and a color filter. Further, as the use is expanded, the pigment also needs to have much better stability over time regardless of a medium used rather than stability at a level usually used in a printing ink, a gravure ink, and a coloring agent. For example, Patent Document 1 discloses an azo pigment with a specific structure, which has excellent color characteristics such as hue and excellent light resistance and includes a pyrazole ring.

Simultaneously, in the use of a color filter or an inkjet ink, it is required to further enhance clearness or transparency. In order to enhance clearness or transparency, it is effective to finely disperse a pigment, and therefore, a method of efficiently preparing an azo pigment fine particle by which a fine dispersion may be formed is also required. Patent Document 2 discloses a method of preparing an azo pigment with a specific structure, which includes a pyrazole ring, by which the azo pigment may be prepared at a high efficiency and a low cost.

Meanwhile, most of the representative organic pigments are polymorphic, and it is known that these pigments take two or more crystal forms in spite of having the same chemical composition.

In the organic pigments, for example, there are also an organic pigment which may obtain fine and size-regulated particles by selecting appropriate reaction conditions during synthesis like the azo pigment, an organic pigment obtained by preparing a pigment from very finely and aggregated particles produced during synthesis by subjecting the particles to particle growth and size-regulating the particles in subsequent steps like a copper phthalocyanine green pigment, and an organic pigment obtained by preparing a pigment from coarse and uneven particles produced during synthesis by finely pulverizing and size-regulating the particles in subsequent steps like a copper phthalocyanine blue pigment. For example, a diketopyrrolopyrrole pigment is generally synthesized by reacting succinic diester with aromatic nitrile in an organic solvent (see, for example, Patent Document 3). Then, the crude diketopyrrolopyrrole pigment is heat-treated in water or an organic solvent, followed by pulverization such as wet grinding into a form suitable for use (see, for example, Patent Document 4). In the C.I. Pigment Red 254, an α-crystal form and a β-crystal form are known (see, for example, Patent Document 5). In addition, in the C.I. Pigment Yellow 181 which is an azo pigment, various types of crystal forms are known (see, for example, Patent Document 6).

RELATED ART DOCUMENT

Patent Document

Patent Document 1: Japanese Patent Application Laid-Open No. 2010-31224

Patent Document 2: Japanese Patent Application Laid-Open No. 2011-74375

Patent Document 3: Japanese Patent Application Laid-Open No. S58-210084

Patent Document 4: Japanese Patent Application Laid-Open No. H8-222314

Patent Document 5: Japanese Patent Application Laid-Open No. H8-48908

Patent Document 6: US Patent Application Publication No. 2008/0058531

SUMMARY OF INVENTION

Technical Problem

In the azo pigments described in Patent Documents 5 and 6, there is no description of knowledge on the aforementioned crystal forms. Further, a pigment dispersion having excellent storage stability is advantageous in that a change in pH or viscosity over a long period of time does not occur easily, and it is difficult to occur a discharge defect due to a change in liquid physical properties even after storage for a long period of time. However, there is room for further review of storage stability of the pigment dispersion.

An object of the present invention is to provide an azo pigment with a specific crystal form, which has excellent color characteristics such as hue and particularly, excellent storage stability of a pigment dispersion.

Further, another object of the present invention is to provide a novel preparation method capable of preparing an azo pigment dispersion including an azo pigment with a specific crystal form with good reproducibility and high efficiency.

In addition, another object of the present invention is to provide a coloring composition including the dispersion of the azo pigment, and an inkjet recording ink.

As a result of intensive investigations in consideration of the aforementioned circumstances, the present inventors have found that a dispersion including an azo pigment or a tautomer thereof represented by the following Formula (1) and having characteristic X-ray peaks at Bragg angle (2θ±0.2°) of 4.8°, 7.2° and 9.7° in a CuKα characteristic X-ray diffraction has excellent color characteristics such as hue and excellent light resistance, and particularly excellent storage stability of the pigment dispersion.

Further, the present inventors have found out a preparation method which may prepare the dispersion with good reproducibility and high efficiency while controlling the azo pigment in a specific crystal form, thereby completing the present invention.

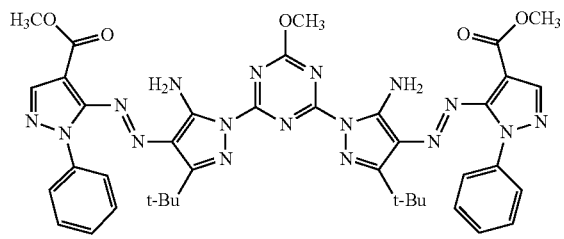 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Solution to Problem

That is, the present invention is as follows.

[1] A pigment dispersion including an azo pigment or a tautomer thereof represented by the following Formula (1) and having characteristic X-ray diffraction peaks at Bragg angles (2θ±0.2°) of 4.8°, 7.2° and 9.7° in a CuKα characteristic X-ray diffraction.

Formula (1)

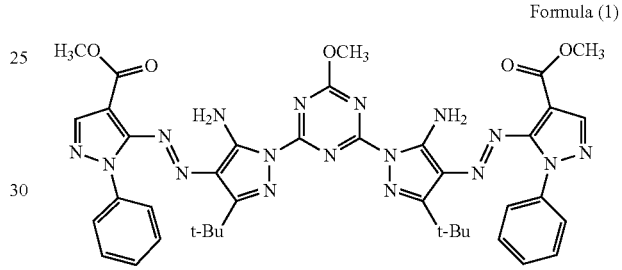

[2] The pigment dispersion described in [1], in which the azo pigment is an azo pigment or a tautomer thereof having characteristic X-ray diffraction peaks at Bragg angles (2θ±0.2°) of 4.8°, 7.2°, 9.7°, 17.4° and 20.1° in the CuKα characteristic X-ray diffraction.

[3] Further, the pigment dispersion described in [1] or [2], further including: an amorphous azo pigment represented by Formula (1), or an azo pigment or a tautomer thereof represented by Formula (1) and having characteristic X-ray diffraction peaks at Bragg angles (2θ±0.2°) of any one of (A) to (C) and (E) to (0) in the CuKα characteristic X-ray diffraction:

(A) 6.5°, 7.1° and 21.8°;
(B) 6.3°, 6.4° and 22.3°;
(C) 5.9° and 7.0°;
(E) 4.9°, 8.9° and 13.1°;
(F) 6.6°, 9.2°, 10.3°, 21.4° and 25.6°; and
(G) 4.8°, 9.2° and 13.0°.

[4] The pigment dispersion described in any one of [1] to [3], in which the azo pigment dispersed and represented by Formula (1) has characteristic X-ray diffraction peaks at Bragg angles (2θ±0.2°) of any one of the following (A) and (E) in the CuKα characteristic X-ray diffraction:

(A) 6.5°, 7.1° and 21.8°; and
(E) 4.9°, 8.9° and 13.1°.

[5] The pigment dispersion described in any one of [1] to [4], in which a volume average particle diameter of pigment particles in the pigment dispersion is 0.01 μm to 0.2 μm.

[6] A method for preparing a pigment dispersion including an azo pigment or a tautomer thereof represented by following Formula (1) and having characteristic X-ray diffraction peaks at Bragg angles (2θ±0.2°) of 4.8°, 7.2° and 9.7° in a CuKα characteristic X-ray diffraction, the method including: a step of dispersing an amorphous azo pigment represented by the following Formula (1) or an azo pigment represented by the following Formula (1) and having characteristic X-ray diffraction peaks at Bragg angles (2θ±0.2°) of any one of the following (A) to (G) in the CuKα characteristic X-ray diffraction:

(A) 6.5°, 7.1° and 21.8°;
(B) 6.3°, 6.4° and 22.3°;
(C) 5.9° and 7.0°;
(D) 4.8°, 7.2° and 9.7°;
(E) 4.9°, 8.9° and 13.1°;
(F) 6.6°, 9.2°, 10.3°, 21.4° and 25.6°; and
(G) 4.8°, 9.2° and 13.0°:

Formula (1)

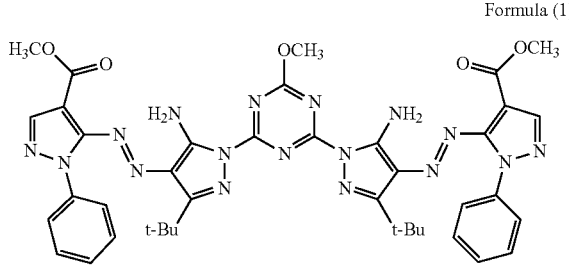

[7] Further, the method described in [6], further including: a step of subjecting the amorphous azo pigment represented by Formula (1) or the azo pigment represented by Formula (1) and having characteristic X-ray diffraction peaks at Bragg angles (2θ±0.2°) of any one of (A) to (G) in the CuKα characteristic X-ray diffraction to solvent heating treatment.

[8] In addition, the method described in [6] or [7], further including: a step of subjecting the amorphous azo pigment represented by Formula (1) or the azo pigment represented by Formula (1) and having characteristic X-ray diffraction peaks at Bragg angles (2θ±0.2°) of any one of (A) to (G) in the CuKα characteristic X-ray diffraction to grinding treatment.

[9] The method described in [8], in which the grinding treatment is a solvent salt milling.

[10] A coloring composition containing the pigment dispersion described in any one of [1] to [5].

[11] An inkjet recording ink containing the pigment dispersion described in any one of [1] to [5] or the coloring composition described in [10].

Advantageous Effects of Invention

According to the present invention, provided are a dispersion of an azo pigment with a novel crystal form, which has excellent color characteristics such as hue, excellent light resistance, and particularly, excellent storage stability of the pigment dispersion, and in which pyrazole rings having a specific substituent are connected through an azo group and a triazine ring, and a coloring composition. Further, an inkjet recording ink having excellent storage stability of a pigment dispersion is provided by the coloring composition.

In addition, provided is a method for preparing the dispersion of the azo pigment, which may prepare the azo pigment with good reproducibility and high efficiency while controlling the azo pigment in a specific crystal form.

DESCRIPTION OF EMBODIMENTS

Figure 1:
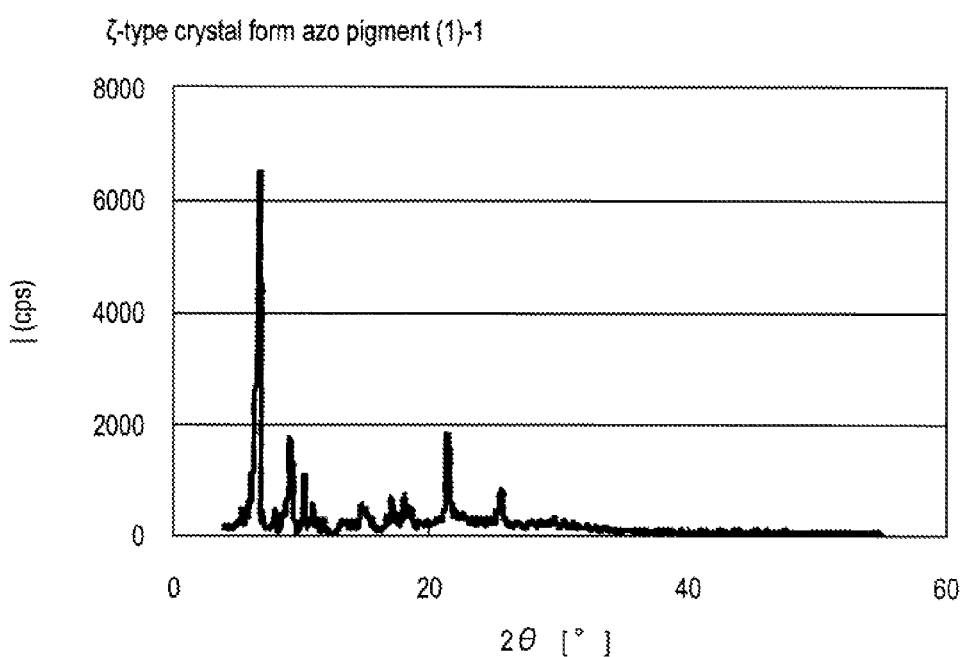
FIG. 1 is a view of an X-ray diffraction of a ζ-type crystal form azo pigment (1)-1, which is synthesized according to Synthesis Example 1.

Hereinafter, the present invention will be described in detail.

An azo pigment or a tautomer thereof used in the present invention may be a hydrate thereof or a solvate thereof, or a salt thereof.

In the present specification, the azo pigment represented by Formula (1) and having characteristic X-ray diffraction peaks at Bragg angles (2θ±0.2°) of 4.8°, 7.2° and 9.7° in the CuKα characteristic X-ray diffraction will be hereinafter referred to as an δ-type crystal form azo pigment.

In the present specification, the azo pigment represented by Formula (1) and having characteristic X-ray diffraction peaks at Bragg angles (2θ±0.2°) of 6.5°, 7.1° and 21.8° in the CuKα characteristic X-ray diffraction will be hereinafter referred to as an α-type crystal form azo pigment.

The azo pigment represented by the following Formula (1) and having characteristic X-ray diffraction peaks at Bragg angles (2θ±0.2°) of 6.3°, 6.4° and 22.3° in the CuKα characteristic X-ray diffraction will be referred to as a α-type crystal form azo pigment.

The azo pigment represented by Formula (1) and having characteristic X-ray diffraction peaks at Bragg angles (2θ±0.2°) of 5.9° and 7.0° in the CuKα characteristic X-ray diffraction will be referred to as a γ-type crystal form azo pigment.

The azo pigment represented by Formula (1) and having characteristic X-ray diffraction peaks at Bragg angles (2θ±0.2°) of 4.9°, 8.9° and 13.1° in the CuKα characteristic X-ray diffraction will be referred to as an ε-type crystal form azo pigment.

The azo pigment represented by Formula (1) and having characteristic X-ray diffraction peaks at Bragg angles (2θ±0.2°) of 6.6°, 9.2°, 10.3°, 21.4° and 25.6° in the CuKα characteristic X-ray diffraction will be referred to as ζ-type crystal form azo pigment.

The azo pigment represented by Formula (1) and having characteristic X-ray diffraction peaks at Bragg angles (2θ±0.2°) of 4.8°, 9.2° and 13.0° in the CuKα characteristic X-ray diffraction will be referred to as an η-type crystal form azo pigment.

TABLE 1

| | Characteristic X-ray diffraction peaks at |
|---|---|
| α-type crystal form azo pigment | 6.5°, 7.1° and 21.8° |
| β-type crystal form azo pigment | 6.3°, 6.4° and 22.3° |
| γ-type crystal form azo pigment | 5.9° and 7.0° |
| δ-type crystal form azo pigment | 4.8°, 7.2° and 9.7° |
| ε-type crystal form azo pigment | 4.9°, 8.9° and 13.1° |
| ζ-type crystal form azo pigment | 6.6°, 9.2°, 10.3°, 21.4° and 25.6° |
| η-type crystal form azo pigment | 4.8°, 9.2° and 13.0° |

In the present invention, X-ray diffractions of the α-type, β-type, γ-type, δ-type, ε-type, ζ-type and η-type crystal form azo pigments, which are represented by Formula (1), may be measured in accordance with the Japanese Industrial Standard JISK0131 (General Rule of X-ray Diffractiometry) using a powder X-ray diffractometer RINT 2500 (manufactured by Rigaku Corporation).

[Pigment Dispersion]

An azo pigment according to the present invention includes an azo pigment or a tautomer thereof represented by the following Formula (1) and having characteristic X-ray diffraction peaks at Bragg angles (2θ±0.2°) of 4.8°, 7.2° and 9.7° in a CuKα characteristic X-ray diffraction.

Formula (1)

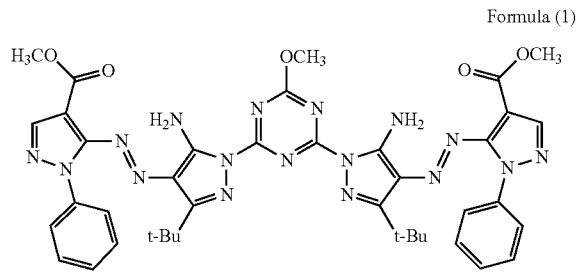 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

A volume average particle diameter of the particles in the pigment dispersion is preferably 10 nm to 200 nm, more preferably 15 nm to 200 nm, still more preferably 20 nm to 150 nm, and most preferably 25 nm to 130 nm. When the volume average particle diameter of the particles in the pigment dispersion is 10 nm or more, stability of dispersions over time is enhanced, and it is difficult for the dispersion to be aggregated, which is preferred. In addition, when the volume average particle diameter of the particles is 200 nm or less, the optical concentration is increased, and the concentration of a printed matter is increased, and thus it is difficult for clogging at a nozzle to occur during printing in an inkjet and the like, which is preferred.

Further, the volume average particle diameter of the pigment particles indicates the particle diameter of the pigment itself, or when an additive such as a dispersing agent is attached to the pigment, the particle diameter of the particle to which the additive is attached. In the present invention, a Nanotrac UPA particle size distribution analyzer (UPA-EX150, manufactured by NIKKISO Co., Ltd.) may be used in a device for measuring the volume average particle diameter of the pigment. The measurement may be performed according to a predetermined measurement method after placing 3 ml of a pigment dispersion in a measurement cell. In addition, as for the parameter input during the measurement, the ink viscosity is used for the viscosity, and the density of the pigment is used for the density of dispersed particles.

The crystal form of the azo pigment or the tautomer thereof represented by Formula (1), which may be used in the preparation of the pigment dispersion of the present invention, is not particularly limited, but any azo pigment represented by Formula (1) may be used, and the amorphous azo pigment represented by Formula (1) or any one of the α- to η-type crystal form azo pigments may be preferably used. The pigment dispersion including the δ-type crystal form azo pigment according to the present invention is obtained by dispersing the amorphous azo pigment represented by Formula (1) or any one of the α- to η-type crystal form azo pigments and an aqueous or non-aqueous medium by means of a dispersing device.

It is preferred that any one of the α-type crystal form azo pigment, the ε-type crystal form azo pigment, and the δ-type crystal form azo pigment and an aqueous or non-aqueous medium are dispersed using a dispersing device, and it is more preferred that the α-type crystal form azo pigment and an aqueous or non-aqueous medium are dispersed using a dispersing device.

Since the crystal form is the most stable crystal form, it is difficult for a change in crystal form and the like over time to occur, and it is difficult for a change in color or discoloration due to a change in crystal to occur even over the long period of time. For that reason, an effect that weatherability in the outdoor use is excellent is exhibited.

When an azo pigment obtained by drying the pigment dispersion of the present invention at room temperature is subjected to X-ray diffraction measurement, the azo pigment has characteristic X-ray diffraction peaks at Bragg angles (2θ±0.2°) of 4.8°, 7.2° and 9.7° in the CuKα characteristic X-ray diffraction.

That is, it means that the azo pigment or the tautomer thereof represented by Formula (1) is a crystal form azo pigment, other than the δ-type crystal form azo pigment, before dispersion, but becomes a dispersion in which the δ-type crystal form azo pigment is dispersed, after dispersion. This is thought to be due to the fact that when the azo pigment or the tautomer thereof represented by Formula (1) is dispersed in an aqueous or non-aqueous medium, crystal transformation occurs during the dispersion.

The content of the δ-type crystal form azo pigment in the pigment dispersion of the present invention is preferably in a range of 1% by mass to 50% by mass, and more preferably in a range of 2% by mass to 30% by mass. When the content is 1% by mass or more, a sufficient image concentration may be obtained when a pigment dispersion is used alone as ink. When the content is 50% by mass or less, dispersion stability may be suppressed from deteriorating.

The pigment dispersion of the present invention may further include at least one selected from the α-type crystal form azo pigment, the β-type crystal form azo pigment, the γ-type crystal form azo pigment, the ε-type crystal form azo pigment, the ζ-type crystal form azo pigment, the η-type crystal form azo pigment and the δ-type crystal form azo pigment, and preferably includes at least one selected from the α-type crystal form azo pigment and the s-type crystal form azo pigment.

The concentration of the pigment included in the pigment dispersion of the present invention is preferably in a range of 1% by mass to 35% by mass, and more preferably in a range of 2% by mass to 25% by mass. When the concentration is 1% by mass or more, a sufficient image concentration may be obtained when a pigment dispersion is used alone as an ink. When the concentration is 35% by mass or less, dispersion stability may be suppressed from deteriorating.

1. Pigment

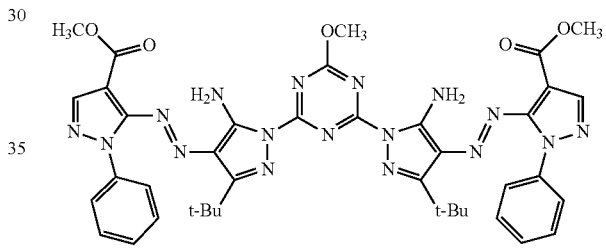

When the azo pigment is in a single crystal form, a distance between molecules is so close that intermolecular interaction becomes strong. As a result, solvent resistance, heat stability, light resistance, gas resistance, and print density are increased, and furthermore, a color reproducible region is expanded. Further, the pigment dispersion of the present invention, in which the pigment is dispersed, may provide a printed matter having excellent storage stability of the pigment dispersion. Among them, as the crystal form having excellent storage stability of the pigment dispersion, the azo pigment and the tautomer thereof, in which the azo pigment before dispersion is represented by Formula (1), are preferably a crystal form azo pigment having characteristic X-ray diffraction peaks at Bragg angles (2θ±0.2°) of 4.8°, 7.2° and 9.7° in the CuKα characteristic X-ray diffraction.

For the crystal form having characteristic X-ray diffraction peaks at 4.8°, 7.2° and 9.7°, a crystal form showing an X-ray diffraction pattern having significant X-ray diffraction lines at 4.8°, 7.2°, 9.7°, 17.4° and 20.1° is more preferred. Among them, a crystal form showing an X-ray diffraction pattern having significant X-ray diffraction lines at 4.8°, 7.2°, 9.5°, 9.7°, 10.7°, 17.4°, 19.0°, 20.1° and 26.8° is most preferred.

The reason that the dispersion including the azo pigment represented by Formula (1) and having characteristic X-ray diffraction peaks at 4.8°, 7.2° and 9.7° has excellent storage stability of the pigment dispersion is thought that since the azo pigment is the most stable crystal form, intermolecular interaction is the densest. For that reason, it is thought to be due to the fact that molecules excited by absorbing light may easily return to the ground state.

The pigment represented by Formula (1) may be a solvate including a hydrate or a solvent (examples thereof include alcohols such as methanol, ethanol, 2-propanol and t-butyl alcohol, ketones such as acetone and methyl ethyl ketone, an aprotic solvent such as acetonitrile, dimethylsulfoxide, dimethylformamide, dimethylacetamide, N-methyl-2-pyrrolidone and toluene, and acetone is preferred) including water molecules in the crystal.

In addition, for the pigment represented by Formula (1), the tautomer (for example, a tautomer of azo-hydrazone) as in Scheme (1) or a geometric isomer represented by Scheme (2) is also included in the general formulae in the present invention.

-continued

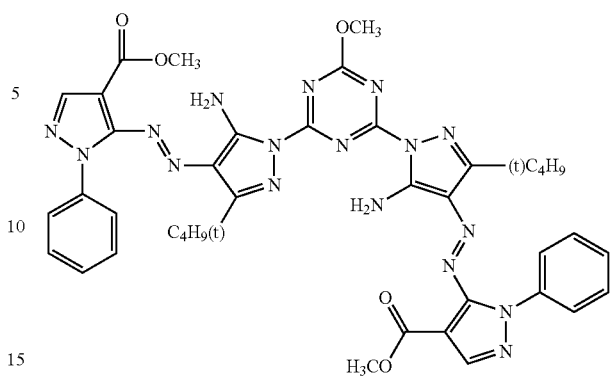

Scheme (1)

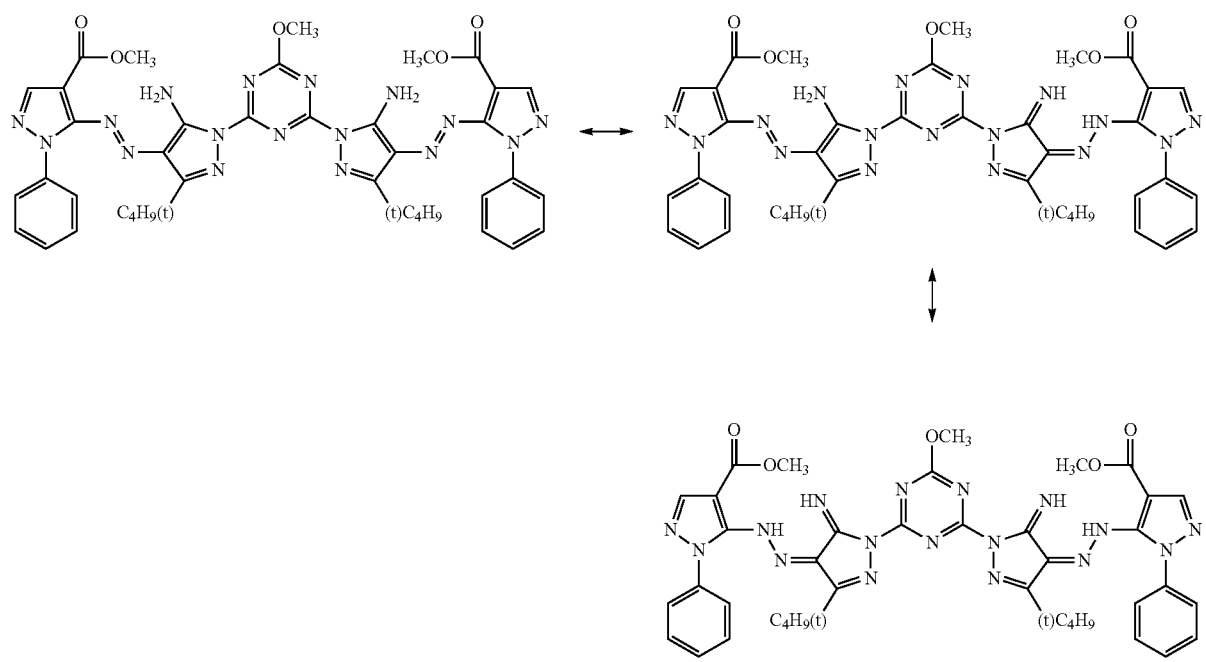

Scheme (2)

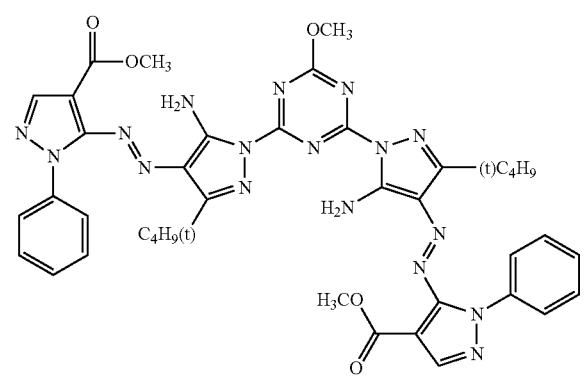

-continued

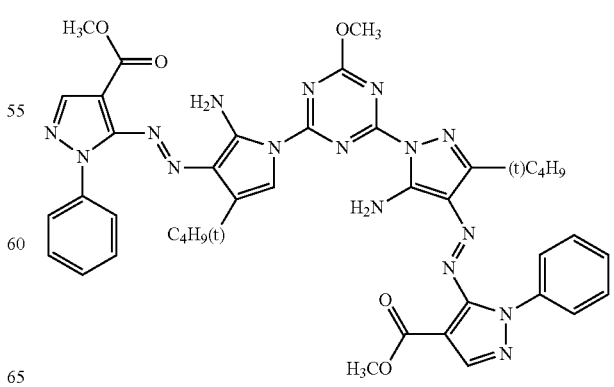

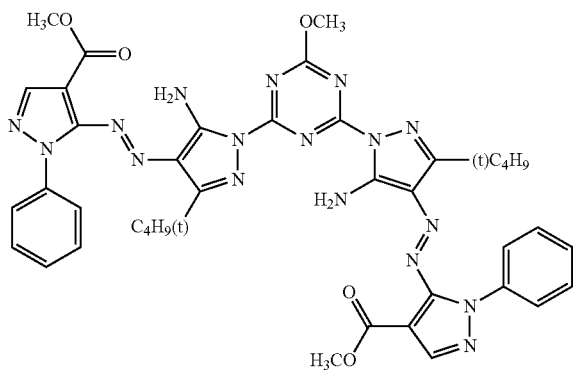

When primary particles are observed under a transmission microscope, the length in a long axis direction is preferably 0.01 μm to 50 μm. When the length is 0.01 μm or more, fastness to light or ozone is excellent so that aggregation is suppressed and dispersibility is enhanced. Meanwhile, when the length is 50 μm or less, it is difficult for the particles to be in a hyperdispersed state when the particles are dispersed so as to obtain a desired volume average particle diameter, so that aggregation is easily suppressed, and the storage stability of pigment dispersions is excellent.

When the length of the primary particles in a long axis direction is within the aforementioned range, the primary particles show high fastness to light or ozone, and the pigment dispersion thereof has excellent storage stability, which is preferred.

For that reason, when the primary particles of the δ-type crystal form azo pigment represented by the following Formula (1) are observed under a transmission microscope, the length in a long axis direction is preferably 0.01 μm to 50 μm, more preferably 0.02 μm to 20 μm, and most preferably 0.03 μm to 10 μm.

Hereinafter, synthesis of the α-type crystal form azo pigment, the β-type crystal form azo pigment, the γ-type crystal form azo pigment, the δ-type crystal form azo pigment, the ε-type crystal form azo pigment, the ζ-type crystal form azo pigment, the η-type crystal form azo pigment and the θ-type crystal form azo pigment, which are represented by Formula (1), will be described in detail.

The azo pigment represented by Formula (1) (hereinafter, simply referred to as "azo pigment" or "pigment" in some cases) may be synthesized by the following preparation method.

A method for preparing the azo pigment represented by Formula (1) includes a step of subjecting a diazonium salt derived from a heterocyclic amine represented by the following Formula (2) and a compound represented by the following Formula (3) to azo coupling reaction.

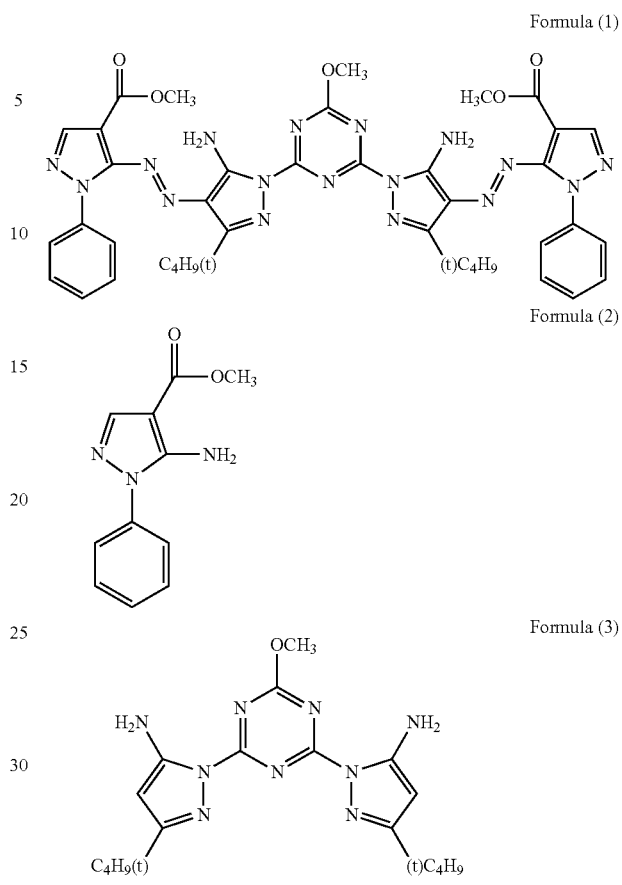

Hereinafter, a method for preparing the azo pigment represented by Formula (1) will be described in detail.

The method for preparing an azo pigment represented by Formula (1) includes a step of obtaining a crude azo pigment and a step of transforming the crude azo pigment into a crystal form azo pigment by subjecting the crude azo pigment to solvent treatment.

The method for preparing a crude azo pigment includes (a) a step of mixing a diazotizing agent with a heterocyclic amine represented by Formula (2), and (b) a step of performing a reaction by mixing a reaction product obtained in step (a) with a compound represented by Formula (3), and obtaining a solution in which at least a part of an azo compound produced by the reaction and represented by Formula (1) is dissolved, and (c) a step of crystallizing the pigment represented by Formula (1) by mixing the solution obtained in step (b) with a poor solvent for the azo compound represented by Formula (1).

Step (a) according to the present invention will be described in detail.

In step (a), a diazonium compound is derived by a reaction of a heterocyclic amine represented by Formula (2) with a diazotizing agent by mixing a diazotizing agent with a heterocyclic amine represented by Formula (2). It is preferred that this reaction is performed in a medium including an acid. In the present specification, a liquid including the diazonium compound is referred to as "diazonium compound liquid preparation". The method of mixing the heterocyclic amine represented by Formula (2) with the acid and the diazotizing agent is not particularly limited, but it is preferred that the diazotizing agent is added to a solution of the heterocyclic amine represented by Formula (2) and the acid. The diazotizing agent in step (a) is used to derive the heterocyclic amine represented by Formula (2) into the diazonium compound, and is not limited as long as the diazotizing agent has such an action. Representative examples of the diazotizing agent include nitrite esters (examples thereof include isopentyl nitrite), nitrite salts (examples thereof include sodium nitrite or potassium nitrite), isoamyl nitrite and nitrosylsulfuric acid, the diazotizing agent is more preferably sodium nitrite, potassium nitrite and nitrosylsulfuric acid, and among them, nitrosylsulfuric acid is particularly preferred from the viewpoint that the diazonium compound may be stably and efficiently prepared.

The acid used in step (a) means an acid which may even slightly dissolve the heterocyclic amine even though the acid does not completely dissolve the heterocyclic amine represented by Formula (2), and is preferably an acid which completely dissolves an amino compound. As the acid, an inorganic acid and an organic acid may be used, and examples of the inorganic acid include hydrochloric acid, phosphoric acid and sulfuric acid, and the inorganic acid is preferably phosphoric acid and sulfuric acid, and more preferably sulfuric acid. Examples of the organic acid include formic acid, acetic acid, propionic acid and methanesulfonic acid, and the organic acid is preferably acetic acid, propionic acid and methanesulfonic acid, and more preferably acetic acid and propionic acid. Further, these acids may be used either alone or in a mixture thereof. Examples of a mixed acid include phosphoric acid/acetic acid, sulfuric acid/acetic acid, methanesulfonic acid/acetic acid and acetic acid/propionic acid, the mixed acid is preferably phosphoric acid/acetic acid, sulfuric acid/acetic acid, sulfuric acid/acetic acid/propionic acid and acetic acid/propionic acid, and among them, sulfuric acid/acetic acid and acetic acid/propionic acid are particularly preferred. The mass ratio of these mixed acids is preferably 1/(0.1 to 20), more preferably 1/(0.5 to 10), and still more preferably 1/(1 to 10).

In step (a), the amount of acid added to the heterocyclic amine represented by Formula (2) is, in terms of mass ratio, 1 time to 100 times, more preferably 2 times to 50 times, and still more preferably 3 times to 25 times. When the mass ratio is 1 time or more, stirrability is improved so that the diazonium compound may be derived more securely. On the contrary, when the mass ratio is 100 times or less, productivity is enhanced so that economic efficiency is improved.

Further, in step (a), the amount of the diazotizing agent added to the heterocyclic amine represented by Formula (2) is, in terms of molar ratio, 1.0 time to 20 times, more preferably 1.0 time to 10 times, and still more preferably 1.0 time to 5 times. When the amount of the diazotizing agent to the amino compound is, in terms of molar ratio, 1 time or more, the diazonium compound may be derived more securely, and when the amount is 20 times or less, it is possible to suppress the diazonium compound from being decomposed by a side reaction.

The mixing of the diazotizing agent with the heterocyclic amine represented by Formula (2) in step (a) is performed preferably at 50° C. or less, more preferably at 40° C. or less, and still more preferably at 30° C. or less. When the diazo solution is prepared at a temperature more than 50° C., there is a concern in that the diazotizing agent may be decomposed. A stirring time to derive the heterocyclic amine into the diazonium compound is preferably 0.3 to 10 hours, more preferably 0.5 to 5 hours, and still more preferably 1 to 3 hours. When the stirring time is 0.3 hours or more, it is easy to completely derive the heterocyclic amine into the diazonium compound, and when the stirring time is 10 hours or less, it is difficult for the diazonium compound to be decomposed. In addition, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is 30 rpm or more in terms of the number of revolutions, the stirring efficiency of the diazonium compound liquid preparation is improved, and therefore, a desired reaction may proceed securely.

The solvent which may be mixed in step (a) is not particularly limited as long as the diazonium compound derived is not decomposed. Examples of the solvent which may be mixed include a hydrocarbon-based solvent such as hexane, benzene and toluene, an ether-based solvent such as diethyl ether and tetrahydrofuran, a ketone-based solvent such as acetone and methyl ethyl ketone, an amide-based solvent such as dimethylformamide, dimethylacetamide, pyrrolidone and N-methyl-2-pyrrolidone, and dimethylsulfoxide, sulfolane, acetonitrile and water.

A preferred pH of the diazonium compound liquid preparation in step (a) is preferably 7 or less, more preferably 5 or less, and still more preferably 3 or less. When the pH of the diazonium compound liquid preparation in step (a) is 7 or more, there is a concern in that the diazonium compound derived may be decomposed.

Next, step (b) according to the present invention will be described in detail.

Step (b) is a step of mixing the reaction product obtained in step (a) with a compound represented by Formula (3) for a reaction to occur, and obtaining a solution in which at least a part of an azo compound produced by the reaction and represented by Formula (1) is dissolved.

In the present specification, the solution in which at least a part of the azo compound is dissolved is referred to as "an azo compound dissolved solution".

Examples of a method of preparing the azo compound dissolved solution include (i) a method of obtaining the azo compound dissolved solution including: performing a coupling reaction by mixing the reaction product obtained in step (a) with the compound represented by Formula (3), and as a result of the reaction, dissolving the precipitated azo pigment represented by Formula (1) in a solvent, and (ii) a method of obtaining the azo compound dissolved solution including: performing the coupling reaction such that at least a part of the compound obtained by the coupling reaction and represented by Formula (1) is dissolved in a reaction solution, and adopting the resulting reaction solution as the azo compound dissolved solution as it is, or a method of obtaining the azo compound dissolved solution including: further dissolving a (crystallized) azo pigment, which is obtained by applying the thus-obtained azo compound dissolved solution to step (c) to be described below in detail in a solvent.

In any of types (i) and (ii), a method of mixing the diazonium compound liquid preparation obtained in step (a) with a compound represented by Formula (3) is not particularly limited, but it is preferred that the compound represented by Formula (3) is dissolved in a solvent and the resulting solution is added to the liquid preparation, and it is more preferred that a solution of the compound represented by Formula (3) is added to the diazonium compound liquid preparation obtained in step (a).

Further, the amount of the diazonium compound in the diazonium compound liquid preparation obtained in step (a) to the compound represented by Formula (3) in step (b) is preferably 0.8 to 3 equivalents to the coupling position of the compound represented by Formula (3), more preferably 0.9 to 2 equivalents to the coupling position, and still more preferably 0.95 to 1.5 equivalents to the coupling position. When the amount is 0.8 equivalents or more, a coupling component having an unreacted coupling position may be suppressed from remaining, and when the amount is 3 equivalents or less, an unreacted diazonium compound may be suppressed from remaining, and therefore, the amount range is more economical.

Further, in type (ii), since at least a part of the azo compound represented by Formula (1) is being dissolved in step (b), the coupling reaction proceeds more smoothly, thereby preparing a high-purity azo compound. The reason is assumed as follows. Since there are two coupling positions, for example, only one coupling position goes through a reaction intermediate which is reacted. When the reaction intermediate is precipitated into the reaction system, the reaction rate of the second coupling reaction is slowed down. Meanwhile, since the diazonium compound is unstable, there is a concern in that decomposition may occur when a long time elapses. Accordingly, it is important to allow the coupling reaction to proceed fast, and consequently, the type (ii) preparation method, which does not produce a precipitate in step (b), is more suitable for preparing a high-purity pigment.

In step (b), the coupling component may be added without using a solvent, or may be added by being mixed with a solvent, but it is preferred that the coupling component is added without using the solvent. In step (b), when a solvent is used in the coupling component, the solvent is not particularly limited, but is preferably a solvent which allows type (ii) to be used, that is, a solvent by which it is possible to obtain a solution in which at least a part of the azo compound produced after the reaction and represented by the general Formula (1) is dissolved.

In the case of type (i), that is, when the pigment is precipitated, as an example of the solvent, water, an organic acid, an inorganic acid and an organic solvent may be used, and an organic solvent is particularly preferred, and a solvent causing no liquid separation phenomenon during reaction and providing a uniform solution with the solvent is preferred. Examples thereof include water, an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the organic solvent may be a glycol-based solvent having two or more hydroxyl groups in the solvent molecule, an alcohol-based solvent having 3 or less carbon atoms, or a ketone-based solvent having a total carbon number of 5 or less, preferably an alcohol solvent having 2 or less atoms (for example, methanol and ethylene glycol) and a ketone-based solvent having a total carbon number of 4 or less (for example, acetone and methyl ethyl ketone). Further, a mixed solvent of these solvents is also included in the organic solvent.

In addition, in the case of type (ii), that is, when a coupling reaction is performed such that at least a part of the compound represented by Formula (1) is dissolved in the reaction solution, examples of the solvent include an alcohol-based solvent such as methanol, isopropanol and ethylene glycol, a ketone-based solvent such as acetone and methyl ethyl ketone, an organic acid solvent such as acetic acid, propionic acid and methanesulfonic acid, an inorganic acid solvent such as sulfuric acid, hydrochloric acid and phosphoric acid, an amide-based solvent such as dimethylformamide, dimethylacetamide, pyrrolidone and N-methyl-2-pyrrolidone, dimethylsulfoxide, sulfolane, and acetonitrile. Among them, a ketone-based solvent such as acetone and methyl ethyl ketone, an organic acid solvent such as acetic acid, propionic acid and methanesulfonic acid, and an inorganic acid solvent such as sulfuric acid, hydrochloric acid and phosphoric acid are preferred, an acidic solvent of organic acid or inorganic acid is more preferred, and acetic acid, methanesulfonic acid, phosphoric acid and sulfuric acid are most preferred. Further, a mixed solvent of the aforementioned solvents is also suitable.

Particularly, in the case of type (ii), in step (b), it is preferred that an acidic solution obtained by dissolving or suspending the coupling component in an acidic solvent is mixed with the reaction product obtained in step (a), or the coupling component is added to the reaction product obtained in step (a) without using a solvent. Particularly, it is preferred that the acidic solvent is a solvent including at least one of acetic acid and sulfuric acid.

In any of types (i) and (ii), the preferred amount of the solvent added is, in terms of mass ratio, preferably 0.5 times to 200 times, more preferably 1 time to 100 times, and still more preferably 1 time to 50 times, based on the coupling component. As for the preferred amount of the solvent added based on the coupling component, when the mass ratio is less than 0.5 times, it is difficult to stir the coupling component and the solvent in a preparation machine and a desired reaction does not proceed. Further, the case where the mass ratio is more than 200 times is not economical.

When the preparation method of the azo compound dissolved solution is type (i) or when the preparation method of the azo compound dissolved solution is type (ii) and an azo pigment, which is obtained by applying the coupling reaction solution in which at least a part of the compound represented by Formula (1) is dissolved to step (c), is further dissolved in the solvent to prepare an azo compound dissolved solution, the solvent for dissolving the obtained azo pigment is not particularly limited as long as the solvent may dissolve at least a part of the azo pigment, but examples thereof include the preferred examples of the solvent previously described in type (ii).

As for the azo compound dissolved solution obtained in step (b), the ratio of the azo compound represented by Formula (1), which is dissolved in the azo compound dissolved solution to the total amount of the azo compound produced by step (b) (the sum of the azo compound represented by Formula (1), which is dissolved in the azo compound dissolved solution and the azo pigment represented by Formula (1), which is precipitated from the azo compound dissolved solution) is preferably 50% by mass or more, more preferably 75% by mass or more, still more preferably 90% by mass or more, and most preferably 100% by mass (a state where the azo compound produced in step (b) is completely dissolved in the reaction solution), and accordingly, the particle diameter of the pigment tends to be reduced further.

In step (b), the mixing of the diazonium compound liquid preparation of step (a) and the coupling component is preferably performed at a temperature of 50° C. or less, more preferably 30° C. or less, and still more preferably 25° C. or less. When the mixing temperature is more than 500° C., there is a concern in that the diazonium compound derived in step (a) and the produced azo compound represented by formula (1) may be decomposed. In addition, a typical stirrer is used in the mixing, and the stirrer is not particularly limited. The number of revolutions of the stirring may be different depending on the manufacturing facility in some cases, but is preferably 30 rpm to 300 rpm, more preferably 40 rpm to 200 rpm, and still more preferably 50 rpm to 200 rpm. When the stirring speed is less than 30 rpm in terms of the number of revolutions, the stirring efficiency of the mixed solution deteriorates, and therefore, a desired reaction may not proceed. The stirring time in step (b) is preferably 0.1 to 10 hours, more preferably 0.3 to 5 hours, and still more preferably 0.3 to 3 hours. When the stirring time is less than 0.1 hour, it is difficult for the pigment to be completely derived, and when the stirring time is more than 10 hours, there is a concern in that the azo compound represented by Formula (1) may be decomposed.

Next, step (c) according to the present invention will be described in detail.

Step (c) is a step of crystallizing a pigment by mixing the azo compound dissolved solution obtained in step (b) with a poor solvent with the azo compound having low solubility therein. The method of mixing the azo compound dissolved solution obtained in step (b) with a poor solvent is not particularly limited, but it is preferred that the azo compound dissolved solution obtained in step (b) is added to a poor solvent and at this time, it is preferred that the poor solvent is in a state of being stirred.

The stirring speed is preferably 100 rpm to 10,000 rpm, more preferably 150 rpm to 8,000 rpm, and particularly preferably 200 rpm to 6,000 rpm. For the addition, a pump or the like may also be used. In this case, either in-liquid addition or out-of-liquid addition may be employed, but in-liquid addition is more preferred. Further, continuous supply into liquid through a supply pipe by using a pump is preferred.

The poor solvent is not particularly limited, but is preferably a poor solvent with the azo compound represented by Formula (1) having a solubility of 1 g/L or less therein, and more preferably a poor solvent with the azo compound represented by Formula (1) having a solubility of 0.1 g/L or less therein. This solubility may be a solubility when the azo compound is dissolved in the presence of an acid or an alkali. As for the compatibility or uniform mixing property between the azo compound dissolved solution obtained in step (b) and the poor solvent, the amount of the azo compound dissolved in a poor solvent is preferably 30% by weight or more, and more preferably 50% by weight or more based on the amount of the azo compound dissolved in a good solvent. In the present specification, the solubility indicates a solubility at 25° C.

Examples of the poor solvent include an aqueous solvent such as water, hydrochloric acid, ammonia water and an aqueous sodium hydroxide solution, an alcohol-based solvent such as methanol, ethanol, isopropyl alcohol and 1-methoxy-2-propanol, a ketone compound solvent such as acetone, methyl ethyl ketone, methyl isobutyl ketone and cyclohexanone, an ether-based solvent such as diethyl ether and tetrahydrofuran, a hydrocarbon-based solvent such as hexane, benzene and toluene, a nitrile-based solvent such as acetonitrile, a halogen-based solvent such as dichloromethane and trichloroethylene, and an ester-based solvent such as ethyl acetate, ethyl lactate and 2-(1-methoxy)propyl acetate, and the poor solvent is preferably an aqueous solvent such as water, hydrochloric acid, ammonia water and an aqueous sodium hydroxide solution, an alcohol-based solvent such as methanol, ethanol, isopropyl alcohol and 1-methoxy-2-propanol, and a ketone compound solvent such as acetone, methyl ethyl ketone, methyl isobutyl ketone and cyclohexanone, and more preferably an aqueous solvent such as water and ammonia water, and an alcohol solvent having 1 to 3 carbon atoms. Further, a mixed solvent of the aforementioned solvents is also suitable. The poor solvent is most preferably one or more solvents selected from the group consisting of water and an alcohol having 1 to 3 carbon atoms.

The mixing ratio between the azo compound dissolved solution obtained in step (b) and the poor solvent is, in terms of volume ratio, preferably 1/50 to 2/3, more preferably 1/40 to 1/2, and particularly preferably 1/20 to 1/2. When the volume ratio is 2/3 or less, sufficient crystallization of a pigment occurs and the reaction yield is increased, and when the volume ratio is 1/50 or more, productivity is enhanced, which is economical.

The temperature at which the azo compound dissolved solution obtained in step (b) is mixed with the poor solvent is not particularly limited, but the mixing is preferably performed at −10° C. to 50° C., more preferably at −5° C. to 30° C., and most preferably at −5° C. to 25° C.

In the mixing of the azo compound dissolved solution obtained in step (b) with the poor solvent, the particle diameter of the pigment produced by precipitation may be controlled by adjusting the Reynolds number. Here, the Reynolds number is a dimensionless number which indicates the flowing state of a fluid and is represented by the following equation.

$$Re = \rho UL/\mu \quad \text{Equation (1):}$$

(In Equation (1), Re represents the Reynolds number, $\rho$ represents the density [kg/m$^3$] of the azo compound dissolved solution obtained in step (b), U represents the relative velocity [m/s] when the azo compound dissolved solution meets the poor solvent, L represents the equivalent diameter [m] of a flow channel or a supply inlet at a portion where the azo compound dissolved solution meets the poor solvent, and $\mu$ represents the viscosity coefficient [Pa·s] of the azo compound dissolved solution.)

The equivalent diameter L refers to the diameter of an equivalent circular tube when a circular tube which is equivalent to the opening diameter or flow channel of a pipe having an arbitrary cross-section shape is envisaged. The equivalent diameter L is represented by the following Equation (2), in which the cross-sectional area of the pipe is designated as A and the wetted perimeter length (circumference) of the pipe or the outer perimeter of the flow channel is designated as p.

$$L = 4A/p \quad \text{Equation (2):}$$

The relative velocity U when the azo compound dissolved solution meets the poor solvent is defined as the relative velocity in a direction perpendicular to a surface of the portion where the two liquids meet each other. That is, for example, in the case of mixing by injecting the azo compound dissolved solution into the poor solvent which is stationary, the velocity of injecting from the supply inlet is identical to the relative velocity U. The value of the relative velocity U is not particularly limited, but for example, the value is preferably set to 0.5 m/s to 100 m/s, and more preferably to 1.0 m/s to 50 m/s.

The density $\rho$ of the azo compound dissolved solution is a value which is determined depending on the type of the selected material, but it is practical that p is, for example, 0.8 kg/m$^3$ to 2.0 kg/m$^3$. In addition, the viscosity coefficient $\mu$ of the azo compound dissolved solution is also a value which is determined depending on the material used, the environment temperature and the like, but for example, a value of 0.5 mPa·s to 100 mPa·s is preferred, and a value of 1.0 mPa·s to 50.0 mPa·s is more preferred.

A smaller value of the Reynolds number is likely to form a laminar flow, and a larger value is likely to form a turbulent flow. For example, the particle diameter of the pigment nanoparticles may be obtained while being controlled by adjusting the Reynolds number to 60 or more, and it is preferred to adjust the Reynolds number to 100 or more, and more preferably to 150 or more. The Reynolds number has no particular upper limit, but pigment particles having a desired average particle diameter may be obtained while being controlled by adjusting and controlling the Reynolds number, for example, in a range of 100,000 or less. In this case, within the aforementioned range, pigment particles having a smaller particle diameter may be obtained while being controlled usually by increasing the Reynolds number.

When the primary particles of the crude azo pigment particle obtained by the preparation method of the present invention are observed under a transmission microscope, the length in a long axis direction is preferably 1 nm to 10 μm, more preferably 5 nm to 5 μm, still more preferably 10 nm to 1 μm, and particularly preferably 10 nm to 500 nm.

Further, with respect to the particle diameter of the pigment particle, there is a method of digitizing the particle diameter by a measuring technique and expressing the particle diameter in terms of an average size of a group, examples of the size frequently used includes a mode diameter indicating the maximum value of distribution, a median diameter corresponding to the median value in the integral distribution curve, various average diameters (number average, length average, area average, mass average, volume average and the like), and the like, and in the present invention, unless otherwise indicated, the average particle diameter refers to a number average particle diameter.

Examples of the method of measuring the particle diameter of the pigment particle include a microscopic method, a mass method, a light scattering method, a light shielding method, an electric resistance method, an acoustic method, and a dynamic light scattering method, and a microscopic method and a dynamic light scattering method are particularly preferred. Examples of a microscope used in the microscopic method include a scanning electron microscope, a transmission electron microscope and the like. Examples of a particle measuring apparatus using a dynamic light scattering method include Nanotrac UPA-EX150 manufactured by Nikkiso Co., Ltd., Dynamic Light Scattering Photometer DLS-7000 Series manufactured by Otsuka Electronics Co., Ltd., and the like.

The aforementioned preferred average particle diameter of the pigment particle is achieved by appropriately adjusting (1) the temperature in step (c), (2) the solubility of the azo compound for the poor solvent, and (3) the stirring speed (or Reynolds number).

In preparing a liquid dispersion by precipitating crude azo pigment fine particles, at least any one of the azo compound dissolved solution and the poor solvent may contain a dispersing agent. In this case, it is preferred that the dispersing agent is contained into the azo compound dissolved solution. The dispersing agent has actions of (1) quickly being adsorbed to the surface of the precipitated pigment to form fine nanoparticles and (2) preventing these particles from aggregating again.

As the dispersing agent, for example, an anionic, cationic, amphoteric or nonionic, low molecular or polymer dispersing agent may be used.

As for the polymer dispersing agent, the mass average molecular weight thereof is preferably 1,000 to 500,000, more preferably 10,000 to 500,000, and particularly preferably 10,000 to 100,000.

Specific examples thereof include polyvinylpyrrolidone, polyvinyl alcohol, polyvinyl methyl ether, polyethylene glycol, polypropylene glycol, polyacrylamide, a vinyl alcohol-vinyl acetate copolymer, partially formalised polyvinyl alcohol, partially butyralized polyvinyl alcohol, a vinylpyrrolidone-vinyl acetate copolymer, a polyethylene oxide/propylene oxide block copolymer, polyacrylate, polyvinyl sulfate, poly(4-vinylpyridine) salt, polyamide, polyallylamine salt, condensed naphthalenesulfonate, a cellulose derivative, a starch derivative and the like. In addition, natural polymers such as alginate, gelatin, albumin, casein, gum arabic, gum traganth and lignin sulfonate may also be used. Among them, polyvinylpyrrolidone is preferred. These polymer compounds may be used either alone or in combination of two or more thereof, and may also be used by combining a low molecular dispersing agent. The dispersing agent used for dispersion of a pigment is described in detail in "Dispersion Stabilization of Pigment and Surface Treatment Technique Evaluation" (Japan Association for International Chemical Information, published on December 2001), pp. 29 to 46.

Examples of the anionic dispersing agent (anionic surfactant) include an N-acyl-N-alkyltaurine salt, a fatty acid salt, an alkylsulfonic ester salt, alkylbenzenesulfonate, alkylnaphthalenesulfonate, dialkylsulfosuccinate, an alkylphosphonic ester salt, naphthalcnesulfonic acid-formalin condensate, a polyoxyethylene alkylsulfonic ester salt and the like. Among them, an N-acyl-N-alkyltaurine salt is preferred. As the N-acyl-N-alkyltaurine salt, those described in Japanese Patent Application Laid-Open No. H3-273067 are preferred. These anionic dispersing agents may be used either alone or in combination of two or more kinds thereof.

Examples of the cationic dispersing agent (cationic surfactant) include a quaternary ammonium salt, alkoxylated polyamine, aliphatic amine polyglycol ether, aliphatic amine, diamine or polyamine derived from aliphatic amine and aliphatic alcohol, imidazoline derived from an aliphatic acid, and salts of these cationic substances. These cationic dispersing agents may be used either alone or in combination of two or more kinds thereof.

The amphoteric dispersing agent is a dispersing agent having, in the molecule thereof, both an anionic group moiety that is contained in the molecule of the anionic dispersing agent, and a cationic group moiety that is contained in the molecule of the cationic dispersing agent.

Examples of the nonionic dispersing agent (nonionic surfactant) include polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and the like. Among them, polyoxyethylene alkylaryl ether is preferred. These nonionic dispersing agents may be used either alone or in combination of two or more kinds thereof.

The content of the dispersing agent is preferably in a range of 0.1 parts by mass to 1,000 parts by mass, more preferably in a range of 1 part by mass to 500 parts by mass, and still more preferably in a range of 5 parts by mass to 200 parts by mass, based on 100 parts by mass of the pigment. Further, the dispersing agents may be used either alone or in combination of a plurality thereof.

In the preferred aspect of the present invention, the azo compound dissolved solution obtained in step (b) is in a state where the azo compound is completely dissolved in a reaction solution, and it is preferred that water or an alcohol having 1 to 3 carbon atoms, preferably water or methanol is mixed as a poor solvent with the azo compound dissolved solution. A finally desired δ-type crystal form azo pigment having a small particle diameter may be efficiently obtained by preparing a crude azo pigment by the aspect.

By the aforementioned preparation method, the compound represented by Formula (1) is obtained as a crude azo pigment. As a method of obtaining an azo pigment in the form of crystal, a post-treatment is preferably performed. Examples of the method of this post-treatment include a step of controlling the pigment particle by a grinding treatment such as solvent salt milling, salt milling, dry milling, solvent milling and acid pasting, a solvent heating treatment, and the like.

For example, an amorphous azo pigment is precipitated by mixing the azo compound dissolved solution obtained in step (b) with water as a poor solvent, and a δ-type crystal form azo pigment may be obtained by subjecting the amorphous azo pigment to crystal transformation.

A ζ-type crystal form azo pigment is precipitated by mixing the azo compound dissolved solution obtained in step (b) with methanol as a poor solvent, and a β-type, η-type or δ-type crystal form azo pigment may also be obtained by subjecting the ζ-type crystal form azo pigment to crystal transformation.

Hereinafter, crystal transformation will be described.

The crystal transformation in the present invention indicates transforming the crystal form, and before transformation, even an amorphous form may have a crystal form different from the crystal form after transformation. Examples of the method of crystal transformation include the aforementioned post-treatment, a grinding treatment such as solvent salt milling, salt milling, dry milling, solvent milling and acid pasting and a solvent heating treatment are preferred, salt milling, solvent milling and a solvent heating treatment are more preferred, and a solvent heating treatment is particularly preferred.

According to the crystal transformation, a compound may be transformed from an amorphous state to a crystal form, and may also be transformed from one crystal form to another crystal form.

(Solvent Heating Treatment)

The solvent heating treatment in the present invention specifically refers to heating and stirring an amorphous azo compound represented by Formula (1) or a crystalline azo pigment or a salt, hydrate or solvate thereof in a solvent.

A crystal transformation may be efficiently performed by the solvent heating treatment. For example, a δ-type crystal form azo pigment may be obtained by heating and stirring a solvate of an amorphous azo pigment.

For example, a β-type crystal form azo pigment is obtained by subjecting the ζ-type crystal form azo pigment obtained by the aforementioned preparation method to solvent heating treatment, and an α-type crystal form azo pigment may be obtained by desolvating the β-type crystal form azo pigment.

As a solvent used for the solvent heating treatment, a solvent with an azo pigment represented by Formula (1) having low solubility therein after the crystal transformation is preferred from the viewpoint of suppressing the crystal growth.

As the solvent used when the ζ-type crystal form azo pigment is subjected to crystal transformation into a β-type crystal form azo pigment, for example, a ketone-based compound, an aromatic-based compound and acetonitrile are preferred, and among them, examples thereof include a polar aprotic organic solvent such as acetone, methyl ethyl ketone, toluene, acetonitrile, N,N-dimethylformamide, N,N-dimethylacetamide and N-methyl-2-pyrrolidone, or a mixture thereof, and among them, acetone, methyl ethyl ketone, toluene, acetonitrile and N-methyl-2-pyrrolidone are preferred, and acetone is more preferred. An inorganic or organic acid or base may be further added to the solvent exemplified above.

As a solvent when the ζ-type crystal form azo pigment is subjected to crystal transformation into the δ-type crystal form azo pigment, examples thereof include water, methanol, ethanol, isopropanol, isobutanol, ethylene glycol, diethylene glycol, diethylene glycol diethyl ether, diethylene glycol monomethyl ether, dipropylene glycol, acetic acid, propionic acid, sulfuric acid or a mixed solvent thereof, and the solvent is more preferably ethylene glycol, water, acetic acid, sulfuric acid or a mixed solvent thereof, and most preferably ethylene glycol.

The amount of the solvent used in the solvent heating treatment is preferably 1 time to 100 times, more preferably 5 times to 50 times, and still more preferably 8 times to 30 times based on the amount of the amorphous azo compound represented by Formula (1). When the amount is less than 1 time, stirrability may not be secured, which is not preferred. Further, when the amount is more than 100 times, productivity deteriorates, and economic efficiency deteriorates, which is not preferred.

The temperature of heating and stirring in the solvent heating treatment varies depending on the size of the primary particle diameter of a desired pigment, but is preferably 15° C. to 150° C., more preferably 20° C. to 120° C., and still more preferably 20° C. to 100° C. At a low temperature less than 15° C., it takes a long time for a crystal transformation to occur, which is not efficient. On the other hand, at a high temperature more than 150° C., a part of an azo pigment (1) is decomposed, which is not preferred.

The stirring time for crystal transformation is not particularly limited as long as the crystal transformation is occurring, but is preferably 5 minutes to 1,500 minutes, more preferably 10 minutes to 600 minutes, and still more preferably 30 minutes to 300 minutes. When the stirring time is shorter than 5 minutes, partially amorphous moieties are likely to remain, which is not preferred. On the other hand, when the stirring time is longer than 1,500 minutes, the time is inefficient, which is not preferred.

(Desolvation)

An α-type crystal form azo pigment may be obtained by desolvating a β-type crystal form azo pigment.

Examples of a desolvation method include treatment with a solvent which is not solvated with the α-type crystal form azo pigment represented by Formula (1), and drying, the method is preferably drying, and drying under heat and/or reduced pressure is most preferred. In the case of drying by adding heat, the temperature is not particularly limited as long as a solvent is removed at the temperature, and is preferably 40° C. or more, more preferably 60° C. or more, and still more preferably 60° C. to 100° C.

An ε-type crystal form azo pigment may be obtained by desolvating an η-type crystal form azo pigment.

Examples of a desolvation method include treatment with a solvent which is not solvated with the α-type crystal form azo pigment represented by Formula (1), and drying, the method is preferably drying, and drying under heat and/or reduced pressure is most preferred. In the case of drying by adding heat, the temperature is not particularly limited as long as a solvent is removed at the temperature, and is preferably 40° C. or more, more preferably 60° C. or more, and still more preferably 60° C. to 100° C.

(Solvent Salt Milling)

Examples of the solvent salt milling include a method including placing, into a kneading machine, a crude azo pigment, an inorganic salt, and an organic solvent which does not dissolve it, and performing kneading and grinding therein. A water-soluble inorganic salt may be suitably used as the inorganic salt, and it is preferred that for example, an inorganic salt such as sodium chloride, potassium chloride and sodium sulfate is used. In addition, it is more preferred that an inorganic salt having an average particle diameter of 0.5 µm to 50 µm is used. The amount of the inorganic salt used is preferably 3 times by mass to 20 times by mass, and more preferably 5 times by mass to 15 times by mass based on the amount of the rough azo pigment. An aqueous organic solvent may be suitably used as the organic solvent, and since the solvent may easily evaporate due to an increase in temperature at the time of kneading, a solvent having a high boiling temperature is preferred from the viewpoint of safety. Examples of the organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The amount of the aqueous organic solvent used is preferably 0.1 times by mass to 5 times by mass based on the amount of the crude azo pigment. The kneading temperature is preferably 20° C. to 130° C. and particularly preferably 40° C. to 110° C. As the kneading machine, for example, a kneader, a mix Muller or the like may be used.

The α-type crystal form azo pigment represented by Formula (1) according to the present invention may be further subjected to post-treatment, and may be subjected to surface treatment with, for example, a resin, a surfactant, a dispersing agent and the like.

The azo pigment represented by Formula (1) may also be prepared by the following method. That is, the azo pigment represented by Formula (1) may be prepared by modifying a heterocyclic amine represented by the following Formula (2) into diazonium, and

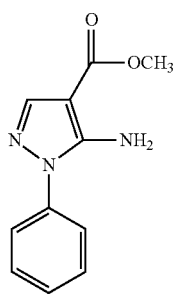

Formula (2)

subsequently, performing a coupling reaction with a compound represented by the following Formula (3).

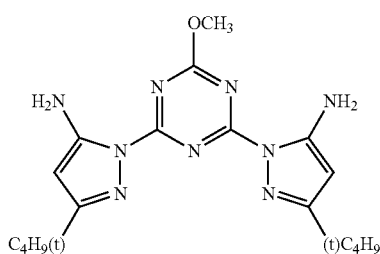

Formula (3)

The azo pigment according to the present invention may be synthesized, for example, by performing an azo coupling reaction between a diazonium salt prepared by an existing method from the diazo component of Formula (2) and the coupling component of Formula (3).

The preparation and coupling reaction of the diazonium salt may be performed by a conventional method.

For the preparation of the diazonium salt of Formula (2), it is possible to apply, for example, a common method of adjusting a diazonium salt by using a nitrosonium ion source, for example, nitrous acid, nitrite or nitrosylsulfuric acid, in a reaction medium containing an acid (for example, hydrochloric acid, sulfuric acid, phosphoric acid, acetic acid, propionic acid, methanesulfonic acid, trifluoromethanesulfonic acid and the like).

More preferred examples of the acid include a case of using acetic acid, propionic acid, methanesulfonic acid, phosphoric acid and sulfuric acid either alone or in combination thereof, and among them, phosphoric acid or a combination use system of acetic acid and sulfuric acid is particularly preferred.

As a preferred example of the reaction medium (solvent), an organic acid and an inorganic acid are preferably used, and in particular, phosphoric acid, sulfuric acid, acetic acid, propionic acid and methanesulfonic acid are preferred, and among them, acetic acid and/or propionic acid are preferred.

As a preferred example of the nitrosonium ion source, it is stable to use nitrosylsulfuric acid in the aforementioned preferred reaction medium containing an acid, and further, the diazonium salt may be efficiently prepared.

The amount of the solvent used is preferably 0.5 times by mass to 50 times by mass, more preferably 1 time by mass to 20 times by mass, and particularly preferably 3 times by mass to 10 times by mass based on the amount of the diazo component of Formula (2).

In the present invention, the diazo component of Formula (2) may be in a state of being dispersed in a solvent, or in a state of a dissolved solution depending on the type of the diazo component.

The amount of the nitrosonium ion source used is preferably 0.95 equivalents to 5.0 equivalents, more preferably 1.00 equivalent to 3.00 equivalents, and particularly preferably 1.00 to 1.10 equivalents with respect to the diazo component.

The reaction temperature is preferably −15° C. to 30° C., more preferably −10° C. to 10° C., and still more preferably −5° C. to 5° C. At less than −15° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

The coupling reaction may be performed in an acidic reaction medium to a basic reaction medium, but is preferably performed in an acidic to neutral reaction medium for the azo pigment of the present invention, and the components may be efficiently derived into the azo pigment by suppressing the decomposition of the diazonium salt particularly when the coupling reaction is performed in an acidic reaction medium.

As a preferred example of the reaction medium (solvent), an organic acid, an inorganic acid and an organic solvent may be used, and an organic solvent is particularly preferred, and a solvent causing no liquid separation phenomenon during reaction and providing a uniform solution with the solvent is preferred. Examples thereof include an alcoholic organic solvent such as methanol, ethanol, propanol, isopropanol, butanol, t-butyl alcohol and amyl alcohol, a ketone-based organic solvent such as acetone and methyl ethyl ketone, a diol-based organic solvent such as ethylene glycol, diethylene glycol, triethylene glycol, propylene glycol, dipropylene glycol and 1,3-propanediol, an ether-based organic solvent such as ethylene glycol monomethyl ether, ethylene glycol monoethyl ether and ethylene glycol diethyl ether, tetrahydrofuran, dioxane, acetonitrile and the like. These solvents may be a mixed solution of two or more kinds thereof.

The solvent is preferably an organic solvent having a polarity parameter (ET) value of 40 or more. Among them, the solvent may be a glycol-based solvent having two or more hydroxyl groups, or an alcohol-based solvent having 3 or less carbon atoms, and preferably an alcohol solvent (for example, methanol and ethylene glycol) having 2 or less carbon atoms, in a solvent molecule. Further, a mixed solvent of these solvents is also included in the organic solvent.

The amount of the solvent used is preferably 1 time by mass to 100 times by mass, more preferably 1 time by mass to 50 times by mass, and still more preferably 2 times by mass to 10 times by mass based on the amount of the coupling component represented by Formula (3).

In the present invention, the coupling component which forms Formula (1) may be in a state of being dispersed in a solvent, or in a state of a dissolved solution depending on the type of the coupling component.

For the amount of the coupling component used, the diazo component is preferably 0.95 equivalents to 5.0 equivalents, more preferably 1.00 equivalent to 3.00 equivalents, and particularly preferably 1.00 to 1.50 equivalents per the azo coupling moiety.

The reaction temperature is preferably −30° C. to 30° C., more preferably −15° C. to 10° C., and still more preferably −10° C. to 5° C. At less than −30° C., the reaction rate is significantly slowed down, and a time for synthesis is significantly increased, which is not economical, and when the synthesis is performed at a high temperature more than 30° C., the amount of a side product produced is increased, which is not preferred.

The reaction time is preferably 30 minutes to 300 minutes, more preferably 30 minutes to 200 minutes, and still more preferably 30 minutes to 150 minutes.

In the method of synthesizing an azo pigment according to the present invention, a product (crude azo pigment) obtained by these reactions may be treated by a typical post-treatment method of an organic synthesis reaction, and then used with or without purification.

That is, for example, a product isolated from the reaction system may be used without purification or by performing a purification operation such as recrystallization and salt formation either alone or in combination.

In addition, after the reaction is completed, the reaction solvent may or may not be removed by distillation, the reaction solution may or may not be neutralized by pouring the reaction solvent in water or ice, and the product isolated or extracted with an organic solvent/aqueous solution may be used without purification or after performing a purification operation such as recrystallization, crystallization and salt formation either alone or in combination.

The synthesizing method of an azo pigment composition according to the present invention will be described in more detail.

The method for preparing an azo pigment according to the present invention includes, in a coupling reaction between a diazonium compound, which is obtained by modifying the heterocyclic amine represented by Formula (2) into diazonium and the compound represented by Formula (3), dissolving the compound of Formula (3) in an organic solvent, and then performing the coupling reaction.

The reaction of modifying the heterocyclic amine represented by Formula (2) into diazonium may be performed, for example, by reacting the heterocyclic amine with a reagent such as sodium nitrite and nitrosylsulfuric acid in an acidic solvent such as sulfuric acid, phosphoric acid and acetic acid at a temperature of 15° C. or less for approximately 10 minutes to 6 hours. It is preferred that the coupling reaction is performed by reacting a diazonium salt obtained by the above-described method and the compound represented by Formula (3) at 40° C. or less, preferably 15° C. or less for approximately 10 minutes to 12 hours.

The tautomerism and/or crystalline polymorphism described above may be controlled by the preparation conditions during the coupling reaction. As the method of preparing the δ-type crystal which is a more preferred type, for example, it is preferred to use the method of the present invention including dissolving the compound represented by Formula (3) one time in an organic solvent, and then subjecting the resulting solution to coupling reaction. Examples of the organic solvent which may be used in this case include an alcohol solvent. As an example of the alcohol solvent, methanol, ethanol, isopropanol, ethylene glycol, diethylene glycol and the like are preferred, and among them, methanol is particularly preferred.

Another method for preparing an azo pigment includes, in a coupling reaction between a diazonium compound obtained by modifying the heterocyclic amine represented by Formula (2) into diazonium and the compound represented by Formula (3), performing the coupling reaction in the presence of a polar aprotic solvent.

The δ-type crystal may be efficiently prepared even by the method of performing the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, a mixed solvent thereof and the like. When these solvents are used, the compound of Formula (3) may or may not be completely dissolved in the solvent.

By the aforementioned preparation method, the compound represented by Formula (1) is obtained as a crude azo pigment, but when the compound is used in the preparation of the pigment dispersion, a post-treatment is preferably performed. Examples of the method of this post-treatment include a step of controlling the pigment particle by a grinding treatment such as solvent salt milling, salt milling, dry milling, solvent milling and acid pasting, a solvent heating treatment, and the like, and a step of performing a surface treatment with a resin, a surfactant, a dispersing agent and the like.

It is preferred that the compound represented by Formula (1) is subjected to solvent heating treatment and/or solvent salt milling as the post-treatment.

The method and conditions of the solvent heating treatment and the solvent salt milling are the same as those described above.

For example, an η-type crystal form or β-type crystal form azo pigment is obtained by subjecting the ζ-type crystal form azo pigment obtained by the aforementioned preparation method to solvent heating treatment, and an ε-type crystal form azo pigment may be obtained by desolvating the η-type crystal form or β-type crystal form azo pigment.

As the solvent used when the ζ-type crystal form azo pigment is subjected to crystal transformation into an η-type crystal form or β-type crystal form azo pigment, for example, a ketone-based compound, an aromatic-based compound, and acetonitrile are preferred, and among them, examples thereof include a polar aprotic organic solvent such as acetone, methyl ethyl ketone, toluene, acetonitrile, N,N-dimethylformamide, N,N-dimethylacetamide and N-methyl-2-pyrrolidone, or a mixture thereof, and among them, acetone, methyl ethyl ketone, toluene, acetonitrile and N-methyl-2-pyrrolidone are preferred, and acetone is more preferred. An inorganic or organic acid or base may be further added to the solvent exemplified above.

Further, a β-type crystal form azo pigment is obtained by subjecting the γ-type crystal form azo pigment obtained by the aforementioned preparation method to solvent heating treatment, and an α-type crystal form azo pigment may be obtained by desolvating the β-type crystal form azo pigment.

As a solvent used when the γ-type crystal form azo pigment is subjected to crystal transformation into the β-type crystal form azo pigment, examples thereof include a solvent used when the ζ-type crystal form azo pigment is subjected to crystal transformation into the η-type crystal form azo pigment, and preferred solvents are also the same.

A δ-type crystal form azo pigment may also be obtained by subjecting the γ-type crystal form azo pigment to solvent heating treatment. As a solvent used when the γ-type crystal form azo pigment is subjected to crystal transformation into the δ-type crystal form azo pigment, examples thereof include water, methanol, ethanol, isopropanol, isobutanol, ethylene glycol, diethylene glycol, diethylene glycol diethyl ether, diethylene glycol monomethyl ether, dipropylene glycol, acetic acid, propionic acid, sulfuric acid or a mixed solvent thereof, and the solvent is more preferably ethylene glycol, water, acetic acid, sulfuric acid or a mixed solvent thereof, and most preferably ethylene glycol.

2. Medium

The pigment dispersion of the present invention may be aqueous or non-aqueous, but is preferably an aqueous pigment dispersion.

A dispersion solvent of the pigment dispersion may be non-polar, but is preferably polar. In the present invention, the dispersion solvent is preferably water, and may include other solvents which may be mixed with water, and preferably a certain quantity (25% by mass or less) of an aqueous solvent. It is preferred that the dispersion solvent is not reacted with a crosslinking agent and a dispersing agent.

The aqueous solvent is preferred since particularly stable fine solid fine particles may be obtained. Preferably, water in the aqueous solvent is included in an amount of 1% to 100% (% by mass), more preferably 10% to 100%, still more preferably 20% to 100%, and particularly preferably 30% to 100%. The others are water-miscible organic solvents as a polar organic solvent.

Examples of the water-miscible organic solvents include alcohols such as methanol, ethanol, propanol, isopropanol, butanol, isobutanol, sec-butanol, t-butanol, pentanol, hexanol, cyclohexanol and benzyl alcohol, polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol, a glycol derivative such as ethylene glycol monomethyl ether, ethylene glycol monoethyl ether, butyl ether of ethylene glycol, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether and ethylene glycol monophenyl ether, an amine such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone and the like.

The pigment dispersion of the present invention may include an aqueous resin. Examples of the aqueous resin include a water-soluble resin which is dissolved in water, a water-dispersible resin which is dispersed in water, a colloidal dispersion resin or a mixture thereof. Specific examples of the aqueous resin include acryl-based resins, styrene-acryl-based resins, polyester-based resins, polyamide-based resins, polyurethane-based resins, fluorine-based resins and the like.

A non-aqueous pigment dispersion is obtained by dispersing the pigment represented by Formula (1) in a non-aqueous vehicle. Examples of a resin used for the non-aqueous vehicle include a petroleum resin, casein, shellac, a rosin-modified maleic acid resin, a rosin-modified phenol resin, nitrocellulose, cellulose acetate butyrate, cyclized rubber, chlorinated rubber, oxidized rubber, hydrochlorinated rubber, a phenol resin, an alkyd resin, a polyester resin, an unsaturated polyester resin, an amino resin, an epoxy resin, a vinyl resin, vinyl chloride, a vinyl chloride-vinyl acetate copolymer, an acrylic resin, a methacrylic resin, a polyurethane resin, a silicone resin, a fluorine resin, a drying oil, a synthesized drying oil, a styrene/maleic acid resin, a styrene/acrylic resin, a polyamide resin, a polyimide resin, a benzoguanamine resin, a melamine resin, urea resin chlorinated polypropylene, a butyral resin, a vinylidene chloride resin and the like. A photocurable resin may be used as a non-aqueous vehicle.

Further, examples of a solvent used in the non-aqueous vehicle include an aromatic solvent such as toluene, xylene and methoxybenzene, an acetic acid ester-based solvent such as ethyl acetate or butyl acetate, propylene glycol monomethyl ether acetate and propylene glycol monoethyl ether acetate, a propionate-based solvent such as ethoxyethyl propionate, an alcohol-based solvent such as methanol and ethanol, an ether-based solvent such as butyl cellosolve, propylene glycol monomethyl ether, diethylene glycol ethyl ether and diethylene glycol dimethyl ether, a ketone-based solvent such as methyl ethyl ketone, methyl isobutyl ketone and cyclohexanone, an aliphatic hydrocarbon-based solvent such as hexane, a nitrogen compound-based solvent such as N,N-dimethylformamide, γ-butyrolactam, N-methyl-2-pyrrolidone, aniline and pyridine, a lactone-based solvent such as γ-butyrolactone, a carbamic acid ester such as a 48:52 mixture of methyl carbamate and ethyl carbamate, and the like.

In the pigment dispersion of the present invention, a surfactant may be used in order to enhance the dispersion of the pigment and the quality of the image. Examples of the surfactant include anionic, non-ionic, cationic and amphoteric surfactants, and any surfactant may be used, but it is preferred that an anionic or non-ionic surfactant is used. Examples of the anionic surfactant include a fatty acid salt, an alkylsulfuric ester salt, alkylbenzenesulfonate, alkylnaphthalenesulfonate, dialkylsulfosuccinate, alkyldiaryl ether disulfonate, alkyl phosphate, polyoxyethylene alkyl ether sulfate, polyoxyethylene alkylaryl ether sulfate, a naphthalenesulfonic acid formalin condensate, a polyoxyethylene alkylphosphoric ester salt, glycerol borate fatty acid ester, polyoxyethylene glycerol fatty acid ester and the like.

Examples of the non-ionic surfactant include polyoxyethylene alkyl ether, polyoxyethylene alkylaryl ether, a polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene alkylamine, fluorine-based and silicone-based surfactants, and the like.

3. Preparation Method

The method for preparing a pigment dispersion according to the present invention is a method for preparing a pigment dispersion including an azo pigment or a tautomer thereof represented by the following Formula (1) and having characteristic X-ray diffraction peaks at Bragg angles (2θ±0.2°) of 4.8°, 7.2° and 9.7° in a CuKα characteristic X-ray diffraction, the method including: a step of dispersing an amorphous azo pigment represented by the following Formula (1) or an azo pigment represented by the following Formula (1) and having characteristic X-ray diffraction peaks at Bragg angles (2θ±0.2°) of any one of the following (A) to (G) in the CuKα characteristic X-ray diffraction:

(A) 6.5°, 7.1° and 21.8°;
(B) 6.3°, 6.4° and 22.3°;
(C) 5.9° and 7.0°;
(D) 4.8°, 7.2° and 9.70;
(E) 4.9°, 8.9° and 13.10;
(F) 6.6°, 9.2°, 10.3°, 21.4° and 25.6°; and
(G) 4.8°, 9.2° and 13.0°.

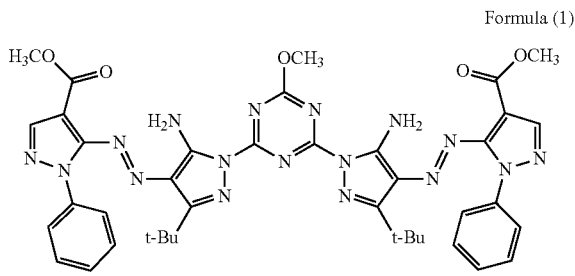 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

That is, the pigment dispersion of the present invention is a method for preparing a dispersion of a δ-type crystal form azo pigment, the method including: a step of dispersing the amorphous azo pigment and any one of the α-type, β-type, γ-type, δ-type, ε-type, ζ-type and η-type crystal form azo pigments, which are represented by Formula (1).

The pigment dispersion of the present invention is obtained by dispersing the azo pigment of Formula (1) and the like and an aqueous or non-aqueous medium by means of a dispersing device.

As the dispersing device, it is possible to use a simple stirrer, an impeller stirring system, an in-line stirring system, a mill system (for example, colloid mill, ball mill, sand mill, bead mill, attritor, roll mill, jet mill, paint shaker, agitator mill and the like), an ultrasonic system, and a high-pressure emulsion dispersion system (high-pressure homogenizer, specifically, as a commercially available device, Gaulin homogenizer, Microfluidizer, DeBEE 2000 and the like).

The azo pigment of Formula (1), which is used in the preparation of the pigment dispersion of the present invention, is an amorphous azo pigment or any one of the α-type, β-type, γ-type, δ-type, ε-type, ζ-type and η-type crystal form azo pigments, and is preferably the α-type, ε-type or δ-type crystal form azo pigment, and more preferably the δ-type crystal form azo pigment. Among them, the δ-type crystal form azo pigment, which is transformed from the amorphous azo pigment by crystal transformation, is particularly preferred.

Further, it is preferred that the azo pigment of Formula (1) and the like used in the preparation of the pigment dispersion of the present invention is subjected to post-treatment (finishing), as described above.

In addition, it is preferred that the pigment dispersion of the present invention includes a step of subjecting the amorphous azo pigment represented by Formula (1) or the azo pigment represented by Formula (1) and having characteristic X-ray diffraction peaks at Bragg angles (2θ±0.2°) of any one of (A) to (G) in the CuKα characteristic X-ray diffraction to solvent heating treatment.

Furthermore, it is preferred that the pigment dispersion of the present invention further includes a step of subjecting the amorphous azo pigment represented by Formula (1) or the azo pigment represented by Formula (1) and having characteristic X-ray diffraction peaks at Bragg angles (2θ±0.2°) of any one of (A) to (G) in the CuKα characteristic X-ray diffraction to grinding treatment.

The method and conditions of the solvent heating treatment step and the grinding treatment step (preferably solvent salt milling) may be appropriately selected depending on the crystal type of the azo pigment represented by Formula (1) before dispersion, and examples thereof include the method and conditions which are the same as those described above.

4. Use

Examples of the use of the azo pigment of the present invention include an image recording material for forming an image, particularly a color image, specific examples thereof include a heat-sensitive recording material, a pressure-sensitive recording material, a recording material using an electrophotographic system, a silver halide photosensitive material of transfer system, a printing ink, a recording pen and the like, in addition to a coloring composition to be described below in detail, an ink, and an inkjet recording ink, an inkjet recording ink, a heat-sensitive recording material and a recording material using an electrophotographic system are preferred, and an inkjet recording ink is more preferred.

Further, the azo pigment of the present invention may also be applied to a color filter for recording and reproducing a color image, which is used in a solid image device such as CCD, or a display such as LCD and PDP, and a stain solution for staining various types of fiber.

The azo pigment of the present invention may be used in an emulsion-dispersed state, or furthermore even in a solid dispersion state according to the system in which the azo pigment of the present invention is used.

[Coloring Composition]

A coloring composition of the present invention means a coloring composition containing the pigment dispersion of the present invention. The coloring composition of the present invention may contain a medium, and the case of using a solvent as the medium is particularly suitable as an inkjet recording ink. The coloring composition of the present invention may be manufactured by using a lipophilic medium or an aqueous medium as a medium, and dispersing the azo pigment of the present invention in the medium. The coloring composition of the present invention is preferably manufactured by using an aqueous medium. An ink composition except for the medium is also included in the coloring composition of the present invention. The coloring composition of the present invention may contain other additives if necessary, within a range not impairing the effect of the present invention. Examples of the other additives include publicly known additives (described in Japanese Patent Application Laid-Open No. 2003-306623), such as a drying inhibitor (wetting agent), a discoloration inhibitor, an emulsification stabilizer, a permeation accelerator, an ultraviolet absorbent, an antiseptic, a fungicide, a pH adjusting agent, a surface tension adjusting agent, a defoaming agent, a viscosity adjusting agent, a dispersing agent, a dispersion stabilizer, a rust inhibitor and a chelating agent. These various additives are directly added to the ink solution in the case of an aqueous ink. In the case of an oil-soluble ink, the additives are generally added to the dispersion after the preparation of an azo pigment dispersion, but may be added as the oil or aqueous phase during the preparation.

[Ink]

Next, an ink will be described.

The ink in the present invention may use the pigment dispersion or the coloring composition of the present invention as described above. Preferably, the ink in the present invention is prepared by mixing an aqueous solvent, water and the like. However, when there is no particular problem, the pigment dispersion of the present invention may be used as it is.

The inkjet recording ink in the present invention includes the pigment dispersion or the coloring composition of the present invention, and the ink in the present invention may also be used as an inkjet recording ink.

In addition, the coloring composition containing the pigment of the present invention may be preferably used as an inkjet recording ink.

[Inkjet Recording Ink]

Next, an inkjet recording ink will be described.

The inkjet recording ink (hereinafter, referred to as an "ink" in some cases) uses the pigment dispersion or the coloring composition of the present invention as described above. Preferably, the inkjet recording ink is prepared by mixing an aqueous solvent, water and the like. However, when there is no particular problem, the pigment dispersion of the present invention may be used as it is.

The content ratio of the pigment dispersion in the ink is preferably in a range of 1% by mass to 100% by mass, particularly preferably in a range of 3% by mass to 20% by mass, and among them, most preferably in a range of 3% by mass to 10% by mass, in consideration of hue, color concentration, chroma, transparency and the like of an image formed on the recording medium.

The pigment of the present invention is contained in an amount of preferably 0.1 parts by mass to 20 parts by mass, more preferably 0.2 parts by mass to 10 parts by mass, and still more preferably 1 part by mass to 10 parts by mass, based on 100 parts by mass of the ink. Further, the pigment of the present invention may be used in combination with another pigment in the ink of the present invention. When two or more azo pigments are used in combination, it is preferred that the sum of the contents of the pigments is in the aforementioned range.

The ink may be used not only in forming a monochromatic image, but also in forming a full-color image. In order to form a full-color image, a magenta tone ink, a cyan tone ink and a yellow tone ink may be used, and in order to adjust the tone, a black tone ink may be further used.

Further, in the ink in the present invention, another pigment may be simultaneously used in addition to the azo pigment in the present invention. Examples of the yellow pigment which may be applied include C.I.P.Y.-74, C.I.P.Y.-128, C.I.P.Y.-155 and C.I.P.Y.-213, examples of the magenta pigment which may be applied include C.I.P.V.-19 and C.I.P.R.-122, examples of the cyan pigment which may be applied include C.I.P.B.-15:3 and C.I.P.B.-15:4, and any pigment may be arbitrarily used apart from these pigments. Examples of a black material which may be applied include a dispersion of carbon black in addition to disazo, trisazo and tetraazo pigments.

As an aqueous solvent used in the ink, polyhydric alcohols, a derivative of polyhydric alcohols, a nitrogen-containing solvent, alcohols, a sulfur-containing solvent and the like are used.

Specific examples of the polyhydric alcohols include ethylene glycol, diethylene glycol, propylene glycol, butylene glycol, triethylene glycol, 1,5-pentanediol, 1,2,6-hexanetriol, glycerin and the like.

Examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, an ethylene oxide adduct of diglycerin and the like.

In addition, examples of the nitrogen-containing solvent include pyrrolidone, N-methyl-2-pyrrolidone, cyclohexylpyrrolidone, and triethanolamine, examples of the alcohols include alcohols such as ethanol, isopropyl alcohol, butyl alcohol, and benzyl alcohol, and examples of the sulfur-containing solvent include thiodiethanol, thiodiglycerol, sulfolane, dimethylsulfoxide and the like. Besides, propylene carbonate, ethylene carbonate and the like may also be used.

The aqueous solvents used in the present invention may be used either alone or in mixture of two or more kinds thereof. The content of the aqueous solvent is used in an amount of 1% by mass to 60% by mass, and preferably 5% by mass to 40% by mass based on the total amount of the ink. When the amount of the aqueous solvent in the ink is less than 1% by mass, a sufficient optical concentration may not be obtained in some cases, and on the other hand, when the amount is more than 60% by mass, the viscosity of the liquid is increased and the spray characteristics of the ink liquid may be destabilized in some cases.

Preferred properties of the ink in the present invention are as follows. The surface tension of the ink is preferably 20 mN/m to 60 mN/m. The surface tension of the ink is more preferably 20 mN/m to 45 mN/m, and still more preferably 25 mN/m to 35 mN/m. When the surface tension is less than 20 mN/m, since the liquid overflows to the nozzle surface of the recording head, printing may not be normally carried out in some cases. On the other hand, when the surface tension is more than 60 mN/m, penetrability into recording media after printing is delayed, and the drying time may be prolonged in some cases. Meanwhile, the surface tension was measured under an environment of 23° C. and 55% RH by using a Wilhelmy type surface tensiometer as described above.

The viscosity of the ink is preferably 1.2 mPa·s or more and 8.0 mPa·s or less, more preferably 1.5 mPa·s or more and less than 6.0 mPa·s, and still more preferably 1.8 mPa·s or more and less than 4.5 mPa·s. When the viscosity is more than 8.0 mPa·s, discharge properties may deteriorate in some cases. On the other hand, when the viscosity is less than 1.2 mPa·s, long-term spray properties may deteriorate in some cases.

Further, the measurement of the viscosity (including the viscosity to be described below) was carried out by using a rotary viscometer RHEOMAT 115 (manufactured by Contraves Co.) at 23° C. and a shear rate of 1400 s$^{-1}$.

In addition to the various components described above, water is added to the ink in a range that the aforementioned preferred surface tension and viscosity are obtained. The amount of water added is not particularly limited, but is preferably 10% by mass to 99% by mass, and more preferably 30% by mass to 80% by mass, based on the total amount of the ink.

Further, if necessary, for the purpose of controlling characteristics such as an improvement in discharge properties, it is possible to use polyethyleneimine, polyamines, polyvinylpyrrolidone, polyethylene glycol, cellulose derivatives such as ethyl cellulose and carboxymethyl cellulose, polysaccharides and derivatives thereof, other water-soluble polymers, polymer emulsions such as acrylic polymer emulsions, polyurethane-based emulsions and hydrophilic latex, hydrophilic polymer gels, cyclodextrin, macrocyclic amines, dendrimers, crown ethers, urea and derivatives thereof, acetamide, silicone-based surfactants, fluorine-based surfactants, and the like.

Further, in order to adjust electrical conductivity and pH, it is possible to use alkali metal compounds such as potassium hydroxide, sodium hydroxide and lithium hydroxide, nitrogen-containing compounds such as ammonium hydroxide, triethanolamine, diethanolamine, ethanolamine and 2-amino-2-methyl-1-propanol, alkaline earth metal compounds such as calcium hydroxide, acids such as sulfuric acid, hydrochloric acid and nitric acid, salts of a strong acid and a weak alkali, such as ammonium sulfate, and the like.

In addition, a pH buffer, an antioxidant, an antifungal agent, a viscosity adjusting agent, a conductive agent, an ultraviolet absorbent, and the like may also be added if necessary.

[Inkjet Recording Method, Inkjet Recording Apparatus and Ink Tank for Inkjet Recording]

An inkjet recording method is a method of forming an image on the surface of a recording medium by discharging the ink onto the surface of the recording medium from a recording head according to record signals, by using an inkjet recording ink.

Further, an inkjet recording apparatus is an apparatus which forms an image by using an inkjet recording ink and including a recording head capable of discharging an ink (if necessary, a stepping solution) onto the surface of a recording medium to discharge the ink onto the surface of the recording medium from the recording head. In addition, the inkjet recording apparatus may feed the ink to the recording head, and may be equipped with an ink tank for inkjet recording (hereinafter also referred to as an "ink tank" in some cases) which is detachable from a main body of the inkjet recording apparatus. In this case, the ink is stored in the ink tank for inkjet recording.

As the inkjet recording apparatus, a typical inkjet recording apparatus, which is equipped with a printing system capable of using an ink for inkjet recording may be used, and in addition, may be an inkjet recording apparatus mounting a heater or the like for controlling drying of the ink thereon if necessary, or an inkjet recording apparatus equipped with a mechanism which mounts an intermediate body transfer mechanism thereon, discharges (prints) an ink and a stepping solution onto an intermediate body, and then transfers the image on the intermediate body onto a recording medium such as paper.

Further, as the ink tank for inkjet recording, any publicly known ink tank in the related art may be utilized as long as the tank is detachable from the inkjet recording apparatus equipped with a recording head and has a configuration in which the tank may feed, in a state of being mounted on the inkjet recording apparatus, an ink to the recording head.

From the viewpoint of the effect of reducing bleeding and inter-color bleeding, it is preferred that the inkjet recording method (apparatus) adopts a thermal inkjet recording system or a piezo inkjet recording system. In the case of the thermal inkjet recording system, an ink is heated during discharge to have a low viscosity, and the temperature of the ink decreases on a recording medium, thereby leading to a sharp increase in viscosity. For this reason, there is an effect of reducing bleeding and inter-color bleeding. On the other hand, in the case of the piezo inkjet recording system, a liquid with high viscosity may be discharged, and since the liquid with high viscosity may suppress the spread thereof in a direction of paper surface on a recording medium, there is an effect of reducing bleeding and inter-color bleeding.

In the inkjet recording method (apparatus), replenishment (feeding) of the ink to the recording head is preferably performed from an ink tank filled with an ink liquid (including a stepping solution tank if necessary). This ink tank is preferably a cartridge system tank which is detachable from the main body of the apparatus, and replenishment of the ink is performed with ease by exchanging the cartridge system ink tank.

[Color Toner]

The content of the azo pigment in 100 parts by mass of a color toner is not particularly limited, but is preferably 0.1 parts by mass or more, more preferably 1 part by mass to 20 parts by mass, and most preferably 2 parts by mass to 10 parts by mass. As a binder resin for a color toner into which the azo pigment is to be introduced, all binders which are generally used may be used. Examples thereof include styrene-based resins, acrylic resins, styrene/acrylic resins, polyester resins and the like.

For the purpose of improving flowability, controlling electrostatic charge and the like with respect to a toner, inorganic fine powders or organic fine particles may be externally added to the toner. Silica fine particles and titania fine particles surface-treated with a coupling agent containing an alkyl group are preferably used. Further, these particles have a number-average primary particle size of preferably 10 nm to 500 nm, and are added to the toner in an amount of preferably 0.1% by mass to 20% by mass.

As a release agent, all release agents used in the related art may be used. Specific examples thereof include olefins such as low molecular polypropylene, and low molecular polyethylene and ethylene-propylene copolymer, microcrystalline wax, carnauba wax, sazol wax, paraffin wax and the like. The addition amount thereof is preferably 1% by mass to 5% by mass in the toner.

The charge controlling agent may be added if necessary, but from the viewpoint of chromogenic properties, colorless agents are preferred. Examples thereof include those of a quaternary ammonium salt structure, those of a calixarene structure and the like.

As a carrier, it is possible to use any of non-coated carriers constituted by particles of a magnetic material such as iron or ferrite alone, and resin-coated carriers including magnetic material particles whose surface is coated with a resin. The average particle diameter of the carrier is preferably 30 µm to 150 µm in terms of volume average particle diameter.

The image-forming method to which the toner is applied is not particularly limited, but examples thereof include a method of forming an image by repeatedly forming a color image on a photoreceptor, and then transferring the color image thereon, a method of forming a color image by successively transferring an image formed on a photoreceptor onto an intermediate transfer body and the like to form a color image on the intermediate transfer body and the like, and then transferring the color image onto an image-forming member such as paper, and the like.

[Heat-Sensitive Recording (Transferring) Material]

The heat-sensitive recording material is configured of an ink sheet formed by applying the azo pigment of the present invention together with a binder on a support, and an image-receiving sheet for immobilizing the pigment traveled to correspond to a heat energy applied from a thermal head according to image-recording signals. The ink sheet may be formed by dispersing the azo pigment of the present invention together with a binder as fine particles in a solvent to prepare an ink liquid, coating the ink on a support, and appropriately drying the coated ink. The amount of the ink coated on the support is not particularly limited, but is preferably 30 mg/m$^2$ to 1,000 mg/m$^2$. As preferred binder resin, ink solvent, support and, further, an image-receiving sheet, those which are described in Japanese Patent Application Laid-Open No. H7-137466 may preferably be used.

In order to apply the heat-sensitive recording material to a heat-sensitive recording material capable of recording a full color image, it is preferred to form the full color image by successively coating on a support a cyan ink sheet containing a thermally diffusible cyan colorant which may form a cyan image, a magenta ink sheet containing a thermally diffusible magenta colorant which may form a magenta image, and a yellow ink sheet containing a thermally diffusible yellow colorant which may form a yellow image. In addition, an ink sheet including another black image-forming substance may be further formed if necessary.

[Color Filter]

As a method for forming a color filter, there is a method of first forming a pattern by a photoresist and then performing dyeing, or a method of forming a pattern by a photoresist added with a colorant as described in Japanese Patent Application Laid-Open Nos. H4-163552, H4-128703, and H4-175753. As a method to be used in the case of introducing the colorant of the present invention into a color filter, any of these methods may be used, but Examples of a preferred method include a method of forming a color filter which includes applying a positive-type resist composition containing a thermosetting resin, a quinonediazide compound, a crosslinking agent, a colorant, and a solvent on a substrate, exposing the applied composition through a mask, developing the exposed portion to form a positive-type resist pattern, entirely exposing the positive-type resist pattern, and then curing the positive-type resist pattern after the exposure, as described in Japanese Patent Application Laid-Open No. H4-175753 or Japanese Patent Application Laid-Open No. H6-35182. Further, an RGB primary color-based color filter or a YMC complementary color-based color filter may be obtained by forming a black matrix according to a typical method. Even in the case of the color filter, the amount of the azo pigment dispersion of the present invention to be used is not limited, but the amount of the azo pigment is preferably in a range of 0.1% by mass to 50% by mass.

As the thermosetting resin, the quinonediazide compound, the crosslinking agent, and the solvent to be used at this time, and the amounts thereof to be used, those which are described in the aforementioned patent documents may be preferably used.

Hereinafter, the present invention will be described in more detail with reference to Examples, but the present invention is not limited thereto. Further, the "part" in Examples indicates part by mass.

EXAMPLES

The X-ray diffractions of the an azo compound and an azo pigment were measured in accordance with the Japanese Industrial Standards JISK0131 (General Rule of X-ray Diffractometry) under the following conditions using a powder X-ray diffractometer RINT 2500 (manufactured by Rigaku Corporation) and a CuKα line.

Measuring apparatus used: automatic X-ray diffractometer RINT 2500 manufactured by Rigaku Corporation
X-ray tube: Cu
Tube voltage: 55 KV
Tube current: 280 mA
Scanning method: 2θ/θ scan
Scanning speed: 6 deg./min
Sampling interval: 0.100 deg.
Starting angle (2θ): 5 deg.
Stopping angle (2θ): 55 deg.
Divergence slit: 2 deg.
Scattering slit: 2 deg.
Receiving slit: 0.6 mm
A vertical-type goniometer is used Synthesis Examples Synthesis Example 1

Synthesis of ε-Type Crystal Form Azo Pigment (1)-1

16.2 g of a 43% nitrosylsulfuric acid solution was added to a mixed solvent composed of 50 g of acetic acid and 8 g of sulfuric acid over 20 minutes. The solution was cooled down to 3° C., and a diazotization reaction was performed by adding 11.55 g of a compound represented by the following Formula (2) as a powder thereto. After the mixture was stirred at the same temperature for 1 hour, a diazonium compound liquid preparation was obtained by deactivating the excess nitrosylsulfuric acid with 0.094 g of urea.

10 g of a compound represented by the following Formula (3) was dividedly added as a powder to the above-described diazonium compound liquid preparation at 5° C. or less. After the addition is completed, an azo compound dissolved solution was obtained by increasing the temperature to 20° C. and reacting the mixture for 2 hours. Further, the precipitation of the pigment was not observed during the coupling reaction, and the azo compound dissolved solution was in a state of completely dissolving the azo compound obtained.

A poor solvent composed of 150 mL of methanol was prepared and stirred at 5° C. and 200 rpm. The above-described azo compound dissolved solution was added dropwise to the poor solvent.

After the mixture was stirred as it is for 15 minutes, a ζ-type crystal form azo pigment (1)-1 was obtained by filtering off the crystal produced.

A solution with a pH of 6.0 was prepared by suspending the crystal obtained in 200 mL of water and adding a 28% ammonia water thereto. The crystal was filtered off, washed sufficiently with water, and dried at 60° C. for 24 hours. The crystal obtained was suspended in 200 mL of acetone, and the resulting solution was stirred under reflux for 2 hours by increasing the temperature. The solution was cooled down to room temperature, and 18.9 g of an ε-type crystal form azo pigment (1)-1 was obtained by filtering off the crystal precipitated, washing the crystal sufficiently with acetone, and drying the crystal at 60° C. for 24 hours.

The ζ-type crystal form azo pigment (1)-1 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ζ-type crystal form azo pigment (1)-1 was measured by the aforementioned conditions, and as a result, characteristic X-ray diffraction peaks were shown at Bragg angles (2θ±0.2°) of 6.6°, 9.2°, 10.3°, 21.4° and 25.6°.

A CuKα characteristic X-ray diffraction diagram is illustrated in FIG. 1.

The ε-type crystal form azo pigment (1)-1 obtained was observed by visual inspection using a transmission microscope (manufactured by JEOL Ltd.: JEM-1010 electron microscope), and as a result, the length of primary particles in a long axis direction was about 25 μm.

The X-ray diffraction of the ε-type crystal form azo pigment (1)-1 was measured by the aforementioned conditions, and as a result, characteristic X-ray diffraction peaks were shown at Bragg angles (2θ±0.2°) of 4.9°, 6.5°, 8.9°, 9.7° and 13.1°.

Figure 2:
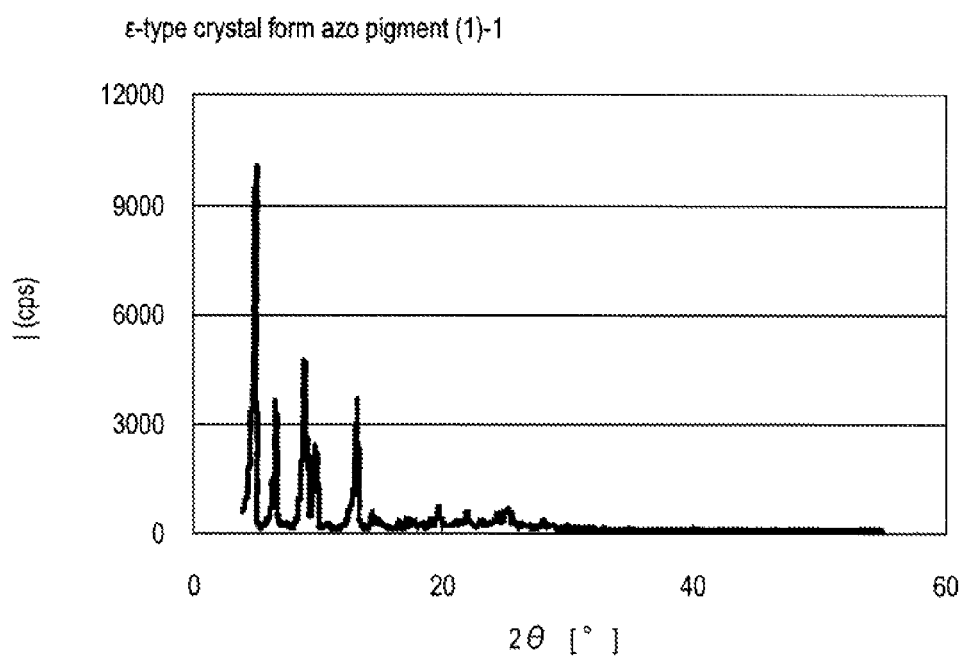
FIG. 2 is a view of an X-ray diffraction of an ε-type crystal form azo pigment (1)-1, which is synthesized according to Synthesis Example 1.

A CuKα characteristic X-ray diffraction diagram is illustrated in FIG. 2.

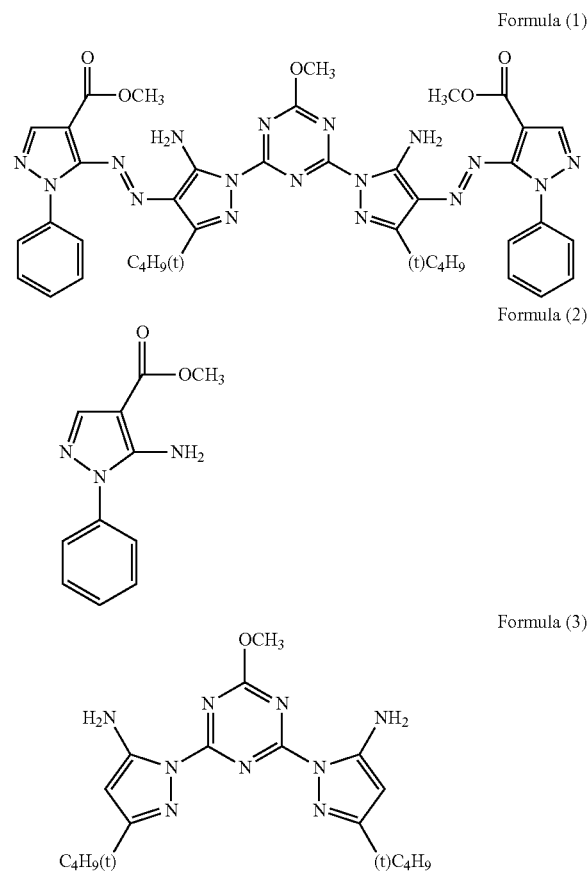

Synthesis Example 2

Synthesis of η-Type Crystal Form Azo Pigment (1)-2

67.5 g of the compound represented by Formula (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of the compound represented by Formula (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. A γ-type crystal form azo pigment (1)-2 was obtained by filtering off the crystal precipitated, washing the crystal sufficiently with water, and drying the crystal at 60° C. for 24 hours. The γ-type crystal form azo pigment (1)-2 obtained was suspended in 1.5 L of acetone, and the resulting suspension was stirred under reflux for 2 hours by increasing the temperature. An η-type crystal form azo pigment (1)-2 was obtained by filtering off the crystal precipitated at a thermal time, and washing the crystal sufficiently with acetone. 98.5 g of an ε-type crystal form azo pigment (1)-2 was obtained by drying the η-type crystal form azo pigment (1)-2 obtained at 80° C. for 15 hours. The γ-type crystal form azo pigment (1)-2 obtained was observed by visual inspection using a transmission microscope (manufactured by JEOL Ltd.: JEM-1010 electron microscope), and as a result, the length of primary particles in a long axis direction was about 2 μm.

The X-ray diffraction of the γ-type crystal form azo pigment (1)-2 was measured by the aforementioned conditions, and as a result, characteristic X-ray diffraction peaks were shown at Bragg angles (2θ±0.2°) of 5.9°, 7.0° and 8.9°.

Figure 3:
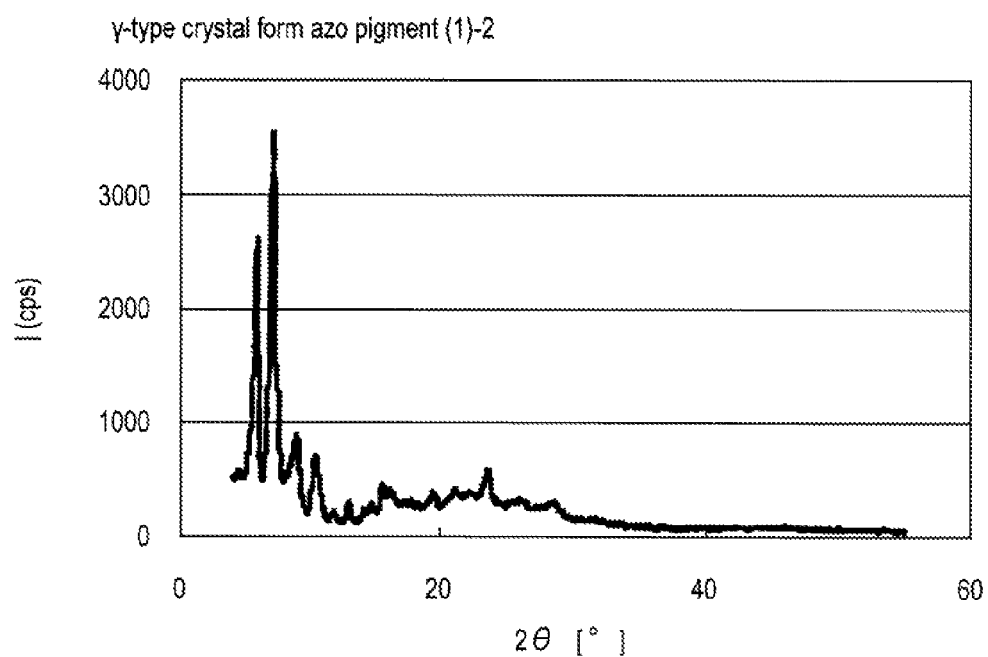
FIG. 3 is a view of an X-ray diffraction of a γ-type crystal form azo pigment (1)-2, which is synthesized according to Synthesis Example 2.

A CuKα characteristic X-ray diffraction diagram is illustrated in FIG. 3.

The η-type crystal form azo pigment (1)-2 obtained was observed by visual inspection using a transmission microscope (manufactured by JEOL Ltd.: JEM-1010 electron microscope), and as a result, the length of primary particles in a long axis direction was about 15 μm.

The X-ray diffraction of the η-type crystal form azo pigment (1)-2 was measured by the aforementioned conditions, and as a result, characteristic X-ray diffraction peaks were shown at Bragg angles (2θ±0.2°) of 4.8°, 6.5°, 9.2°, 9.7°, 13.0° and 24.4°.

Figure 4:
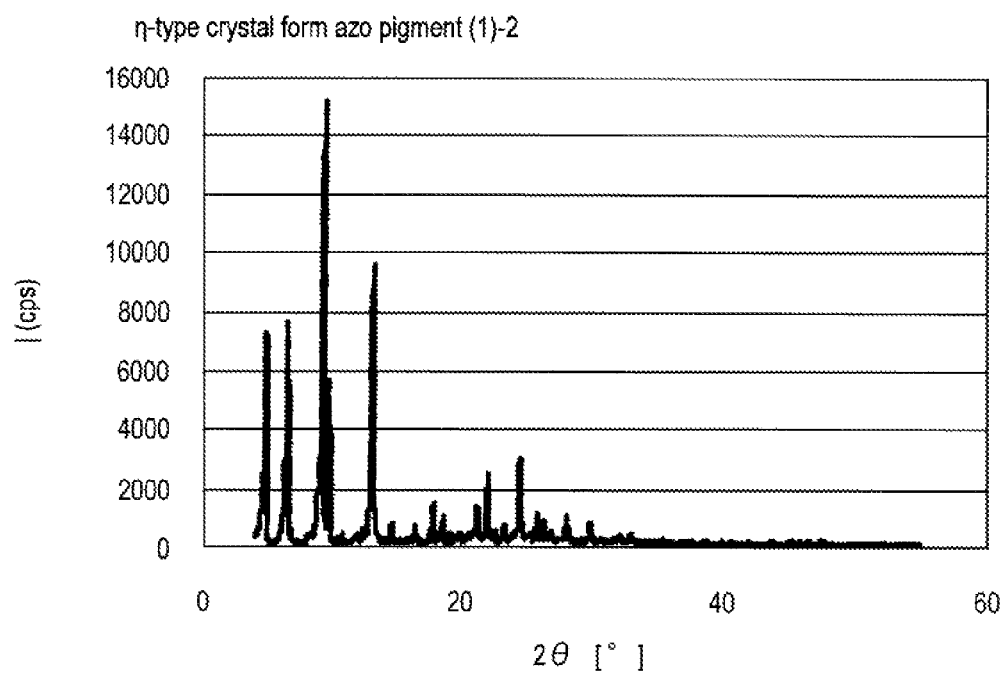
FIG. 4 is a view of an X-ray diffraction of an η-type crystal form azo pigment (1)-2, which is synthesized according to Synthesis Example 2.

A CuKα characteristic X-ray diffraction diagram is illustrated in FIG. 4.

The ε-type crystal form azo pigment (1)-2 obtained was observed by visual inspection using a transmission microscope (manufactured by JEOL Ltd.: JEM-1010 electron microscope), and as a result, the length of primary particles in a long axis direction was about 15 μm.

The X-ray diffraction of the ε-type crystal form azo pigment (1)-2 was measured by the aforementioned conditions, and as a result, characteristic X-ray diffraction peaks were shown at Bragg angles (2θ±0.2°) of 4.9°, 6.5°, 8.9°, 9.7°, 13.1°, 19.7° and 25.2°.

Figure 5:
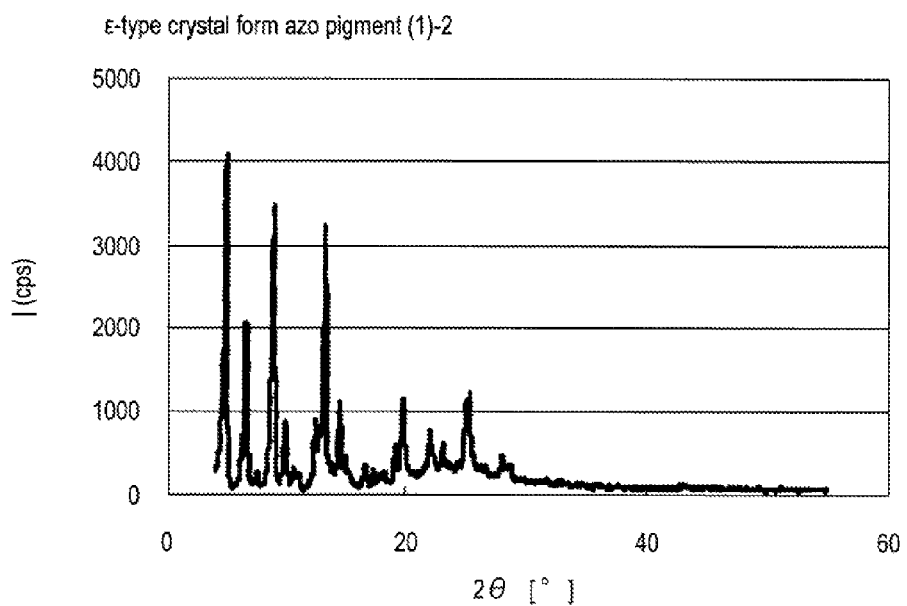
FIG. 5 is a view of an X-ray diffraction of an ε-type crystal form azo pigment (1)-2, which is synthesized according to Synthesis Example 2.

A CuKα characteristic X-ray diffraction diagram is illustrated in FIG. 5.

Synthesis Example 3

Synthesis of ε-Type Crystal Form Azo Pigment (1)-3

5.8 g of the compound represented by Formula (2) was dissolved in 50 mL of a 12 N hydrochloric acid, and the internal temperature was cooled down to −5° C. by ice-cooling the solution. 30 mL of water in which 2.21 g of sodium nitrite was dissolved was added dropwise thereto such that the temperature was 0° C. or less. A diazonium salt solution was obtained by stirring the resulting solution at an internal temperature of 0° C. for 1 hour, and dividedly adding 0.5 g of urea thereto. Apart from the aforementioned preparation, 5 g of a compound represented by the following Formula (3) was added to 40 mL of acetic acid, and was completely dissolved at an internal temperature of 50° C., the internal temperature is cooled down to 20° C., and the resulting solution was added dropwise to the above-described diazonium salt solution such that the internal temperature was 5° C. or less. After the dropwise addition was completed, the solution was heated an internal temperature of 10° C., and was stirred at the same temperature for 3 hours. The crystal precipitated was filtered off, and then washed with 500 mL of water. A solution with a pH of 6.2 was prepared by suspending the crystal obtained in 200 mL of water and adding a 28% ammonia water thereto. The crystal was filtered off, washed sufficiently with water, and then dried at 80° C. for 12 hours. The crystal obtained was suspended in 100 mL of acetone, and the resulting suspension was stirred under reflux for 2 hours by increasing the temperature. After the solution was cooled down to room temperature, 8.5 g of an ε-type crystal form azo pigment (1)-3 was obtained by filtering off the crystal precipitated, washing the crystal sufficiently with acetone, and drying the crystal at 60° C. for 24 hours.

The ε-type crystal form azo pigment (1)-3 obtained was observed by visual inspection using a transmission microscope (manufactured by JEOL Ltd.: JEM-1010 electron microscope), and as a result, the length of primary particles in a long axis direction was about 20 μm.

The X-ray diffraction of the ε-type crystal form azo pigment (1)-3 was measured by the aforementioned conditions, and as a result, characteristic X-ray diffraction peaks were shown at Bragg angles (2θ±0.2°) of 4.9°, 6.5°, 8.9°, 9.7°, 13.1°, 19.7° and 25.2°.

Figure 6:
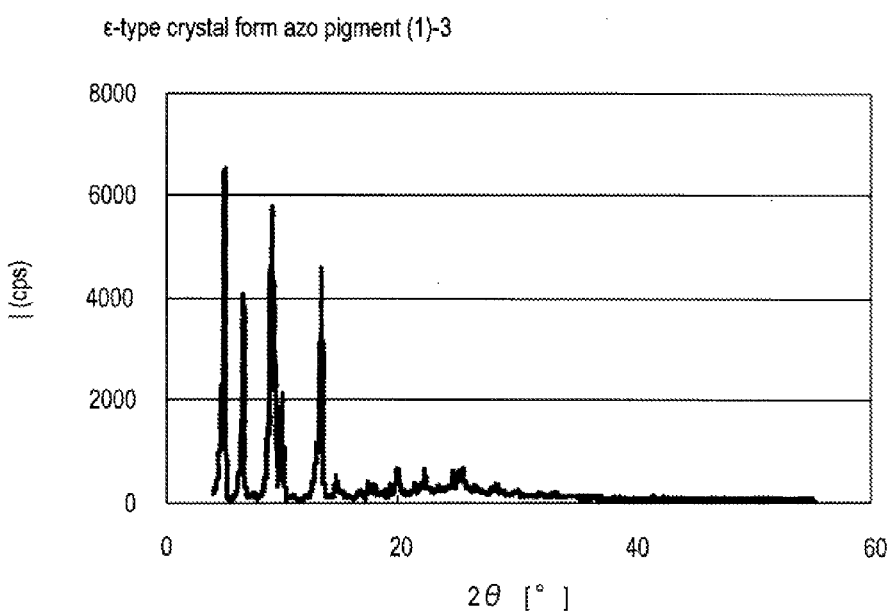
FIG. 6 is a view of an X-ray diffraction of an ε-type crystal form azo pigment (1)-3, which is synthesized according to Synthesis Example 3.

A CuKα characteristic X-ray diffraction diagram is illustrated in FIG. 6.

Synthesis Example 4

Synthesis of α-Type Crystal Form Azo Pigment (1)-1

A solution with a pH of 6.0 was prepared by suspending the ζ-type crystal form azo pigment (1)-1 obtained in Synthesis Example 1 in 200 mL of water, and adding a 28% ammonia water thereto. The crystal precipitated was separately filtered off and washed sufficiently with water. The crystal obtained was suspended in 200 mL of acetone, and the resulting suspension was stirred under reflux for 2 hours by increasing the temperature. A β-type crystal form pigment (1)-1 was obtained by cooling the suspension to room temperature, filtering off the crystal precipitated, and washing the crystal sufficiently with acetorie. In addition, 19.88 g (yield 91.0%) of an α-type crystal form azo pigment (1)-1 was obtained by drying the crystal at 80° C. for 24 hours.

The ζ-type crystal form azo pigment (1)-1 was observed by visual inspection using a transmission microscope (manufactured by JEOL Ltd.: JEM-1010 electron microscope), and as a result, the length of primary particles in a long axis direction was about 15 μm.

The X-ray diffraction of the ζ-type crystal form azo pigment (1)-1 was measured by the aforementioned conditions, and as a result, characteristic X-ray diffraction peaks were shown at Bragg angles (2θ±0.2°) of 6.6°, 9.2°, 10.3°, 21.4° and 25.6°.

Figure 7:
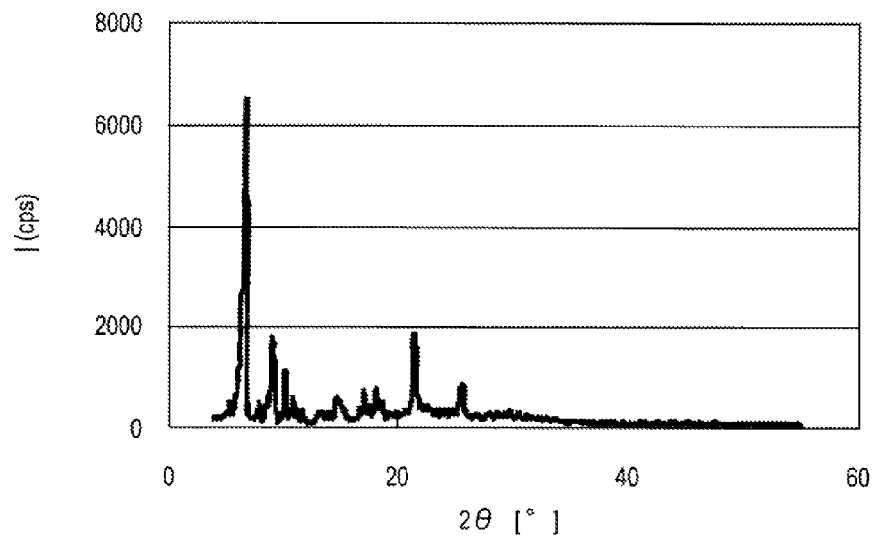
FIG. 7 is a view of an X-ray diffraction of a ζ-type crystal form azo pigment (1)-1, which is synthesized according to Synthesis Example 4.

A CuKα characteristic X-ray diffraction diagram is illustrated in FIG. 7.

The α-type crystal form azo pigment (1)-1 obtained was observed by visual inspection using a transmission microscope (manufactured by JEOL Ltd.: JEM-1010 electron microscope), and as a result, the length of primary particles in a long axis direction was about 15 μm.

The X-ray diffraction of the α-type crystal form azo pigment (1)-1 was measured by the aforementioned conditions, and as a result, characteristic X-ray diffraction peaks were shown at Bragg angles (2θ±0.2°) of 6.5°, 7.1°, 14.4°, 21.8° and 23.6°.

Figure 8:
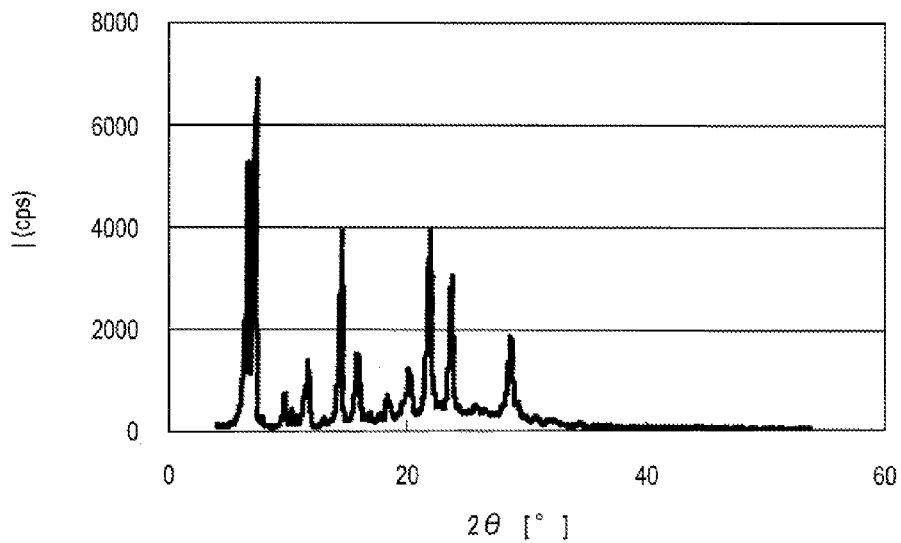
FIG. 8 is a view of an X-ray diffraction of an α-type crystal form azo pigment (1)-1, which is synthesized according to Synthesis Example 4.

A CuKα characteristic X-ray diffraction diagram is illustrated in FIG. 8.

Synthesis Example 5

Synthesis of α-Type Crystal Form Azo Pigment (1)-2

67.5 g of the compound represented by Formula (2) was dissolved in 530 mL of phosphoric acid, and the internal temperature was cooled down to 3° C. by ice-cooling the solution. 26.9 g of sodium nitrite was dividedly added to the solution over 15 minutes such that the internal temperature was 4° C. or less. After the addition was completed, a diazonium salt solution was obtained by stirring the solution at the same temperature for 50 minutes, and dividedly adding 18.6 g of urea thereto. Apart from the aforementioned preparation, 47.9 g of the compound represented by Formula (3) was added to 1,680 mL of methanol, and was completely dissolved under reflux. The internal temperature was cooled down to 0° C. by ice-cooling the solution, and the above-described diazonium salt solution was added thereto over 30 minutes such that the internal temperature was 10° C. or less. After stirring was performed at an internal temperature of 5° C. for 1 hour and 30 minutes, 1.6 L of water was added thereto, and stirring was performed for 30 minutes. The crystal precipitated was filtered off, and then washed with 1 L of water. A solution with a pH of 6.1 was prepared by suspending the crystal obtained in 2.5 L of water and adding a 28% ammonia water thereto. The crystal precipitated was filtered off and washed sufficiently with water. The crystal obtained was suspended in 1.5 L of acetone, and the resulting suspension was stirred under reflux for 2 hours by increasing the temperature. 103.5 g of a β-type crystal form azo pigment (1)-2 was obtained by filtering off the crystal precipitated at a thermal time, and washing the crystal sufficiently with acetone.

92.8 g (yield 88.8%) of an α-type crystal form azo pigment (1)-2 was obtained by drying the β-type crystal form azo pigment (1)-2 obtained at 60° C. for 24 hours.

The β-type crystal form azo pigment (1)-2 obtained was observed by visual inspection using a transmission microscope (manufactured by JEOL Ltd.: JEM-1010 electron microscope), and as a result, the length of primary particles in a long axis direction was about 10 μm.

The X-ray diffraction of the β-type crystal form azo pigment (1)-2 was measured by the aforementioned conditions, and as a result, characteristic X-ray diffraction peaks were shown at Bragg angles (2θ±0.2°) of 6.3°, 6.4° and 22.3°.

Figure 9:
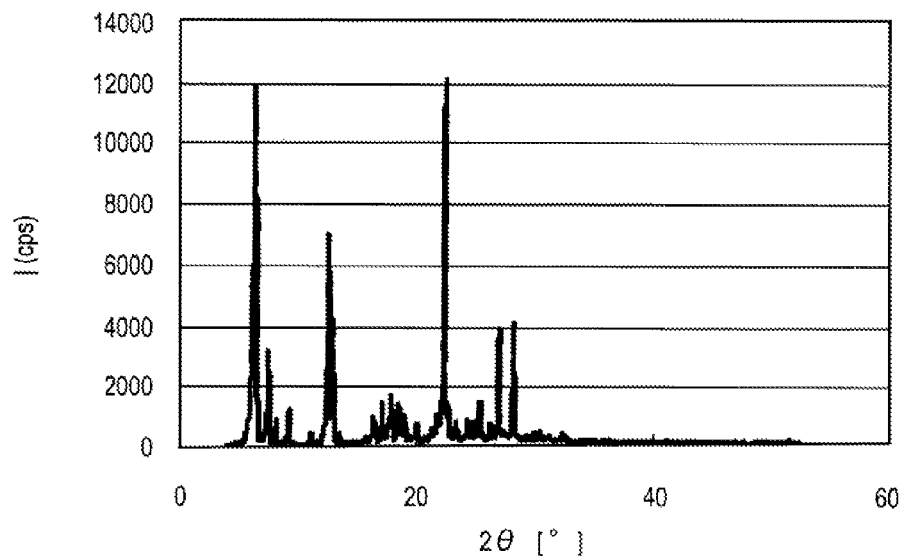
FIG. 9 is a view of an X-ray diffraction of a β-type crystal form azo pigment (1)-2, which is synthesized according to Synthesis Example 5.

A CuKα characteristic X-ray diffraction diagram is illustrated in FIG. 9.

The α-type crystal form azo pigment (1)-2 obtained was observed by visual inspection using a transmission microscope (manufactured by JEOL Ltd.: JEM-1010 electron microscope), and as a result, the length of primary particles in a long axis direction was about 10 μm.

The X-ray diffraction of the α-type crystal form azo pigment (1)-2 was measured by the aforementioned conditions, and as a result, characteristic X-ray diffraction peaks were shown at Bragg angles (2θ±0.2°) of 6.5°, 7.1°, 14.4°, 21.8° and 23.6°.

Figure 10:
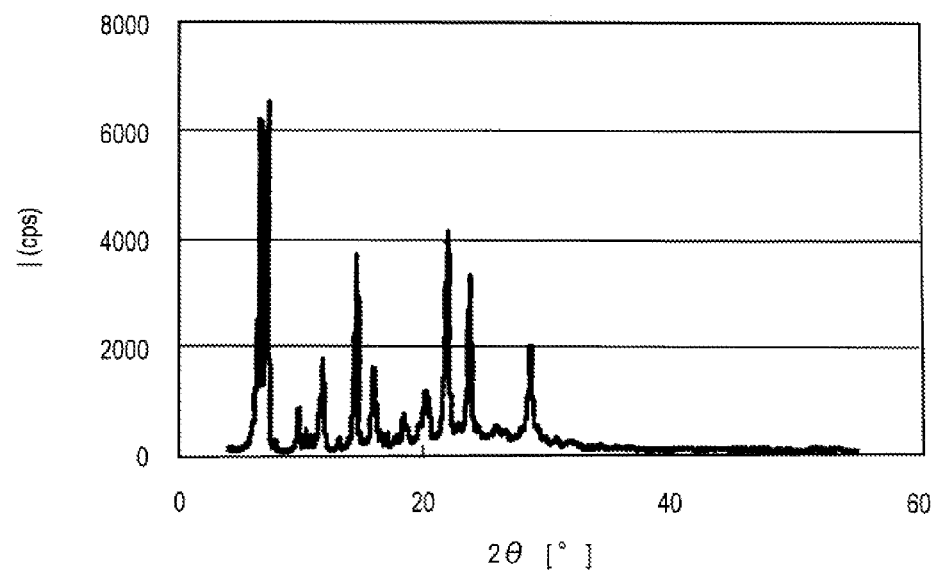
FIG. 10 is a view of an X-ray diffraction of an α-type crystal form azo pigment (1)-2, which is synthesized according to Synthesis Example 5.

A CuKα characteristic X-ray diffraction diagram is illustrated in FIG. 10.

Synthesis Example 6

Synthesis of α-Type Crystal Form Azo Pigment (1)-3

5.8 g of the compound represented by Formula (2) was dissolved in 50 mL of a 12 N hydrochloric acid, and the internal temperature was cooled down to −5° C. by ice-cooling the solution. 30 mL of water in which 2.21 g of sodium nitrite was dissolved was added dropwise thereto such that the temperature was 0° C. or less. A diazonium salt solution was obtained by stirring the resulting solution at an internal temperature of 0° C. for 1 hour, and dividedly adding 0.5 g of urea thereto. Apart from the aforementioned preparation, 5 g of the compound represented by Formula (3) was added to 40 mL of acetic acid, and was completely dissolved at an internal temperature of 50° C., the internal temperature was cooled down to 20° C., and the resulting solution was added dropwise to the above-described diazonium salt solution such that the internal temperature was 5° C. or less. After the dropwise addition was completed, the solution was heated to an internal temperature of 10° C., and was stirred at the same temperature for 3 hours. The crystal precipitated was filtered off, and then washed with 500 mL of water. A solution with a pH of 6.2 was prepared by suspending the crystal obtained in 200 mL of water and adding a 28% ammonia water thereto. The crystal precipitated was filtered off and washed sufficiently with water, and then was suspended in 100 mL of acetone, and the suspension was stirred under reflux for 2 hours by increasing the temperature. After the solution was cooled down to room temperature, 8.9 g of a β-type crystal form azo pigment (1)-3 was obtained by filtering off the crystal precipitated and washing the crystal sufficiently with acetone.

8.2 g (yield 75.1%) of an α-type crystal form azo pigment (1)-3 was obtained by drying the β-type crystal form azo pigment (1)-3 obtained at 60° C. for 24 hours.

The β-type crystal form azo pigment (1)-3 obtained was observed by visual inspection using a transmission microscope (manufactured by JEOL Ltd.: JEM-1010 electron microscope), and as a result, the length of primary particles in a long axis direction was about 10 μm.

The X-ray diffraction of the β-type crystal form azo pigment (1)-3 was measured by the aforementioned conditions, and as a result, characteristic X-ray diffraction peaks were shown at Bragg angles (2θ±0.2°) of 6.3°, 6.4° and 22.3°.

Figure 11:
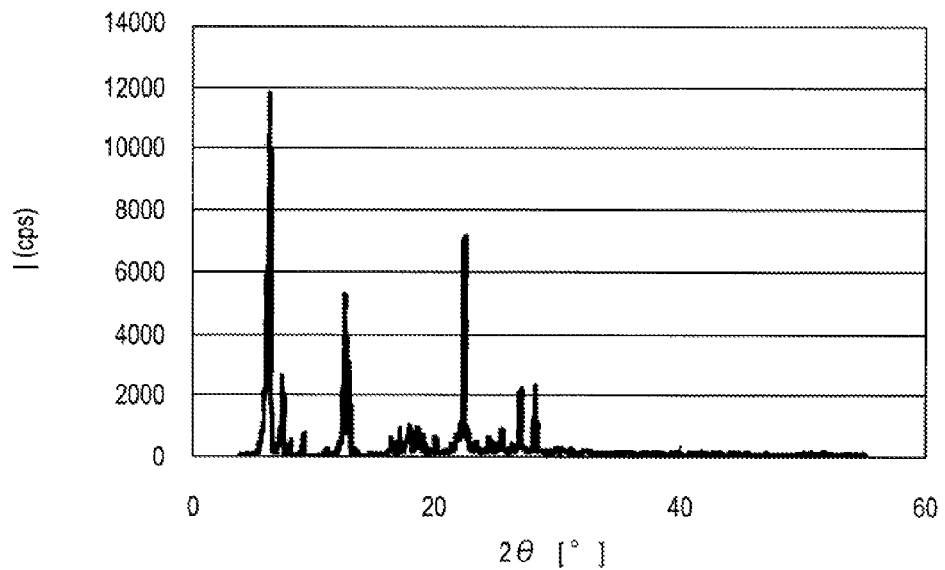
FIG. 11 is a view of an X-ray diffraction of a β-type crystal form azo pigment (1)-3, which is synthesized according to Synthesis Example 6.

A CuKα characteristic X-ray diffraction diagram is illustrated in FIG. 11.

The α-type crystal form azo pigment (1)-3 obtained was observed by visual inspection using a transmission microscope (manufactured by JEOL Ltd.: JEM-1010 electron microscope), and as a result, the length of primary particles in a long axis direction was about 10 (m.

The X-ray diffraction of the α-type crystal form azo pigment (1)-3 was measured by the aforementioned conditions, and as a result, characteristic X-ray diffraction peaks were shown at Bragg angles (2θ±0.2°) of 6.5°, 7.1°, 14.4°, 21.8° and 23.6°.

Figure 12:
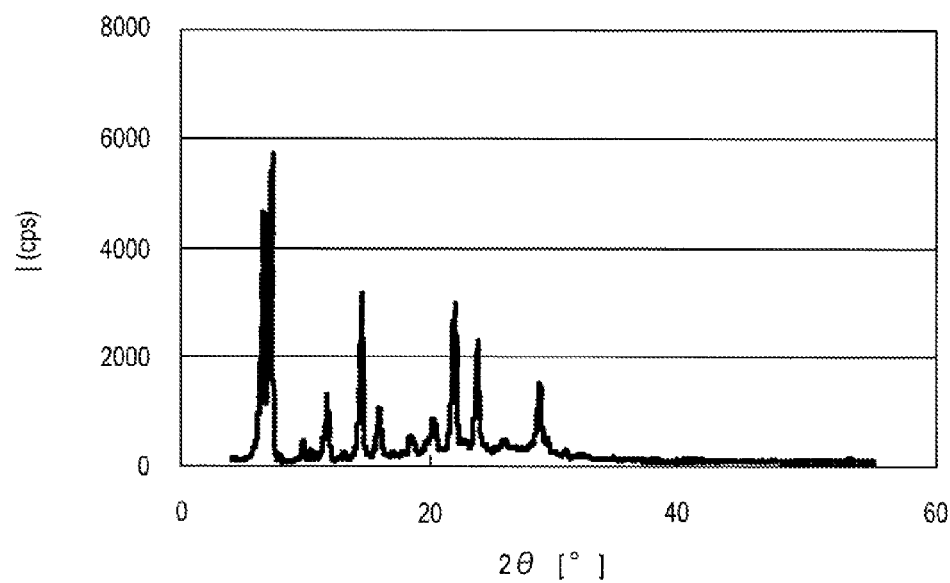
FIG. 12 is a view of an X-ray diffraction of an α-type crystal form azo pigment (1)-3, which is synthesized according to Synthesis Example 6.

A CuKα characteristic X-ray diffraction diagram is illustrated in FIG. 12.

Synthesis Example 7

Synthesis of Amorphous Azo Compound (1)-1

2.2 g of sodium nitrite was dissolved in 50 mL of water. Apart from the aforementioned preparation, 5.8 g of the amino compound represented by Formula (2) was dissolved in 50 mL of a concentrated hydrochloric acid, and then the internal temperature was cooled down to −10° C. The above-described sodium nitrite aqueous solution was added dropwise thereto such that the internal temperature is 0° C. or less. After the resulting solution was stirred at an internal temperature of −10° C. to 0° C. for 1 hour, 1.8 g of urea was added thereto at an internal temperature of 0° C. or less. After the addition was completed, a diazonium salt solution was obtained by stirring the resulting solution at the same temperature for 15 minutes. Apart from the aforementioned preparation, 5 g of the compound of Formula (3) was added to 175 mL of methanol, and then was dissolved under reflux by increasing the temperature. The solution was cooled down to an internal temperature of 0° C., and the above-described diazonium salt solution was added thereto such that the internal temperature was 10° C. or less. After the solution was stirred at an internal temperature of 10° C. for 1 hour, the solid precipitated was filtered off. The solid was washed sufficiently with methanol and water and suspended in 300 mL of water, and the pH was adjusted to 6.0 by adding a 28% ammonia aqueous solution thereto. 9.8 g of an amorphous azo compound (1)-1 was obtained by filtering off the solid precipitated, washing the solid sufficiently with water, and drying the solid at 60° C.

The length of primary particles of the azo compound (1)-1 obtained in a long axis direction was about 0.5 μm.

The X-ray diffraction of the azo compound (1)-1 was measured by the aforementioned conditions, and as a result, no characteristic X-ray diffraction peak was observed.

Synthesis Example 8

Synthesis of δ-Type Crystal Form Azo Pigment (1)-2

5 g of the amorphous azo compound (1)-1 obtained in Synthesis Example 7 was suspended in 50 mL of ethylene glycol. The suspension was heated to an internal temperature of 100° C., and then was stirred at the same temperature for 2 hours. After the internal temperature was cooled down to 30° C., 4.5 g of a δ-type crystal form azo pigment (1)-2 was obtained by filtering off the solid precipitated.

The length of primary particles of the δ-type crystal form azo pigment (1)-2 obtained in a long axis direction was about 0.6 μm.

The X-ray diffraction of the δ-type crystal form azo pigment (1)-2 obtained was measured by the aforementioned conditions, and as a result, characteristic X-ray diffraction peaks are shown at Bragg angles (2θ±0.2°) of 4.8°, 7.2°, 9.5°, 9.7°, 10.7°, 17.4°, 19.0°, 20.1° and 26.8°.

Figure 13:
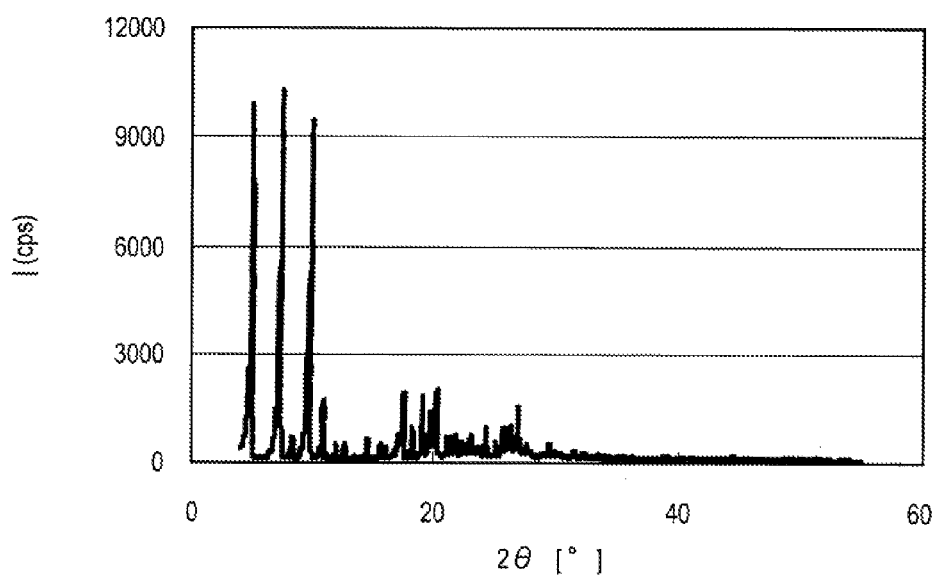
FIG. 13 is a view of an X-ray diffraction of a δ-type crystal form azo pigment (1)-2, which is synthesized according to Synthesis Example 8.

A CuKα characteristic X-ray diffraction diagram is illustrated in FIG. 13.

Synthesis Example 9

2.2 g of sodium nitrite was dissolved in 50 mL of water. Apart from the aforementioned preparation, 5.8 g of the amino compound represented by Formula (2) was dissolved in 50 mL of a concentrated hydrochloric acid, and then the internal temperature was cooled down to −10° C. The above-described sodium nitrite aqueous solution was added dropwise thereto such that the internal temperature was 0° C. or less. After the resulting solution was stirred at an internal temperature of −10° C. to 0° C. for 1 hour, 1.8 g of urea was added thereto at an internal temperature of 0° C. or less. After the addition was completed, a diazonium salt solution was obtained by stirring the resulting solution at the same temperature for 15 minutes. 5 g of the compound of Formula (3) was gradually added to the diazonium salt solution such that the internal temperature was 5° C. or less. After the addition was completed, the resulting solution was heated to an internal temperature of 10° C. and stirred at the same temperature for 3 hours, and then the solid precipitated was filtered off. The solid was washed sufficiently with water and suspended in 200 mL of water, and the pH was adjusted to 6.0 by adding a 28% ammonia aqueous solution thereto. 9.9 g of an amorphous azo compound (1)-3 was obtained by filtering off the solid precipitated, washing the solid sufficiently with water, and drying the solid at 60° C.

The length of primary particles of the azo compound (1)-3 obtained in a long axis direction was about 0.3 µm.

The X-ray diffraction of the azo compound (1)-3 was measured by the aforementioned conditions, and as a result, no characteristic X-ray diffraction peak was observed.

5 g of the amorphous azo compound (1)-3 obtained was suspended in 50 mL of ethylene glycol. The suspension was heated to an internal temperature of 120° C., and then was stirred at the same temperature for 2 hours. After the internal temperature was cooled down to 30° C., 4.5 g of a δ-type crystal form azo pigment (1)-4 was obtained by filtering off the solid precipitated.

The length of primary particles of the azo pigment (1)-4 obtained in a long axis direction was about 0.5 µm.

The X-ray diffraction of the azo pigment (1)-4 obtained was measured by the aforementioned conditions, and as a result, characteristic X-ray diffraction peaks were shown at Bragg angles (2θ±0.2°) of 4.8°, 7.2° and 9.7°.

Figure 14:
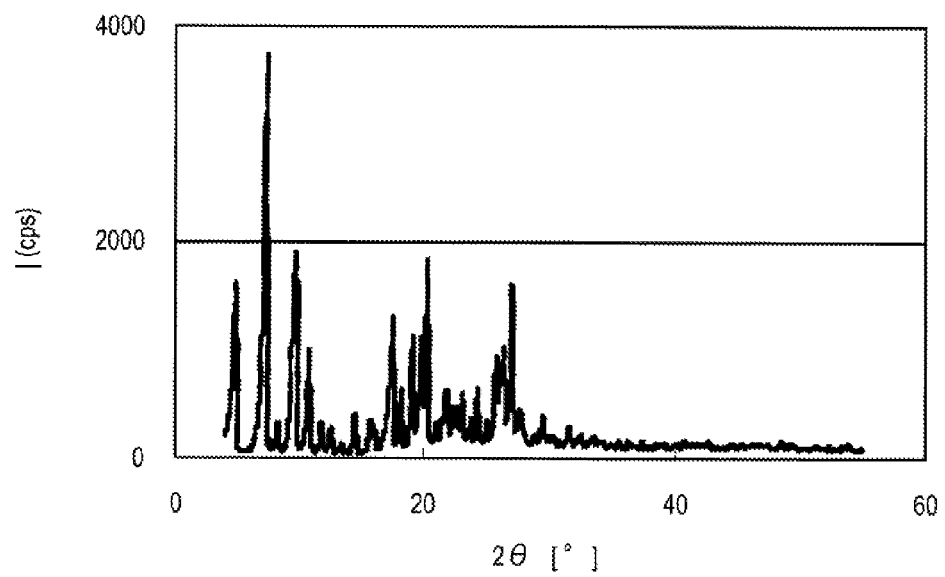
FIG. 14 is a view of an X-ray diffraction of a δ-type crystal form azo pigment (1)-4, which is synthesized according to Synthesis Example 9.

A CuKα characteristic X-ray diffraction diagram is illustrated in FIG. 14.

Synthesis Example 10

34.6 g of the compound of Formula (2) was suspended in 150 g of acetic acid, and 24 g of sulfuric acid was added dropwise thereto such that the internal temperature was 20° C. to 30° C. Further, 48.6 g of a sulfuric acid solution of a 43% nitrosylsulfuric acid was added dropwise thereto such that the internal temperature was 20° C. to 30° C., the mixture was stirred at an internal temperature of 20° C. for 1 hour, and then a diazonium salt solution was obtained by adding 0.28 g of urea thereto. 30 g of the compound of Formula (3) was dividedly added to the diazonium salt solution such that the internal temperature was 20° C. to 30° C., and a uniform reaction solution of an azo compound was obtained by stirring the mixture at an internal temperature of 25° C. for 1 hour. Apart form the aforementioned preparation, 360 g of methanol was prepared at an internal temperature of 25° C., the above-described uniform reaction solution of the azo compound was added thereto such that the internal temperature was 30° C. or less, the mixture was stirred for 10 minutes, and then the solid precipitated was filtered off. The solid was washed with 300 mL of methanol, and then suspended in 900 mL of water, and the pH was adjusted to 6.0 by adding a 28% ammonium aqueous solution thereto. A ζ-type crystal form azo pigment (1)-5 was obtained by filtering off the solid precipitated.

The length of primary particles of the azo pigment (1)-5 obtained in a long axis direction was about 2 µm.

The X-ray diffraction of the azo pigment (1)-5 obtained was measured by the aforementioned conditions, and as a result, characteristic X-ray diffraction peaks were shown at Bragg angles (2θ±0.2°) of 6.5°, 6.70°, 9.1° and 21.3°.

Figure 15:
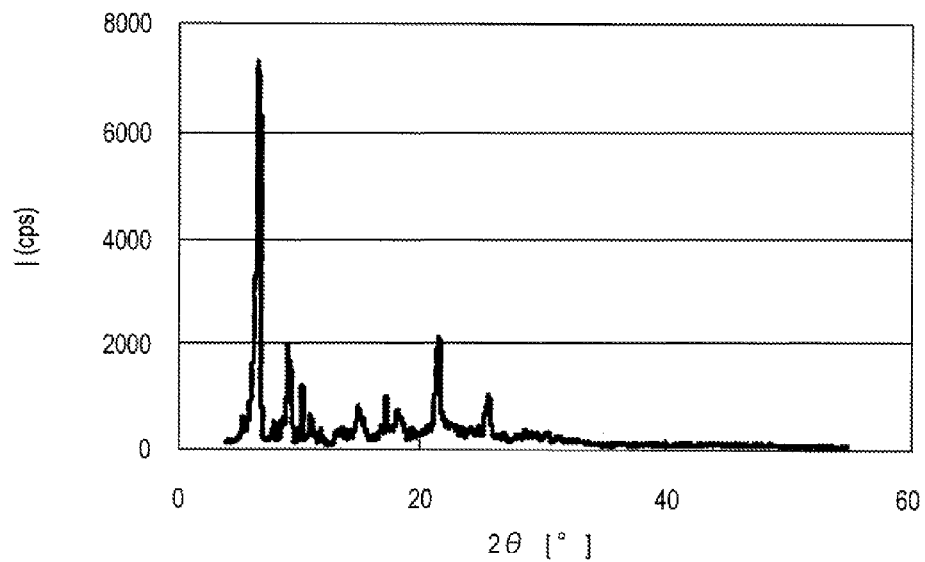
FIG. 15 is a view of an X-ray diffraction of an intermediate azo pigment (1)-5, which is synthesized according to Synthesis Example 10.

A CuKα characteristic X-ray diffraction diagram is illustrated in FIG. 15.

5 g of the azo pigment (1)-5 obtained was dissolved in 50 mL of sulfuric acid, and the resulting solution was added to 300 mL of water such that the internal temperature was 15° C. or less. The solid precipitated was filtered off, washed sufficiently with water, and then suspended in 300 mL of water, and the pH was adjusted to 6.1 by adding a 28% ammonia aqueous solution thereto. 3.9 g of an amorphous azo compound (1)-6 was obtained by filtering off the solid precipitated, washing the solid sufficiently with water, and drying the solid at 60° C.

The length of primary particles of the azo compound (1)-6 obtained in a long axis direction was about 0.2 µm.

The X-ray diffraction of the azo compound (1)-6 was measured by the aforementioned conditions, and as a result, no characteristic X-ray diffraction peak was observed.

3 g of the amorphous azo compound (1)-6 obtained was suspended in 30 mL of ethylene glycol. The suspension was heated to an internal temperature of 120° C., and then was stirred at the same temperature for 2 hours. After the internal temperature was cooled down to 30° C., 2.4 g of a δ-type crystal form azo pigment (1)-7 was obtained by filtering off the solid precipitated.

The length of primary particles of the azo pigment (1)-7 obtained in a long axis direction was about 0.3 µm.

The X-ray diffraction of the δ-type crystal form azo pigment (1)-7 obtained was measured by the aforementioned conditions, and as a result, characteristic X-ray diffraction peaks were shown at Bragg angles (2θ±0.2°) of 4.8°, 7.2°, 9.5°, 9.70°, 10.7°, 17.4°, 19.0°, 20.1° and 26.8°.

Figure 16:
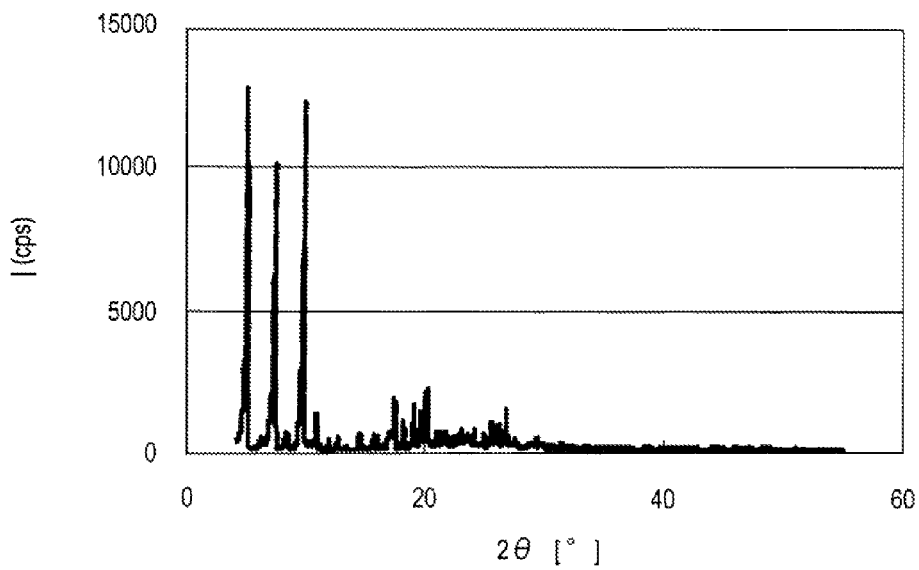
FIG. 16 is a view of an X-ray diffraction of a δ-type crystal form azo pigment (1)-7, which is synthesized according to Synthesis Example 10.

A CuKα characteristic X-ray diffraction diagram is illustrated in FIG. 16.

Synthesis Example 11

Amorphous 5 g of the azo pigment (1)-5 obtained in Synthesis Example 10 was dissolved in 50 mL of phosphoric acid, and the resulting solution was added to 300 mL of water such that the internal temperature was 15° C. or less. The solid precipitated was filtered off, washed sufficiently with water, and then suspended in 300 mL of water, and the pH was adjusted to 7.2 by adding a 28% ammonia aqueous solution thereto. 4.2 g of an amorphous azo compound (1)-8 was obtained by filtering off the solid precipitated, washing the solid sufficiently with water, and drying the solid at 60° C.

The length of primary particles of the azo compound (1)-8 obtained in a long axis direction was about 0.2 µm.

The X-ray diffraction of the azo compound (1)-8 was measured by the aforementioned conditions, and as a result, no characteristic X-ray diffraction peak was observed.

3 g of the amorphous azo compound (1)-8 obtained was suspended in 30 mL of ethylene glycol. The suspension was heated to an internal temperature of 120° C., and then was stirred at the same temperature for 2 hours. After the internal temperature was cooled down to 30° C., 2.4 g of a δ-type crystal form azo pigment (1)-9 was obtained by filtering off the solid precipitated.

The length of primary particles of the azo pigment (1)-9 obtained in a long axis direction was about 0.2 μm.

The X-ray diffraction of the azo pigment (1)-9 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 17:
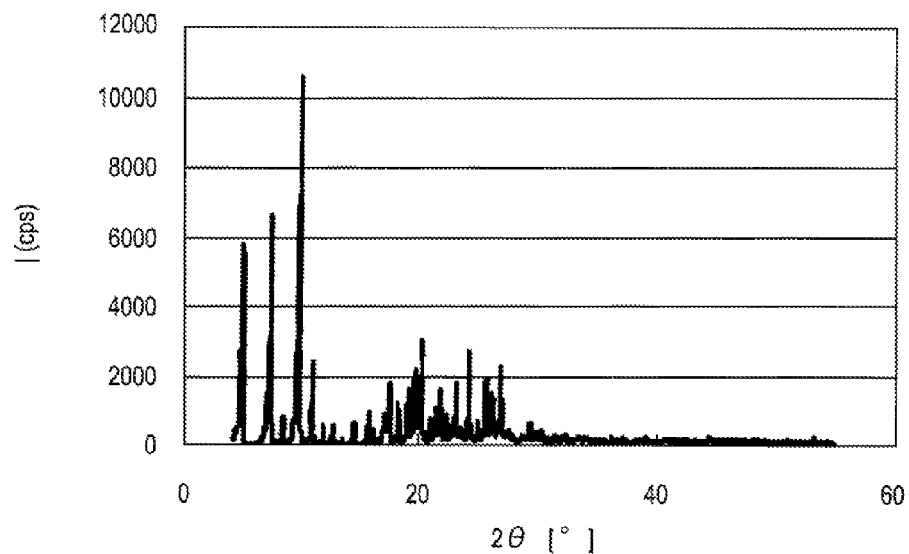
FIG. 17 is a view of an X-ray diffraction of a δ-type crystal form azo pigment (1)-9, which is synthesized according to Synthesis Example 11.

A CuKα characteristic X-ray diffraction diagram is illustrated in FIG. 17.

Synthesis Example 12

Amorphous 11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. The solid precipitated was filtered off, washed sufficiently with water, and suspended in 200 mL of water, and the pH was adjusted to 6.2 by adding a 28% ammonia aqueous solution thereto. An amorphous azo compound (1)-10 was obtained by filtering off the solid precipitated and washing the solid sufficiently with water.

The length of primary particles of the azo compound (1)-10 obtained in a long axis direction was about 0.2 μm.

Moisture was measured, and as a result, the content of water was 68%.

The X-ray diffraction of the azo compound (1)-10 was measured by the aforementioned conditions, and as a result, no characteristic X-ray diffraction peak was observed.

10 g of the amorphous water-containing azo compound (1)-10 obtained was suspended in 30 mL of ethylene glycol. The suspension was heated to an internal temperature of 95° C., and then was stirred at the same temperature for 2 hours. After the internal temperature was cooled down to 30° C., 2.9 g of a δ-type crystal form azo pigment (1)-11 was obtained by filtering off the solid precipitated.

The length of primary particles of the azo pigment (1)-11 obtained in a long axis direction was about 0.15 μm.

The X-ray diffraction of the azo pigment (1)-11 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 18:
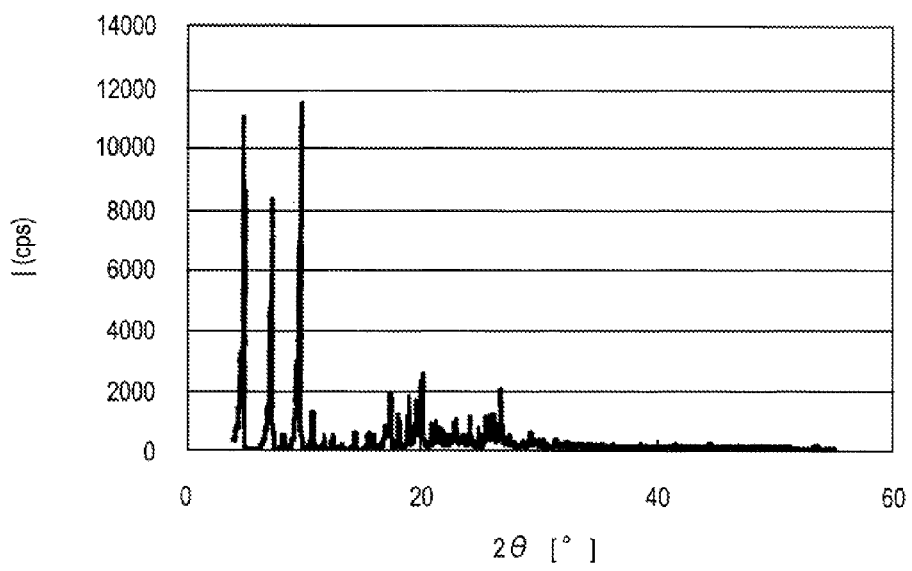
FIG. 18 is a view of an X-ray diffraction of a δ-type crystal form azo pigment (1)-11, which is synthesized according to Synthesis Example 12.

A CuKα characteristic X-ray diffraction diagram was illustrated in FIG. 18.

Synthesis Example 13

δ-Type

An azo compound (1)-12 was obtained by drying the amorphous water-containing azo compound (1)-10 obtained in Synthesis Example 12. 10 g of the azo compound (1)-12 was suspended in 100 mL of ethylene glycol, and the suspension was heated to an internal temperature of 120° C., and then was stirred at the same temperature for 2 hours. After the internal temperature was cooled down to 30° C., 9.1 g of a δ-type crystal form azo pigment (1)-13 was obtained by filtering off the solid precipitated.

The length of primary particles of the azo pigment (1)-13 obtained in a long axis direction was about 0.2 μm.

The X-ray diffraction of the azo pigment (1)-13 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 19:
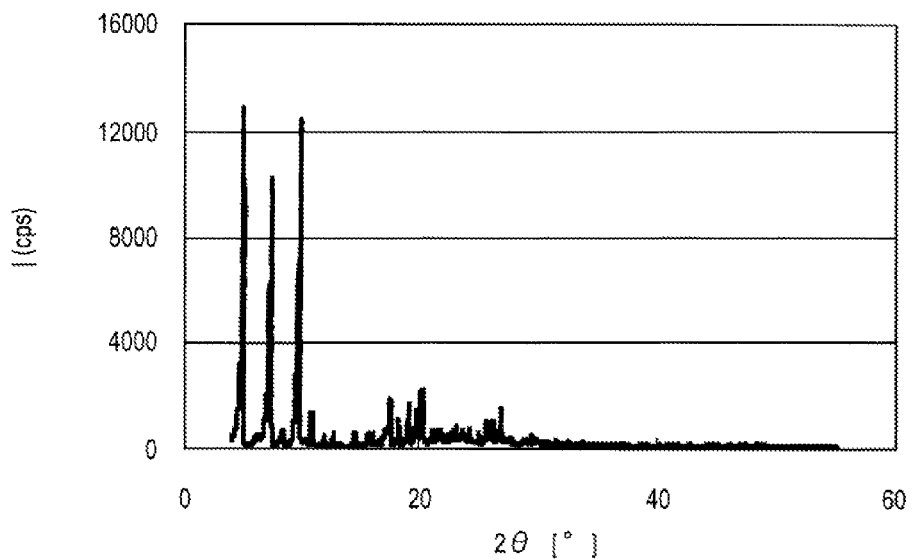
FIG. 19 is a view of an X-ray diffraction of a δ-type crystal form azo pigment (1)-13, which is synthesized according to Synthesis Example 13.

A CuKα characteristic X-ray diffraction diagram is illustrated in FIG. 19.

Synthesis Example 14

δ-Type 10 g of the azo compound (1)-12 obtained in Synthesis Example 13 was suspended in a mixed solvent of 50 mL of ethylene glycol and 50 mL of water, and the suspension was heated to an internal temperature 95° C., and then was stirred at the same temperature for 2 hours. After the internal temperature was cooled down to 30° C., 9.3 g of a δ-type crystal form azo pigment (1)-14 was obtained by filtering off the solid precipitated.

The length of primary particles of the azo pigment (1)-14 obtained in a long axis direction was about 0.2 μm.

The X-ray diffraction of the azo pigment (1)-14 obtained was measured by the aforementioned conditions, and as a result, characteristic X-ray diffraction peaks were shown at Bragg angles (2θ±0.2°) of 4.8°, 7.2°, 9.5°. 9.7°, 10.7°, 17.4°, 19.0°, 20.1° and 26.8°.

Figure 20:
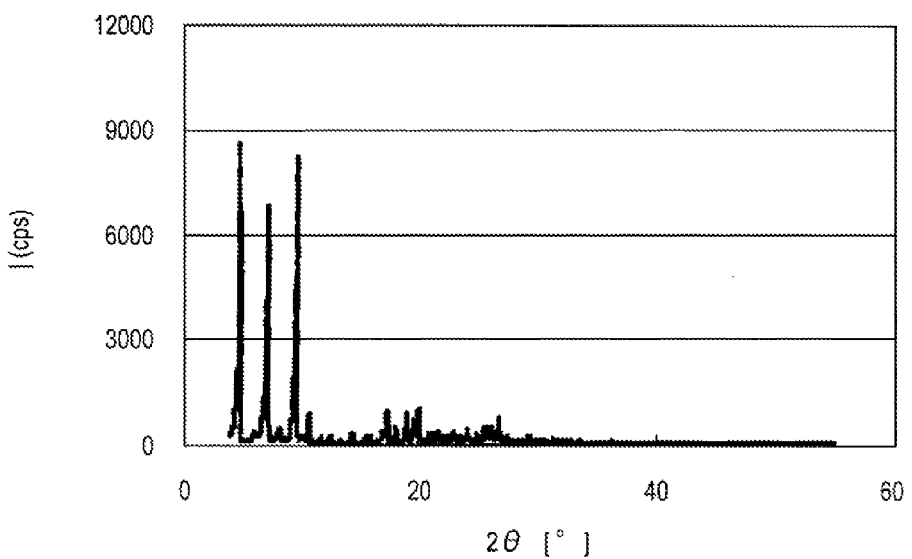
FIG. 20 is a view of an X-ray diffraction of a δ-type crystal form azo pigment (1)-14, which is synthesized according to Synthesis Example 14.

A CuKα characteristic X-ray diffraction diagram is illustrated in FIG. 20.

Synthesis Example 15

δ-Type 10 g of the azo compound (1)-12 was suspended in a mixed solvent of 5 mL of ethylene glycol and 95 mL of water, and the suspension was heated to an internal temperature 85° C., and then was stirred at the same temperature for 2 hours. After the internal temperature was cooled down to 30° C., 9.5 g of a δ-type crystal form azo pigment (1)-15 was obtained by filtering off the solid precipitated.

The length of primary particles of the azo pigment (1)-15 obtained in a long axis direction was about 0.15 μm.

The X-ray diffraction of the azo pigment (1)-15 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 21:
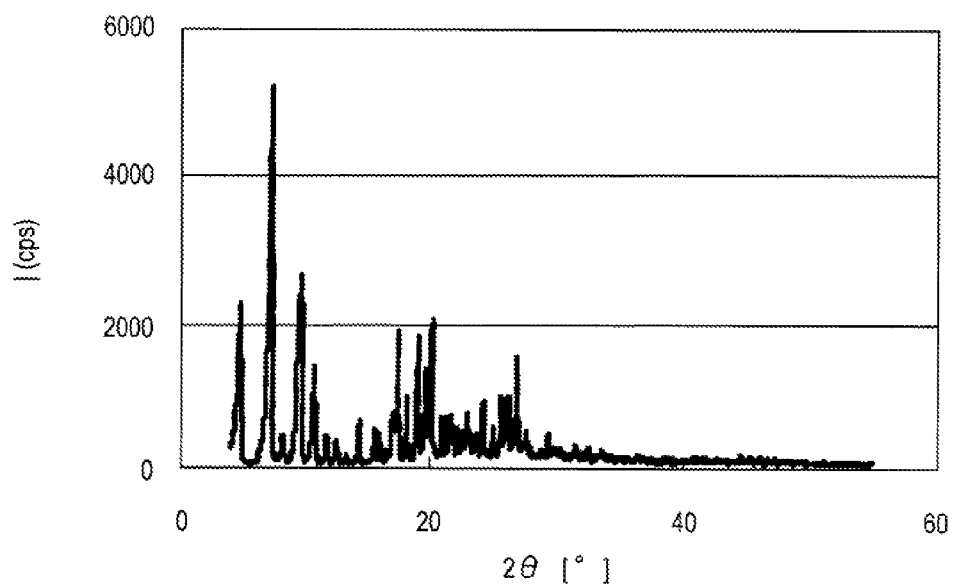
FIG. 21 is a view of an X-ray diffraction of a δ-type crystal form azo pigment (1)-15, which is synthesized according to Synthesis Example 15.

A CuKα characteristic X-ray diffraction diagram is illustrated in FIG. 21.

Synthesis Example 16

δ-Type 10 g of the azo compound (1)-12 was suspended in a mixed solvent of 40 mL of isopropanol and 60 mL of water, and the suspension was heated to an internal temperature 80° C., and then was stirred at the same temperature for 2 hours. After the internal temperature was cooled down to 30° C., 8.2 g of a δ-type crystal form azo pigment (1)-16 was obtained by filtering off the solid precipitated.

The length of primary particles of the azo pigment (1)-16 obtained in a long axis direction was about 5 μm.

The X-ray diffraction of the azo pigment (1)-16 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 22:
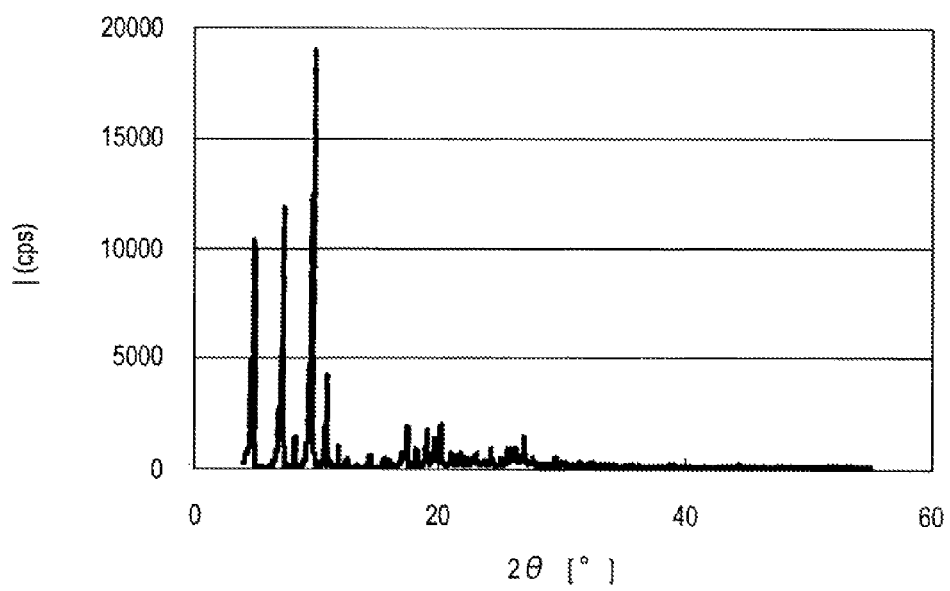
FIG. 22 is a view of an X-ray diffraction of a δ-type crystal form azo pigment (1)-16, which is synthesized according to Synthesis Example 16.

A CuKα characteristic X-ray diffraction diagram is illustrated in FIG. 22.

Synthesis Example 17

δ-Type 10 g of the azo compound (1)-12 was suspended in 100 mL of isobutyl alcohol and 10 mL of water, and the suspension was heated to an internal temperature 80° C., and then was stirred at the same temperature for 2 hours. After the internal temperature was cooled down to 30° C., 7.9 g of a δ-type crystal form azo pigment (1)-17 was obtained by filtering off the solid precipitated.

The length of primary particles of the azo pigment (1)-17 obtained in a long axis direction was about 15 μm.

The X-ray diffraction of the azo pigment (1)-17 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 23:
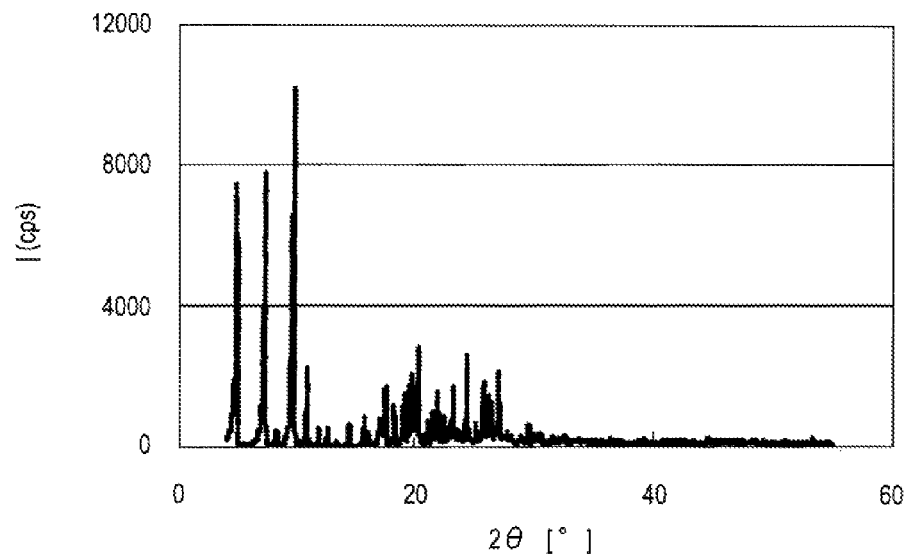
FIG. 23 is a view of an X-ray diffraction of a δ-type crystal form azo pigment (1)-17, which is synthesized according to Synthesis Example 17.

A CuKα characteristic X-ray diffraction diagram is illustrated in FIG. 23.

Synthesis Example 18

δ-Type 10 g of the azo compound (1)-12 was suspended in 100 mL of butyl acetate, and the suspension was heated to an internal temperature of 90° C., and then was stirred at the same temperature for 2 hours. After the internal temperature was cooled down to 30° C., 8.5 g of a δ-type crystal form azo pigment (1)-18 was obtained by filtering off the solid precipitated.

The length of primary particles of the azo pigment (1)-18 obtained in a long axis direction was about 20 μm.

The X-ray diffraction of the azo pigment (1)-18 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 24:
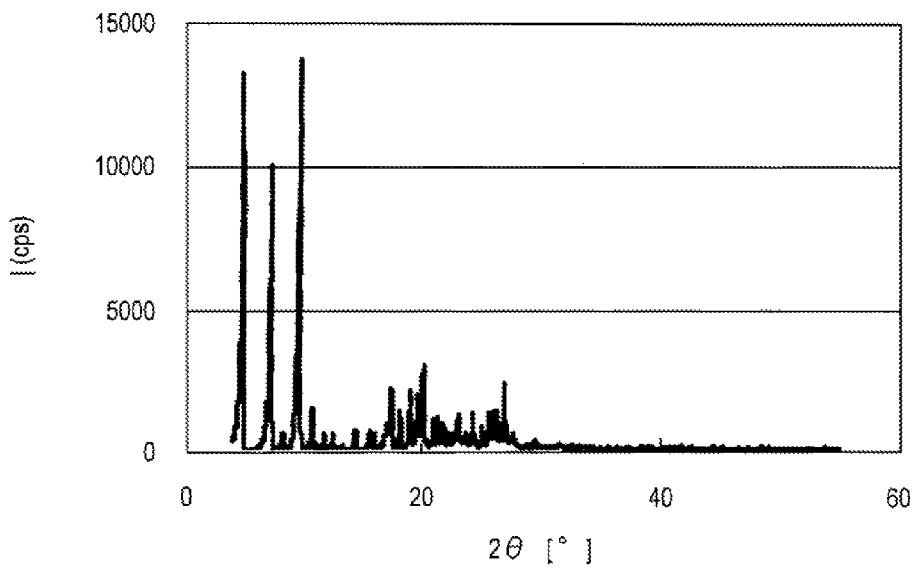
FIG. 24 is a view of an X-ray diffraction of a δ-type crystal form azo pigment (1)-18, which is synthesized according to Synthesis Example 18.

A CuKα characteristic X-ray diffraction diagram is illustrated in FIG. 24.

Synthesis Example 19

Amorphous 11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. An amorphous azo compound (1)-19 was obtained by filtering off the solid precipitated and washing the solid sufficiently with water.

The length of primary particles of the azo compound (1)-19 obtained in a long axis direction was about 0.2 μm.

The X-ray diffraction of the azo compound (1)-19 was measured by the aforementioned conditions, and as a result, no characteristic X-ray diffraction peak was observed.

δ-Type

The amorphous azo pigment (1)-19 obtained was suspended in a mixed solvent of 120 mL of water and 180 mL of ethylene glycol. After the pH was adjusted to 6.28 with a 28% ammonia aqueous solution, the suspension was heated to an internal temperature of 85° C. and stirred at the same temperature for 2 hours. After the internal temperature was cooled down to 30° C., 19.5 g of a δ-type crystal form azo pigment (1)-20 was obtained by filtering off the solid precipitated and washing the solid sufficiently with water.

The length of primary particles of the azo pigment (1)-20 obtained in a long axis direction was about 0.3 μm.

The X-ray diffraction of the azo pigment (1)-20 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 25:
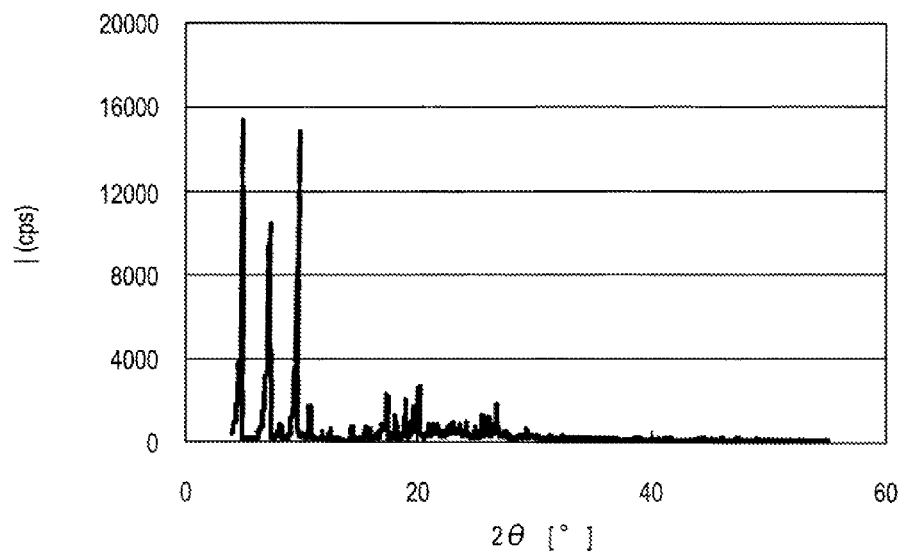
FIG. 25 is a view of an X-ray diffraction of a δ-type crystal form azo pigment (1)-20, which is synthesized according to Synthesis Example 19.

A CuKα characteristic X-ray diffraction diagram is illustrated in FIG. 25.

Synthesis Example 20

δ-Type 11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. After the resulting solution was stirred at the same temperature for 30 minutes, 20 mL of ethylene glycol was added thereto, and the resulting mixture was heated to an internal temperature of 85° C. and stirred at the same temperature for 2 hours. After the internal temperature was cooled down to 30° C., 19.9 g of a δ-type crystal form azo pigment (1)-21 was obtained by filtering off the solid precipitated and washing the solid sufficiently with water.

The length of primary particles of the azo pigment (1)-21 obtained in a long axis direction was about 0.2 μm.

The X-ray diffraction of the azo pigment (1)-21 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 26:
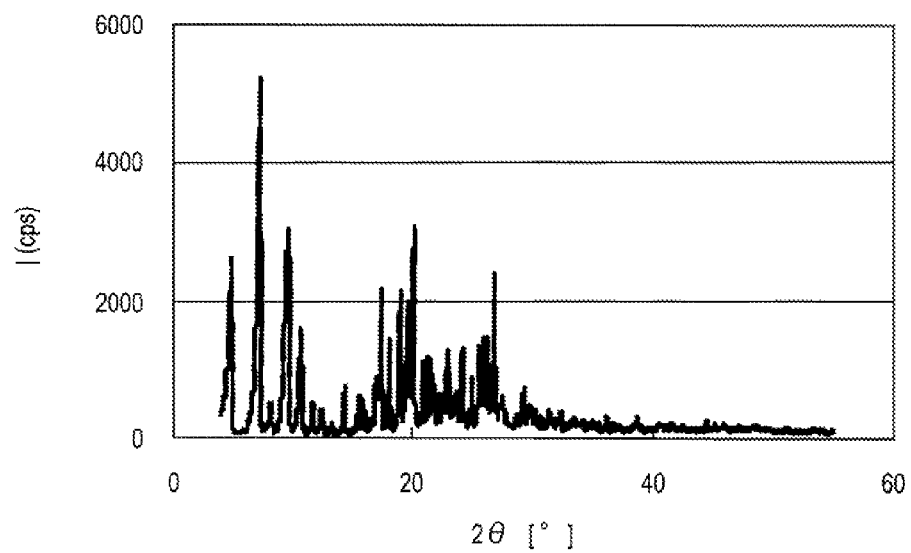
FIG. 26 is a view of an X-ray diffraction of a δ-type crystal form azo pigment (1)-21, which is synthesized according to Synthesis Example 20.

A CuKα characteristic X-ray diffraction diagram is illustrated in FIG. 26.

Synthesis Example 21

δ-Type 11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. After the resulting solution was stirred at the same temperature for 30 minutes, 20 mL of ethylene glycol was added thereto. After the pH was adjusted to 4.01 by adding a 28% ammonia aqueous solution such that the internal temperature was 30° C. or less, the solution was heated to an internal temperature of 85° C. and stirred at the same temperature for 2 hours. After the internal temperature was cooled down to 30° C., 19.9 g of a δ-type crystal form azo pigment (1)-22 was obtained by filtering off the solid precipitated and washing the solid sufficiently with water.

The length of primary particles of the azo pigment (1)-22 obtained in a long axis direction was about 0.5 μm.

The X-ray diffraction of the azo pigment (1)-22 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 27:
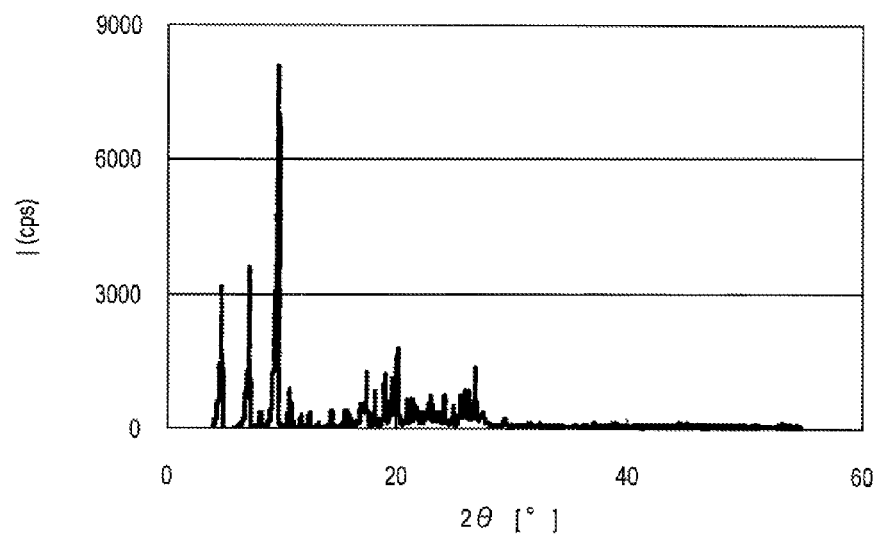
FIG. 27 is a view of an X-ray diffraction of a δ-type crystal form azo pigment (1)-22, which is synthesized according to Synthesis Example 21.

A CuKα characteristic X-ray diffraction diagram is illustrated in FIG. 27.

Synthesis Example 22

δ-Type 11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. After the resulting solution was stirred at the same temperature for 30 minutes, 20 mL of ethylene glycol was added thereto, and the resulting mixture was heated to an internal temperature of 85° C. and stirred at the same temperature for 2 hours. After the internal temperature was cooled down to 30° C., the pH was adjusted to 6.50 by adding a 28% ammonia aqueous solution thereto such that the internal temperature was 30° C. or less. 19.9 g of a δ-type crystal form azo pigment (1)-23 was obtained by filtering off the crystal precipitated and washing the crystal sufficiently with water.

The length of primary particles of the azo pigment (1)-23 obtained in a long axis direction was about 0.4 μm.

The X-ray diffraction of the azo pigment (1)-23 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 28:
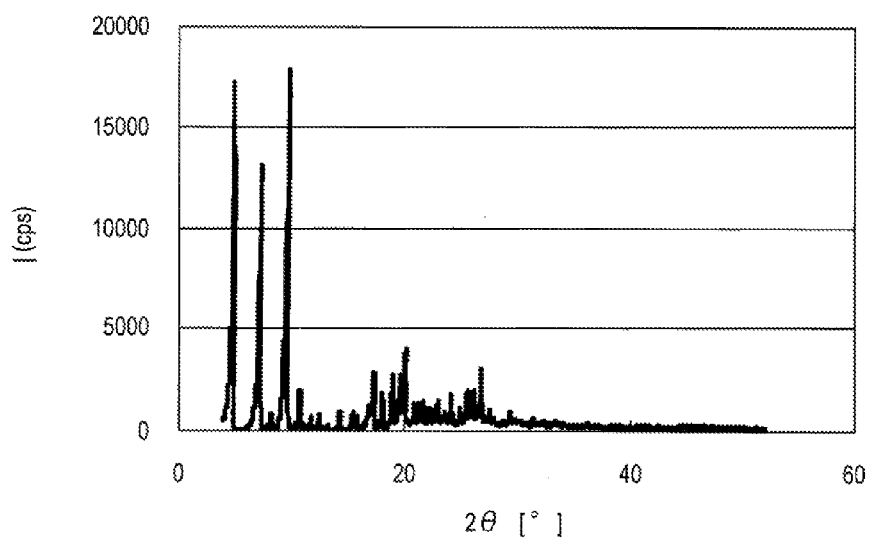
FIG. 28 is a view of an X-ray diffraction of a δ-type crystal form azo pigment (1)-23, which is synthesized according to Synthesis Example 22.

A CuKα characteristic X-ray diffraction diagram is illustrated in FIG. 28.

Synthesis Example 23

δ-Type 11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. After the resulting solution was stirred at the same temperature for 30 minutes, 20 mL of ethylene glycol was added thereto, and the resulting mixture was heated to an internal temperature of 85° C. and stirred at the same temperature for 2 hours. After the internal temperature was cooled down to 30° C., the crystal precipitated was filtered off, washed sufficiently with water, and washed with 100 mL of a 1% sodium bicarbonate aqueous solution. 19.8 g of a δ-type crystal form azo pigment (1)-24 was obtained by further washing the crystal sufficiently with water.

The length of primary particles of the azo pigment (1)-24 obtained in a long axis direction was about 0.15 μm.

The X-ray diffraction of the azo pigment (1)-24 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 29:
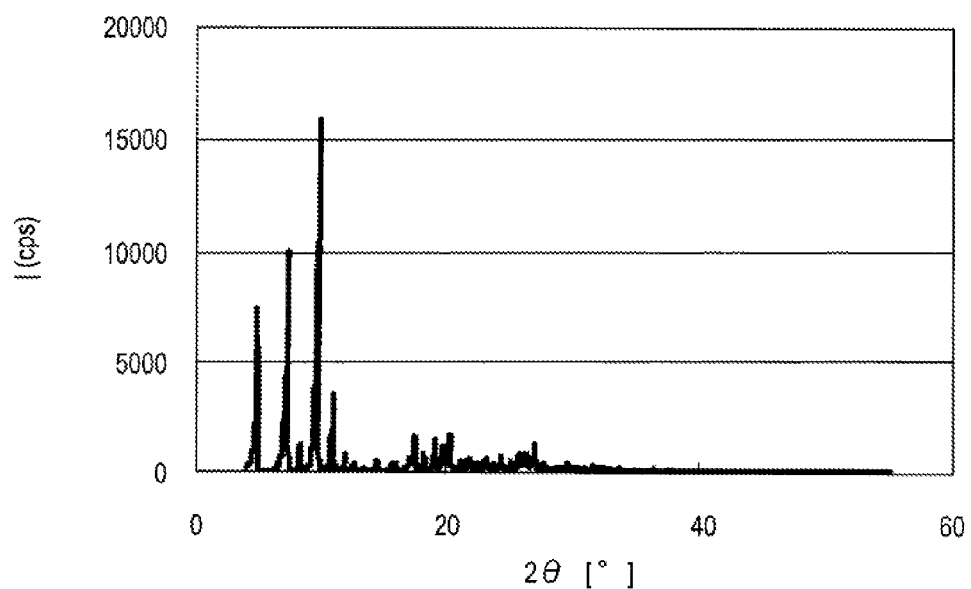
FIG. 29 is a view of an X-ray diffraction of a δ-type crystal form azo pigment (1)-24, which is synthesized according to Synthesis Example 23.

A CuKα characteristic X-ray diffraction diagram is illustrated in FIG. 29.

Synthesis Example 24

δ-Type 10 g of the azo pigment (1)-12 was suspended in 100 mL of ethylene glycol, and the resulting suspension was stirred at room temperature for 24 hours. 9.5 g of a δ-type crystal form azo pigment (1)-25 was obtained by filtering off the solid precipitated.

The length of primary particles of the azo pigment (1)-25 obtained in a long axis direction was about 0.2 μm.

The X-ray diffraction of the azo pigment (1)-25 obtained was measured by the aforementioned conditions, and as a result, characteristic X-ray diffraction peaks were shown at Bragg angles (2θ±0.2°) of 4.8°, 7.2°, 9.5°, 9.7°, 10.7°, 17.4°, 19.0°, 20.1° and 26.8°.

Figure 30:
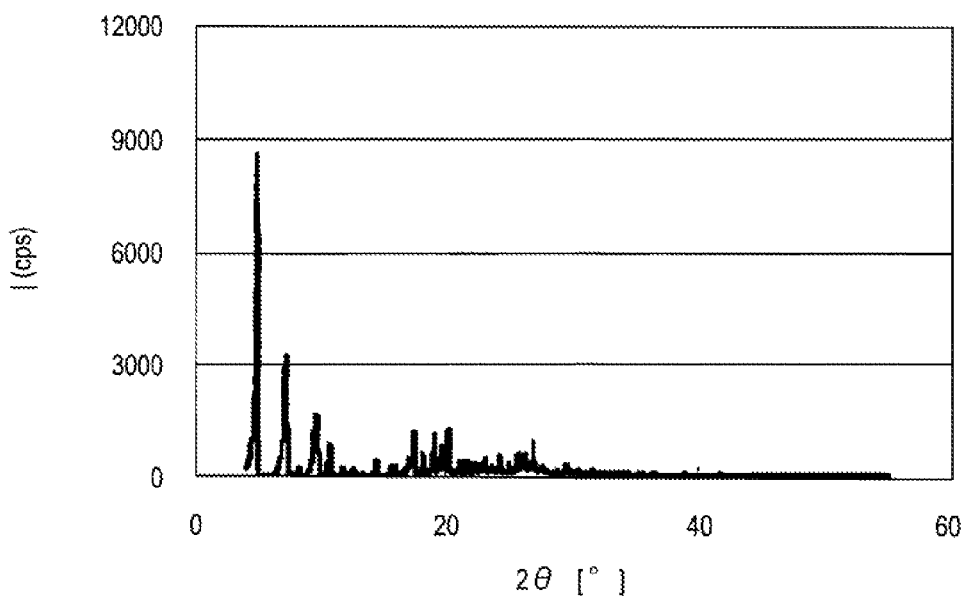
FIG. 30 is a view of an X-ray diffraction of a δ-type crystal form azo pigment (1)-25, which is synthesized according to Synthesis Example 24.

A CuKα characteristic X-ray diffraction diagram was illustrated in FIG. 30.

Synthesis Example 25

11.5 g of the compound of Formula (2) was suspended in 50 g of acetic acid, and a sulfuric acid solution of a 43% nitrosylsulfuric acid was added dropwise thereto such that the internal temperature was 20° C. to 30° C. A diazonium salt solution was obtained by stirring the resulting solution at an internal temperature of 20° C. for 1 hour, and then adding 0.1 g of urea thereto. Apart from the aforementioned preparation, 10 g of the compound of Formula (3) was dissolved in 100 mL of acetic acid, and the resulting solution was added dropwise to the above-described diazonium salt solution such that the internal temperature was 20° C. to 25° C. A uniform reaction solution of the azo compound (1) was obtained by stirring the resulting solution at an internal temperature of 20° C. for 1 hour. Apart from the aforementioned preparation, 150 g of water was prepared, and the above-described uniform reaction solution of the azo compound (1) was added dropwise thereto at an internal temperature of 20° C. to 25° C. The solid precipitated was filtered, washed sufficiently with water, and suspended in 200 mL of water, and the pH was adjusted to 6.2 by adding a 28% ammonia aqueous solution thereto. An amorphous azo compound (1) was obtained by filtering off the solid precipitated and washing the solid sufficiently with water.

The length of primary particles of the azo compound (1) obtained in a long axis direction was about 0.2 μm.

Moisture was measured, and as a result, the content of water was 68%.

The X-ray diffraction of the azo compound (1) was measured by the aforementioned conditions, and as a result, no characteristic X-ray diffraction peak was observed.

Figure 31:
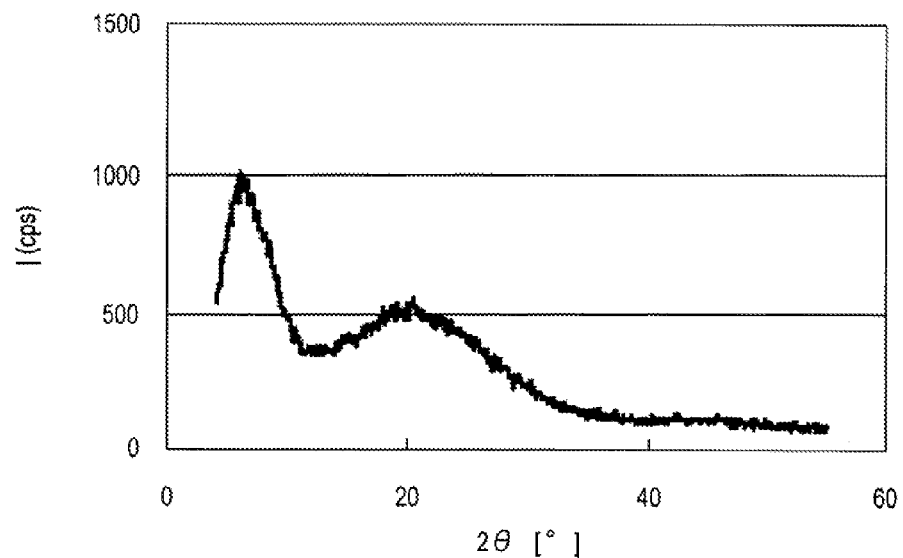
FIG. 31 is a view of an X-ray diffraction of an amorphous azo pigment (1), which is synthesized according to Synthesis Example 25.

A CuKα characteristic X-ray diffraction diagram is illustrated in FIG. 31.

40 g of the amorphous water-containing azo compound (1) obtained was suspended in 30 mL of ethylene glycol. The suspension was heated to an internal temperature of 80° C., and then was stirred at the same temperature for 2 hours. After the internal temperature was cooled down to 30° C., 11 g of a δ-type crystal form azo pigment (1)-26 was obtained by filtering off the solid precipitated.

The length of primary particles of the azo pigment (1)-26 obtained in a long axis direction was about 0.5 μm.

The X-ray diffraction of the azo pigment (1)-26 obtained was measured by the aforementioned conditions, and as a result, characteristic X-ray diffraction peaks were shown at Bragg angles (2θ±0.2°) of 4.8°, 7.2°, 9.7°, 20.0°, 17.3°, 26.0° and 26.7°.

Figure 32:
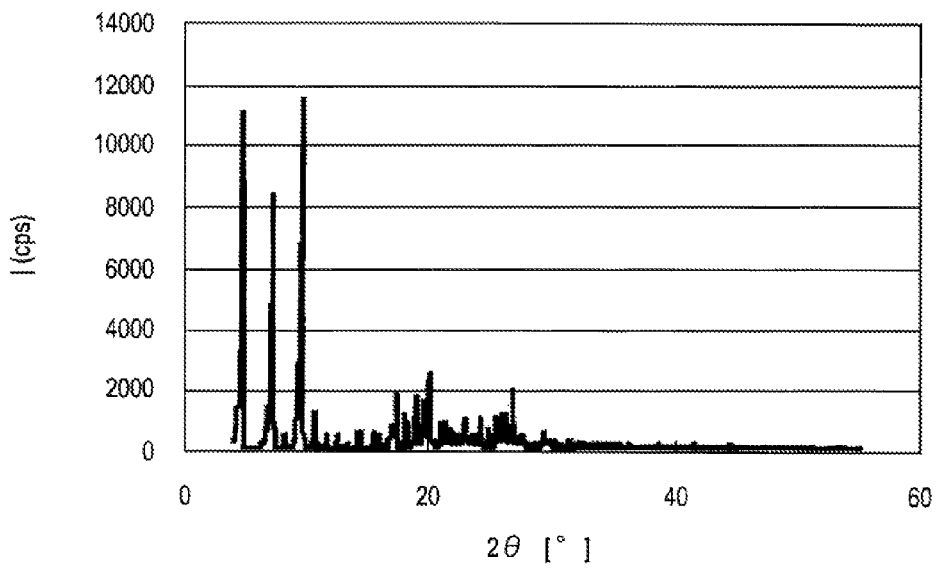
FIG. 32 is a view of an X-ray diffraction of a δ-type crystal form azo pigment (1)-26, which is synthesized according to Synthesis Example 25.

A CuKα characteristic X-ray diffraction diagram is illustrated in FIG. 32.

Synthesis Example 26

Figure 33:
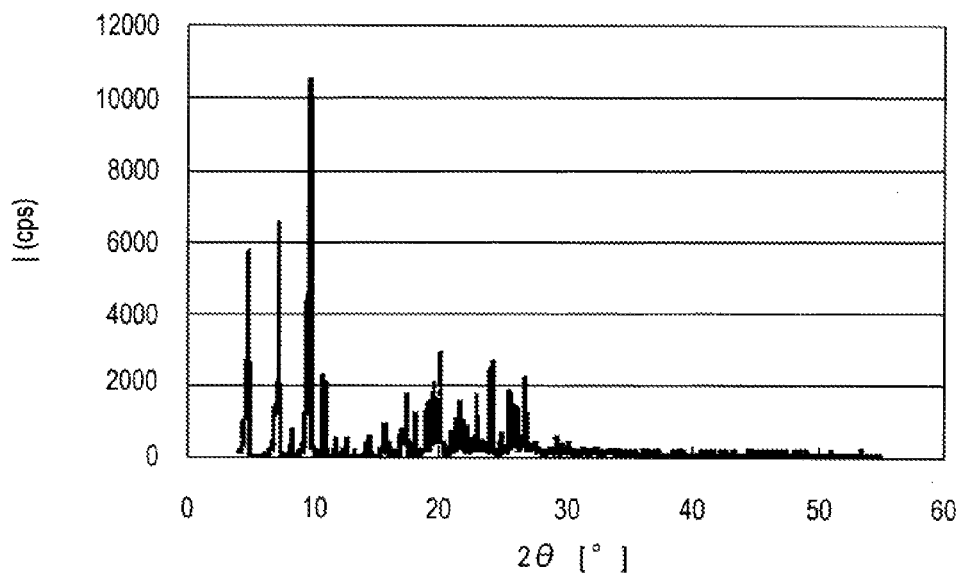
FIG. 33 is a view of an X-ray diffraction of a δ-type crystal form azo pigment (1)-27, which is synthesized according to Synthesis Example 26.

A paste-type azo pigment (1)-27 with a length of primary particles thereof in a long axis direction being 0.05 μm was obtained by subjecting the azo pigment (1)-26 obtained in Synthesis Example 25 to salt milling. The paste-type azo pigment (1)-27 obtained was dried, and the X-ray diffraction thereof was measured by the aforementioned conditions, and as a result, characteristic X-ray diffraction peaks were shown at Bragg angles (2θ±0.2°) of 4.8°, 7.2°, 9.7°, 20.0°, 17.3°, 26.0° and 26.7°. A CuKα characteristic X-ray diffraction diagram of the δ-type crystal form azo pigment (1)-27 is illustrated in FIG. 33.

[Synthesis (1) of Copolymer]

58.7 g of dipropylene glycol was heated to an internal temperature of 70° C. under nitrogen atmosphere, and a solution obtained by mixing 10.8 g of methacrylic acid, 39.4 g of benzyl methacrylate, 1.2 g of V-601 and 58.7 g of dipropylene glycol was added dropwise thereto over 3 hours. After the resulting mixture was further stirred at the same temperature for 1 hour, 0.6 g of V-601 (polymerization initiator: manufactured by Wako Pure Chemical Industries, Ltd.) was added thereto, and the resulting mixture was further stirred at the same temperature for 2 hours. 11.3 g of a 50% potassium hydroxide aqueous solution was added dropwise thereto at the same temperature, and then the resulting mixture was stirred at the same temperature for 1 hour. A dipropylene glycol solution of a copolymer (Mw=83,000, acid value 140 mgKOH) of benzyl methacrylate (66.7% by mol) and methacrylic acid (33.3% by mol) was obtained by cooling down the temperature to room temperature.

[Synthesis (2) of Copolymer]

41.1 g of dipropylene glycol was heated to an internal temperature of 70° C. under nitrogen atmosphere, and a solution obtained by mixing 9.6 g of methacrylic acid, 16.8 g of methyl methacrylate, 8.9 g of 2-ethylhexyl methacrylate, 2.5 g of V-601 and 41.1 g of dipropylene glycol was added dropwise thereto over 3 hours. A dipropylene glycol solution of a copolymer (Mw=83,000, acid value 154 mgKOH) of methyl methacrylate (47.8% by mol), methacrylic acid (31.8% by mol) and 2-ethylhexyl methacrylate (20.4% by mol) was obtained by performing the other operations in the same manner as in Synthesis (1) of Copolymer.

Manufacture of Pigment Dispersion

Examples 1 to 8

2.5 parts of the ε-type crystal form azo pigment (1)-1 synthesized in Synthesis Example 1 was mixed with 0.5 parts of sodium oleate. 5 parts of glycerin and 42 parts by mass of water, and the mixture was dispersed together with 100 parts of a zirconia bead having a diameter of 0.1 mm by means of a planetary ball mill at 300 revolutions per minute for 3 hours. After the dispersion was completed, a yellow pigment dispersion 1 was obtained by separating the zirconia bead.

Yellow pigment dispersions 2 to 8 of Examples 2 to 8 were obtained by performing the same operation on the pigments synthesized in Synthesis Examples 2, 4, 7, 8, 10 and 13 and described in Table 1, respectively.

After the pigment dispersions 1 to 8 obtained were dried at room temperature, the X-ray diffractions of the crystals obtained were measured by the aforementioned conditions, and as a result, characteristic X-ray diffraction peaks were shown at Bragg angles (2θ±0.2°) of 4.8°, 7.2°, 9.7°, 17.4° and 20.1°.

Example 9

2.5 parts of the α-type crystal form azo pigment (1)-2 synthesized in Synthesis Example 5 was mixed with 2.3 parts of DISPERBYK-2091 manufactured by BYK Japan KK and 45.2 parts of water, and the mixture was dispersed together with 100 parts of a zirconia bead having a diameter of 0.1 mm by means of a planetary ball mill at 300 revolutions per minute for 3 hours. After the dispersion was completed, a yellow pigment dispersion 9 (average volume particle diameter 91 nm) was obtained by separating the zirconia bead.

After the pigment dispersion 9 obtained was dried at room temperature, the X-ray diffraction of the crystal obtained was measured by the aforementioned conditions, and as a result, characteristic X-ray diffraction peaks were shown at Bragg angles (2θ±0.2°) of 4.8°, 7.2°, 9.7°, 17.4° and 20.1°.

Figure 34:
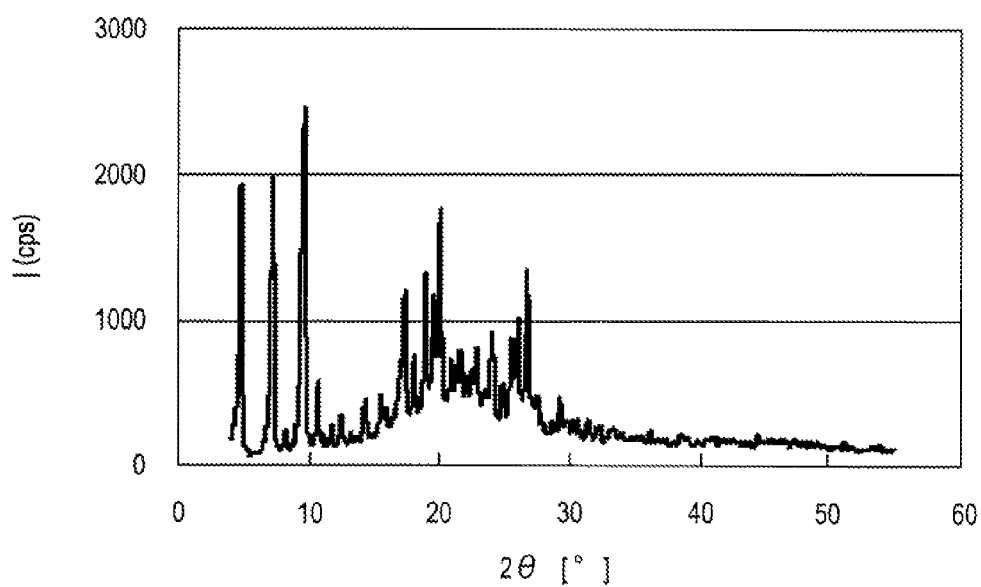
FIG. 34 is a view of an X-ray diffraction of a crystal obtained by drying a pigment dispersion 9 obtained in Example 9.

A CuKα characteristic X-ray diffraction diagram is illustrated in FIG. 34.

Example 10

2.5 parts of the γ-type crystal form azo pigment (1)-2 synthesized in Synthesis Example 2 was mixed with 2.3 parts of DISPERBYK-2091 manufactured by BYK Japan KK and 45.2 parts of water, and the mixture was dispersed together with 100 parts of a zirconia bead having a diameter of 0.1 mm by means of a planetary ball mill at 300 revolutions per minute for 3 hours. After the dispersion was completed, a yellow pigment dispersion 10 (average volume particle diameter 91 nm) was obtained by separating the zirconia bead.

After the pigment dispersion 10 obtained was dried at room temperature, the X-ray diffraction of the crystal obtained was measured by the aforementioned conditions, and as a result, characteristic X-ray diffraction peaks were shown at Bragg angles (2θ±0.2°) of 4.8°, 7.2°, 9.7°, 17.4° and 20.1°.

Figure 35:
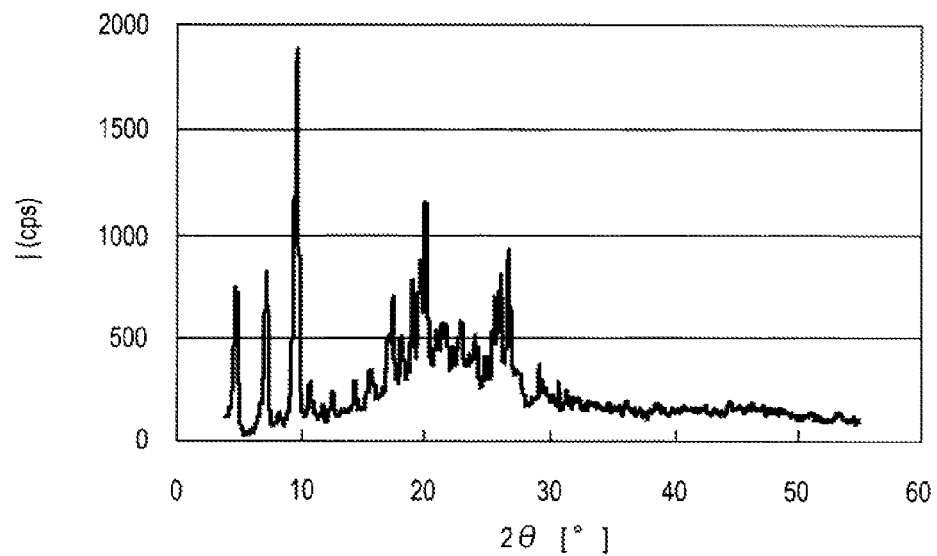
FIG. 35 is a view of an X-ray diffraction of a crystal obtained by drying a pigment dispersion 10 obtained in Example 10.

A CuKα characteristic X-ray diffraction diagram is illustrated in FIG. 35.

Example 11

2.5 parts of the ζ-type crystal form azo pigment (1)-1 synthesized in Synthesis Example 1 was mixed with 2.3 parts of DISPERBYK-2091 manufactured by BYK Japan KK and 45.2 parts of water, and the mixture was dispersed together with 100 parts of a zirconia bead having a diameter of 0.1 mm by means of a planetary ball mill at 300 revolutions per minute for 3 hours. After the dispersion was completed, a yellow pigment dispersion 11 (average volume particle diameter 95 nm) was obtained by separating the zirconia bead.

After the pigment dispersion 11 obtained was dried at room temperature, the X-ray diffraction of the crystal obtained was measured by the aforementioned conditions, and as a result, characteristic X-ray diffraction peaks were shown at Bragg angles (2θ±0.2°) of 4.8°, 7.2°, 9.7°, 17.4° and 20.1°.

Figure 36:
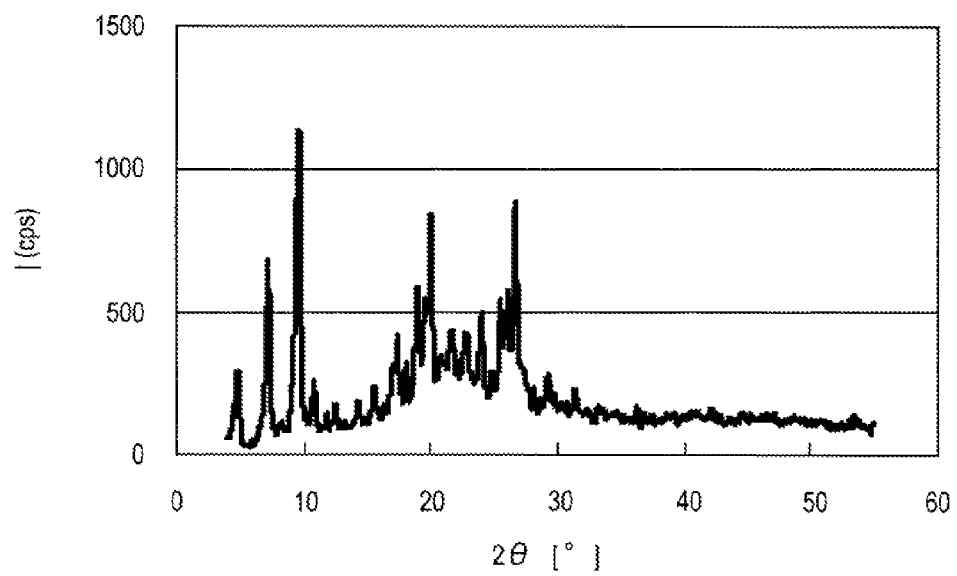
FIG. 36 is a view of an X-ray diffraction of a crystal obtained by drying a pigment dispersion 11 obtained in Example 11.

A CuKα characteristic X-ray diffraction diagram is illustrated in FIG. 36.

Manufacture of Pigment Dispersion

Example 12

363.6 g (solid content ratio 30.8%, sold content 112.0 g) of the dispersing agent {a dipropylene glycol solution of a copolymer of benzyl methacrylate (66.7% by mol) and methacrylic acid (33.3% by mol), Mw=83,000 and acid value 140 mgKOH} obtained in Synthesis (1) of Copolymer and 2.4 g of water were mixed with 604.0 g (solid content ratio 26.5%, solid content 160.0 g) of the paste-type azo pigment (1)-27 obtained in Synthesis Example 26, and then the mixture was pre-dispersed at 2,400 rpm for 1 hour by using an agitator bead mill MiniZeta manufactured by Netzsch, Inc., which was filled with beads having a size of 1 mm in diameter and made of polycarbonate. 928 g of a crude pigment liquid dispersion 12 (average volume particle diameter Mv=91.9 nm) at a pigment concentration of 13.3% by weight was obtained by dispersing the pre-liquid dispersion obtained at 4,200 rpm for 15 hours by means of a MiniCer manufactured by Netzsch, Inc, which was filled with beads having a size of 0.2 mm to 0.3 mm in diameter and made of polystyrene, and had a recirculation function, and washing the pre-liquid dispersion with water.

8.5 g of DENACOL EX-321 (manufactured by Nagase ChemteX Corporation), 60.3 g of a 6.18% boric acid aqueous solution and 234.6 g of water were added to 12,928 g of the crude pigment liquid dispersion obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 1,220 g of a pigment liquid dispersion 12 at a pigment concentration of 9.0% was obtained by using a filter having a cutoff molecular weight of 50,000 and performing washing sufficiently with water. Viscosity: 2.7 mPa·s.

Figure 37:
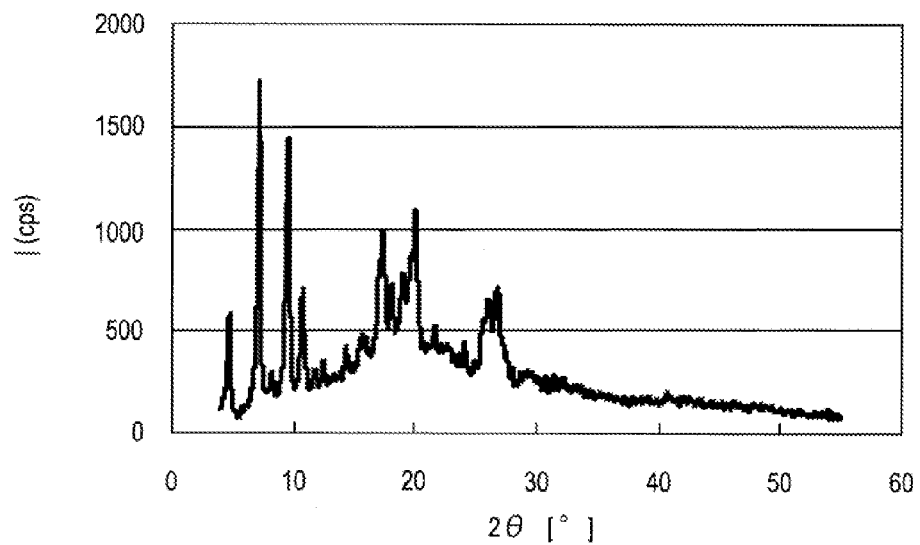
FIG. 37 is a view of an X-ray diffraction of a crystal obtained by drying a pigment dispersion 12 obtained in Example 12.

After the pigment dispersion 12 obtained was dried at room temperature, the X-ray diffraction of the crystal obtained was measured by the aforementioned conditions, and as a result, characteristic X-ray diffraction peaks were shown at Bragg angles (2θ±0.2°) of 4.8°, 7.2°, 9.7°, 17.4° and 20.1°. An X-ray diffraction diagram obtained is illustrated in FIG. 37.

Example 13

225.0 g (solid content ratio 35.2%, sold content 79.2 g) of the dispersing agent {a dipropylene glycol solution of a copolymer of methyl methacrylate (47.8% by mol), methacrylic acid (31.8% by mol) and 2-ethylhexyl methacrylate (20.4% by mol), Mw=83,000 and acid value 154 mgKOH} obtained in Synthesis (2) of Copolymer and 57.3 g of water were mixed with 597.7 g (solid content ratio 26.5%, solid content 158.4 g) of the paste-type azo pigment (1)-27, and then the mixture was pre-dispersed at 2,400 rpm for 1 hour by using an agitator bead mill MiniZeta manufactured by Netzsch, Inc., which was filled with beads having a size of 1 mm in diameter and made of polycarbonate. 657 g of a crude pigment liquid dispersion 13 (average volume particle diameter Mv=97.6 nm) at a pigment concentration of 18.6% by weight was obtained by dispersing the pre-liquid dispersion obtained at 4,200 rpm for 25 hours by means of a MiniCer manufactured by Netzsch, Inc., which was filled with beads having a size of 0.2 mm to 0.3 mm in diameter and made of polystyrene, and had a recirculation function, and washing the pre-liquid dispersion with water.

6.0 g of DENACOL EX-321 (manufactured by Nagase ChemteX Corporation), 42.7 g of a 6.18% boric acid aqueous solution and 514 g of water are added to 13,657 g of the crude pigment liquid dispersion obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 1,190 g of a pigment liquid dispersion 13 at pigment concentration of 8.7% was obtained by using a filter having a cutoff molecular weight of 50,000 and performing washing sufficiently with water. Viscosity: 2.3 mPa·s.

Figure 38:
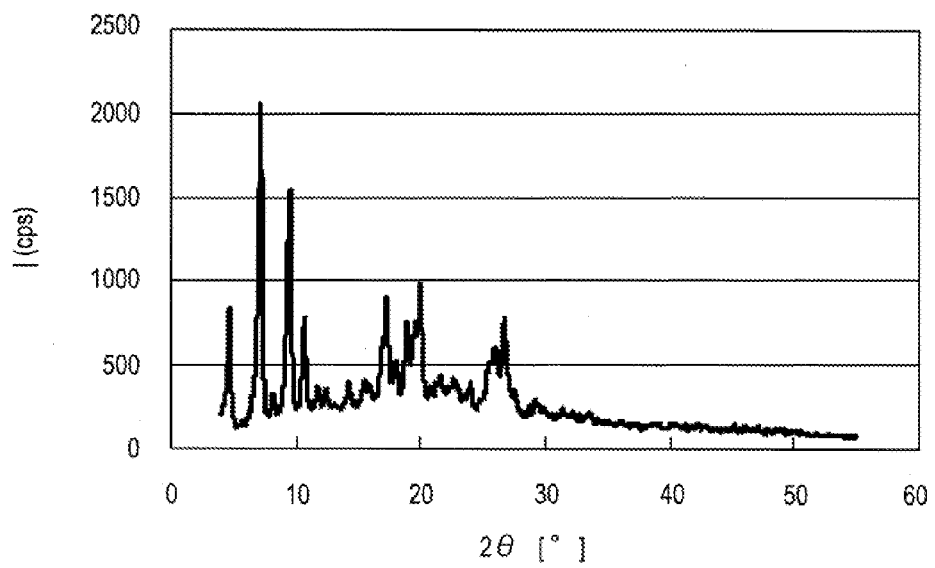
FIG. 38 is a view of an X-ray diffraction of a crystal obtained by drying a pigment dispersion 13 obtained in Example 13.

After the pigment dispersion 13 obtained was dried at room temperature, the X-ray diffraction of the crystal obtained was measured by the aforementioned conditions, and as a result, characteristic X-ray diffraction peaks were shown at Bragg angles (2θ±0.2°) of 4.8°, 7.2°, 9.7°, 17.4° and 20.1°. An X-ray diffraction diagram obtained is illustrated in FIG. 38.

Example 14

146.0 g (solid content ratio 30.8%, sold content 45.0 g) of the dispersing agent (a dipropylene glycol solution of a copolymer of benzyl methacrylate (66.7% by mol) and methacrylic acid (33.3% by mol), Mw=83,000 and acid value 140 mgKOH) obtained in Synthesis (1) of Copolymer and 3.8 g of water were mixed with 350.3 g (solid content ratio 25.7%, solid content 90.0 g) of the paste-type azo pigment (1)-27, and then the mixture was pre-dispersed at 2,400 rpm for 1 hour by using an agitator bead mill MiniZeta manufactured by Netzsch, Inc., which was filled with beads having a size of 1 mm in diameter and made of polycarbonate. 606 g of a crude pigment liquid dispersion 14 (average volume particle diameter My=91.9 nm) at a pigment concentration of 12.0% by weight was obtained by dispersing the pre-liquid dispersion obtained at 4,200 rpm for 10 hours by means of a MiniCer manufactured by Netzsch, Inc., which was filled with beads having a size of 0.2 mm to 0.3 mm in diameter and made of polystyrene, and had a recirculation function, and washing the pre-liquid dispersion with water.

3.6 g of DENACOL EX-321 (manufactured by Nagase ChemteX Corporation), 25.5 g of a 6.18% boric acid aqueous solution and 61.0 g of water were added to 14,606 g of the crude pigment liquid dispersion obtained, and the resulting mixture was stirred at 70° C. for 5 hours. After the reaction was completed, the temperature was cooled down to room temperature, coarse particles were removed through a filter having a pore diameter of 1.0 μm, and then coarse particles were further precipitated by a centrifuge (7,000 rpm, for 10 minutes). After the precipitated solid was removed, 580 g of a pigment liquid dispersion 14 at a pigment concentration of 10.8% was obtained by using a filter having a cutoff molecular weight of 50,000 and performing washing sufficiently with water. Viscosity: 2.2 mPa·s.

Figure 39:
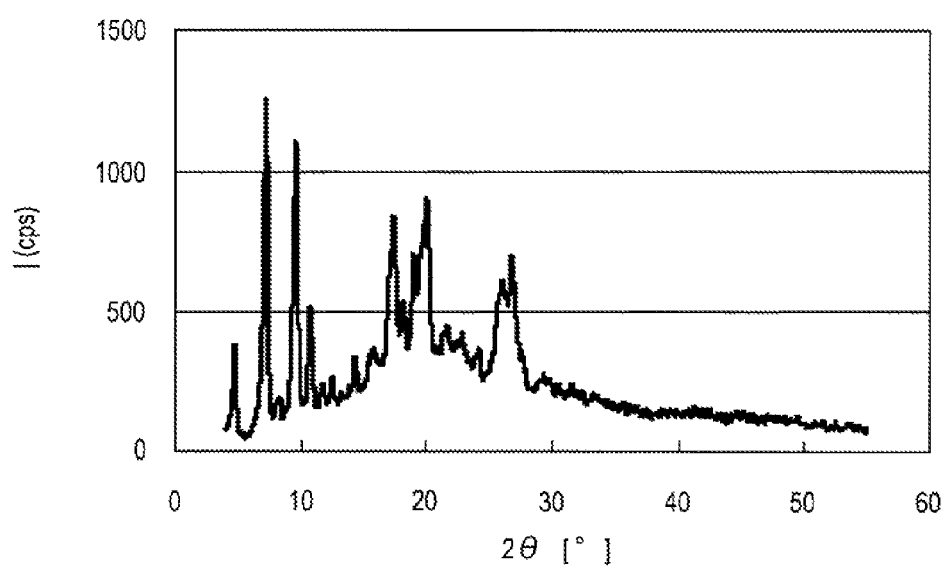
FIG. 39 is a view of an X-ray diffraction of a crystal obtained by drying a pigment dispersion 14 obtained in Example 14.

After the pigment dispersion 14 obtained was dried at room temperature, the X-ray diffraction of the crystal obtained was measured by the aforementioned conditions, and as a result, characteristic X-ray diffraction peaks were shown at Bragg angles (2θ±0.2°) of 4.8°, 7.2°, 9.7°, 17.4° and 20.1°. An X-ray diffraction diagram obtained is illustrated in FIG. 39.

Comparative Example 1

Manufacture of Comparative Pigment Dispersion 1

For comparison, 2.5 parts of the C.I. Pigment Yellow 155 (INKJET YELLOW 4G VP2532 manufactured by Clariant K.K) was mixed with 0.5 parts of sodium oleate, 5 parts of glycerin and 42 parts of water, and the mixture was dispersed together with 100 parts of a zirconia bead having a diameter of 0.1 mm by means of a planetary ball mill at 300 revolutions per minute for 3 hours. After the dispersion was completed, a yellow comparative pigment dispersion 1 (volume average particle diameter; Mv≈83.3 nm: measured using Nanotrac 150 (UPA-EXI50) manufactured by NIKKISO Co., Ltd.) was obtained by separating the zirconia bead.

[Evaluation of Performance of Pigment Dispersion]
<Evaluation of Tinctorial Strength>

Each of the pigment dispersions obtained in the Examples and the Comparative Example was applied on Photo Matte Paper manufactured by EPSON Corporate, using a No. 3 bar coater. An image concentration of each of the thus-obtained applied products was measured using a reflection densitometer (X-Rite 938 manufactured by X-Rite Co.), and the "tinctorial strength (OD: Optical Density)" was evaluated in accordance with the following criteria. Samples showing an OD of 1.4 or more were ranked A, samples showing an OD of 1.2 or more and less than 1.4 were ranked B, and samples showing an OD less than 1.2 were ranked C. The results are shown in Table 2.

<Evaluation of Hue>

Hue was evaluated by confirming the chromaticity of the applied product obtained above with the eyes and ranking the chromaticity as A which had slight reddishness and clear vividness, B in which any one of the reddishness and the vividness was not suitable, and C (defective) in which both the reddishness and the vividness were not suitable. The results are shown in Table 2.

<Evaluation of Light Fastness>

The applied products having an image concentration of 1.0 used in the evaluation of hue were prepared and irradiated for 28 days with a xenon light (99,000 lux, in the presence of a TAC filter) using a fade meter, the image concentration thereof before and after irradiation with the xenon light was measured using a reflection densitometer, and evaluation was performed by ranking samples with a colorant residual ratio [(concentration after irradiation/concentration before irradiation)×100%] of 80% or more as A, samples with a colorant residual ratio of 60% or more and less than 80% as B, and samples with a colorant residual ratio less than 60% as C. The results are shown in Table 2.

<Evaluation of Storage Stability of Pigment Dispersion>

Each of the pigment dispersions manufactured in the Examples and the Comparative Example was allowed to stand at 60° C. for 2 weeks, and the storage stability of the pigment dispersion was evaluated as the rate of change in each value before being allowed to stand by measuring the pH and the viscosity. Evaluation was performed by ranking samples with a rate of change less than 3%, samples with a rate of change of 3% or more and less than 10%, and samples with a rate of change of 10% or more as A, B and C, respectively. The results are shown in Table 2.

TABLE 2

| | Synthesis Example | Crystal form | Tinctorial strength | Hue | Light resistance | Rate of change in pH | Evaluation of change in pH | Rate of change in viscosity | Evaluation of change in viscosity |
|---|---|---|---|---|---|---|---|---|---|
| Example 1 | 1 | ε (1)-1 | A | A | A | 1.57% | A | 3.27% | B |
| Example 2 | 2 | η (1)-2 | A | A | A | 0.78% | A | 8.85% | B |
| Example 3 | 4 | α (1)-1 | A | A | A | 0.60% | A | 3.96% | B |
| Example 4 | 4 | β (1)-1 | A | A | A | 1.41% | A | 5.90% | B |
| Example 5 | 7 | Amorphous (1)-1 | A | A | A | 2.13% | A | 7.73% | B |

TABLE 2-continued

| | Synthesis Example | Crystal form | Tinctorial strength | Hue | Light resistance | Rate of change in pH | Evaluation of change in pH | Rate of change in viscosity | Evaluation of change in viscosity |
|---|---|---|---|---|---|---|---|---|---|
| Example 6 | 8 | δ (1)-2 | A | A | A | 1.17% | A | 2.83% | A |
| Example 7 | 10 | δ (1)-7 | A | A | A | 0.62% | A | 2.79% | A |
| Example 8 | 13 | δ (1)-13 | A | A | A | 1.21% | A | 2.39% | A |
| Example 9 | 5 | α (1)-2 | A | A | A | 1.83% | A | 4.50% | B |
| Example 10 | 2 | γ (1)-2 | A | A | A | 2.24% | A | 3.92% | B |
| Example 11 | 1 | ζ (1)-1 | A | A | A | 2.85% | A | 6.33% | B |
| Example 12 | 26 | δ (1)-27 | A | A | A | 1.12% | A | 2.15% | A |
| Example 13 | 26 | δ (1)-27 | A | A | A | 1.58% | A | 1.98% | A |
| Example 14 | 26 | δ (1)-27 | A | A | A | 1.37% | A | 2.68% | A |
| Comp. Example 1 | — | — | B | C | C | 1.68% | A | 7.63% | B |

INDUSTRIAL APPLICABILITY

Provided are a dispersion of an azo pigment with a novel crystal form, which has excellent color characteristics such as hue, excellent light resistance, and particularly, excellent storage stability of the pigment dispersion, and in which pyrazole rings having a specific substituent are connected through an azo group and a triazine ring, and a coloring composition. Further, an inkjet recording ink having excellent storage stability of a pigment dispersion is provided by the coloring composition.

In addition, provided is a method for preparing a dispersion of an azo pigment, which may prepare the azo pigment with good reproducibility and high efficiency while controlling the azo pigment in a specific crystal form.

Although the present invention has been described with reference to detailed and specific embodiments, it is obvious to those skilled in the art that various changes or modifications may be made without departing from the spirit and scope of the present invention.

The present application is based on Japanese Patent Application (Patent Application No. 2011-167832) filed on Jul. 29, 2011 and Japanese Patent Application (Patent Application 2012-127329) filed on Jun. 4, 2012, the contents of which are incorporated herein by reference.

What is claimed is:

1. A pigment dispersion comprising:
an azo pigment or a tautomer thereof represented by the following Formula (1) and having characteristic X-ray diffraction peaks at Bragg angles (2θ±0.2°) of 4.8°, 7.2° and 9.7° in a CuKα characteristic X-ray diffraction

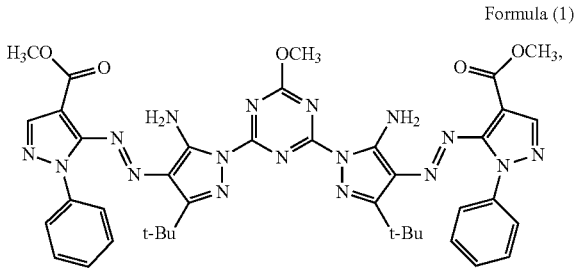 [SMILES: COC(=O)c1cnn(-c2ccccc2)c1/N=N/c1c(C(C)(C)C)nn(-c2nc(OC)nc(-n3nc(C(C)(C)C)c(/N=N/c4c(C(=O)OC)cnn4-c4ccccc4)c3N)n2)c1N]

Formula (1)

wherein a volume average particle diameter of pigment particles in the pigment dispersion is 0.01 μm to 0.2 μm.

2. The pigment dispersion according to claim 1, wherein the azo pigment is an azo pigment or a tautomer thereof having characteristic X-ray diffraction peaks at Bragg angles (2θ±0.2°) of 4.8°, 7.2°, 9.7°, 17.4° and 20.1° in the CuKα characteristic X-ray diffraction.

3. The pigment dispersion according to claim 1, further comprising:
an amorphous azo pigment represented by Formula (1), or
an azo pigment or a tautomer thereof represented by Formula (1) and having characteristic X-ray diffraction peaks at Bragg angles (2θ±0.2°) of any one of (A) to (C) and (E) to (G) in the CuKα characteristic X-ray diffraction:

(A) 6.5°, 7.1° and 21.8°;
(B) 6.3°, 6.4° and 22.3°;
(C) 5.9° and 7.0°;
(E) 4.9°, 8.9° and 13.1°;
(F) 6.6°, 9.2°, 10.3°, 21.4° and 25.6°; and
(G) 4.8°, 9.2° and 13.0°.

4. The pigment dispersion according to claim 1,
wherein the azo pigment dispersed and represented by Formula (1) has characteristic X-ray diffraction peaks at Bragg angles (2θ±0.2°) of any one of the following (A) and (E) in the CuKα characteristic X-ray diffraction:

(A) 6.5°, 7.1° and 21.8°; and
(E) 4.9°, 8.9° and 13.1°.

5. A method for preparing a pigment dispersion including an azo pigment or a tautomer thereof represented by the following Formula (1) and having characteristic X-ray diffraction peaks at Bragg angles (2θ±0.2°) of 4.8°, 7.2° and 9.7° in a CuKα characteristic X-ray diffraction, the method comprising:

a step of dispersing into an aqeuous solvent comprising at least one of an aqueous resin and a surfactant, an amorphous azo pigment represented by the following Formula (1) or an azo pigment represented by the following Formula (1) and having characteristic X-ray diffraction peaks at Bragg angles (2θ±0.2°) of any one of the following (A) to (G) in the CuKα characteristic X-ray diffraction:

(A) 6.5°, 7.1° and 21.8°;
(B) 6.3°, 6.4° and 22.3°;
(C) 5.9° and 7.0°;
(D) 4.8°, 7.2° and 9.7°;
(E) 4.9°, 8.9° and 13.1°;
(F) 6.6°, 9.2°, 10.3°, 21.4° and 25.6°; and
(G) 4.8°, 9.2° and 13.0°

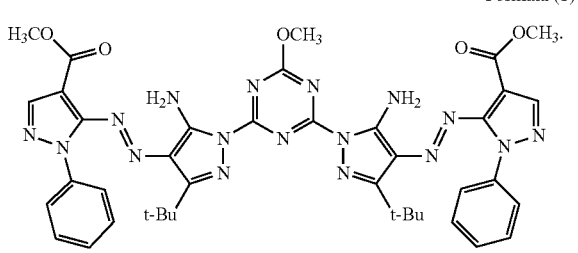

Formula (1)

6. The method according to claim 5, further comprising:
a step of subjecting the amorphous azo pigment represented by Formula (1) or the azo pigment represented by Formula (1) and having characteristic X-ray diffraction peaks at Bragg angles (2θ±0.2°) of any one of (A) to (G) in the CuKα characteristic X-ray diffraction to solvent heating treatment.

7. The method according to claim 5, further comprising:
a step of subjecting the amorphous azo pigment represented by Formula (1) or the azo pigment represented by Formula (1) and having characteristic X-ray diffraction peaks at Bragg angles (2θ±0.2°) of any one of (A) to (G) in the CuKα characteristic X-ray diffraction to grinding treatment.

8. The method according to claim 7,
wherein the grinding treatment is a solvent salt milling.

9. A coloring composition comprising the pigment dispersion according to claim 1.

10. An inkjet recording ink comprising the pigment dispersion according to claim 1.

11. An inkjet recording ink comprising the coloring composition according to claim 9.

* * * * *